(12) United States Patent
Carpenter et al.

(10) Patent No.: US 11,440,979 B2
(45) Date of Patent: Sep. 13, 2022

(54) CATALYSTS, CATALYST SYSTEMS, AND METHODS FOR USING THE SAME

(71) Applicant: ExxonMobil Chemical Patents Inc., Baytown, TX (US)

(72) Inventors: Alex E. Carpenter, Houston, TX (US); Danielle Gold Singleton, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 75 days.

(21) Appl. No.: 16/958,891

(22) PCT Filed: Feb. 5, 2019

(86) PCT No.: PCT/US2019/016677
§ 371 (c)(1),
(2) Date: Jun. 29, 2020

(87) PCT Pub. No.: WO2019/160710
PCT Pub. Date: Aug. 22, 2019

(65) Prior Publication Data
US 2020/0339712 A1    Oct. 29, 2020

Related U.S. Application Data

(60) Provisional application No. 62/631,999, filed on Feb. 19, 2018.

(51) Int. Cl.
*C07F 17/00* (2006.01)
*C08F 4/653* (2006.01)
*C08F 4/6592* (2006.01)
*C08F 210/16* (2006.01)
*C08F 4/659* (2006.01)

(52) U.S. Cl.
CPC ......... *C08F 4/65916* (2013.01); *C07F 17/00* (2013.01); *C08F 4/65912* (2013.01); *C08F 4/65925* (2013.01); *C08F 210/16* (2013.01); *C08F 2410/03* (2013.01)

(58) Field of Classification Search
CPC ...... C07F 17/00; C08F 4/6423; C08F 4/6592; C08F 4/65925; C08F 210/16
See application file for complete search history.

(56) References Cited

U.S. PATENT DOCUMENTS

| | | | |
|---|---|---|---|
| 6,153,776 A | 11/2000 | Patton et al. |
| 6,284,698 B1 | 9/2001 | Chen et al. |
| 6,414,162 B1 | 7/2002 | Nagy |
| 6,455,458 B1 | 9/2002 | Canich |
| 6,864,210 B2 | 3/2005 | Hlatky et al. |
| 8,557,935 B2 | 10/2013 | Kao et al. |

(Continued)

OTHER PUBLICATIONS

Damrau, Wulf-Erich, et al. "[Y {2, 6-(C5H4CH2) 2C5H3N}μ-OH)] 2: a dinuclear 5-ansa-yttiocene hydroxide containing the 2, 6-dimethylenepyridyl bridge." Inorganic Chemistry Communications 1.11 (1998): 424-426.

(Continued)

*Primary Examiner* — Caixia Lu
(74) *Attorney, Agent, or Firm* — ExxonMobil Chemical Patents Inc.—Law Department

(57) ABSTRACT

Catalysts, catalysts systems and methods of polymerizing olefins are provided. The catalyst system may contain two catalysts. Polyolefin polymers are also provided.

17 Claims, 8 Drawing Sheets

(56) References Cited

U.S. PATENT DOCUMENTS

2013/0216812 A1 8/2013 Cheng et al.
2014/0128563 A1 5/2014 McDaniel et al.

OTHER PUBLICATIONS

Delferro, Massimiliano, and Tobin J. Marks. "Multinuclear olefin polymerization catalysts." Chemical reviews 111.3(2011): 2450-2485.
Krut'ko, Dmitrii P., et al. "Reduction-induced oC—H bond activation of pyridine with decamethylzirconocene dichloride." Polyhedron 26.12 (2007): 2864-2870.
Lin, Feng, et al. "Ethylene polymerization by 3-oxa-pentamethylene bridged dinuclear metallocene (Ti, Zr)/MAO systems." European polymer journal 43.4 (2007): 1436-1443.
Paolucci, G., et al. "4f-ansa-Metallocenes—Dinuclear Complexes where the ansa-Dicyclopentadienyl Ligands Simultaneously Act in a Chelating and Bridging Mode—Crystal Structure of (LY) 2 (μ-L)[L=2, 6-Pyridinediylbis (methylcyclopentadienyl)]." (2005): 3472-3478.
Paolucci, G., et al. "New Dinuclear 5-a nsa-Lanthanocene Derivatives. Crystal Structures of [Ln {2, 6-(CH2C5H4) 2C5H3N} μ-O2SOCF3] 2 (Ln=Nd, Y, Yb) and a VT Solution NMR (1H, 19F) Study of the Fluxional Yttrium Homologue." Organometallics 21.6 (2002): 1088-1094.
Paolucci, G., et al. "New Trigonal-Bipyramidal 5-ansa-Zirconocene Derivatives. 1.{2, 6-Bis (methylcyclopentadienyl)-pyridine} zirconium (IV) Monochloride Monoalkyls and Dialkyls. Crystal Structure of [Zr {C5H3N (CH2C5H4) 2-2, 6}(n-C4H9) 2], the First Thermally Stable Dialkylzirconocene Containing β-Hydrogens." Organometallics 16.24 (1997): 5312-5320.
Radlauer, Madalyn R., et al. "Bimetallic effects on ethylene polymerization in the presence of amines: Inhibition of the deactivation by lewis bases." Journal of the American Chemical Society 134.3 (2012): 1478-1481.
Rau, Alexander, et al. "ansa-Zirconocenes with Bridge-tethered Donors: Synthesis and Application as Catalysts in Solution Polymerization of Ethylene." Chemical Engineering & Technology 36.2 (2013): 339-346.
Stürzel, Markus, et al. "From multisite polymerization catalysis to sustainable materials and all-polyolefin composites." Chemical reviews 116.3 (2016): 1398-1433.
Sun, Junquan, et al. "Ethylene polymerization by novel 4, 4'-bis (methylene) biphenylene bridged homodinuclear titanocene and zirconocene combined with MAO " European polymer journal 42.6 (2006): 1259-1265.
Sun, Junquan, et al. "Ethylene polymerization by rigid benzene ring centered dinuclear metallocene (Ti, Zr)/MAO systems." European polymer journal 44.9 (2008): 2980-2985.
Thiele, K.-H., et al. "2, 6-Bis (methylencyclopentadienyl)-pyridin-zirconocen-und-hafnocendichlorid; Bildung und Kristallstruktur von [C5H3N-2, 6-(CH2☐ C5H4) 2Zr (Cl)(OH2)] 2 [ZrCl6]." Zeitschrift für anorganische und allgemeine Chemie 621.6 (1995): 1106-1110.
Noh, Seok Kyun, et al. "Synthesis and styrene polymerization properties of dinuclear half-titanocene complexes with kylene linkage" Journal of organometallic chemistry 691.23 (2006): 5000-5006.
Sun, Junquan, et al. "Ethylene polymerization by phenylenedimethylene-bridged homobinuclear zirconocene/methylaluminoxane systems." Journal of applied polymer science 99.5 (2006): 2193-2198.
Liu, Xijie, et al. "Ethylene polymerization by novel phenylenedimethylene bridged homobinuclear titanocene/MAO systems." European polymer journal 41.7 (2005): 1519-1524.
Jones, R.L. et al. "UHMWPE via Macromolecular Design." Int'l Med. Devices Magazine 5:1 (Aug. 4, 2011): 4-11.

CATALYSTS, CATALYST SYSTEMS, AND METHODS FOR USING THE SAME

CROSS-REFERENCE OF RELATED APPLICATIONS

This application is a National Phase Application claiming priority to PCT Application Serial No. PCT/US2019/016677, filed Feb. 5, 2019, which claims the benefit to U.S. Provisional Application Ser. No. 62/631,999, filed Feb. 19, 2018, the disclosures of which are hereby incorporated herein by reference in their entirety.

FIELD OF THE INVENTION

The present disclosure relates to catalysts, catalyst systems, and methods of polymerizing olefins utilizing the catalyst systems to produce polyolefin polymers.

BACKGROUND OF THE INVENTION

Polyolefins are widely used commercially because of their robust physical properties. For example, various types of polyethylene polymers, including high density, low density, and linear low density polyethylene polymers, are some of the most commercially useful. Polyolefins are typically prepared with a catalyst that polymerizes olefin monomers. Therefore, there is interest in finding new catalysts and catalyst systems that provide polymers having improved properties.

Low density polyethylene is generally prepared at high pressure using free radical initiators or in gas phase processes using Ziegler-Natta or vanadium catalysts. Low density polyethylene typically has a density in the range of 0.916 g/cm$^3$ to 0.950 g/cm$^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., 0.916 g/cm$^3$ to 0.940 g/cm$^3$, which is linear and does not contain long chain branching, is known as "linear low density polyethylene" ("LLDPE") and is typically produced by conventional Ziegler-Natta catalysts or with metallocene catalysts. "Linear" means that the polyethylene has few, if any, long chain branches, typically referred to as a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, typically 0.890 g/cm$^3$ to 0.915 g/cm$^3$ or 0.900 g/cm$^3$ to 0.915 g/cm$^3$.

Polyolefins, such as polyethylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight ("HMW") fraction of the composition with the improved processing properties of a low molecular weight ("LMW") fraction of the composition. As used herein, "high molecular weight" is defined as a number average molecular weight (Mn) value of 500,000 or more. "Low molecular weight" is defined as an Mn value of less than 500,000.

Useful polyolefins, such as polyethylene, have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene catalyst. The comonomer content of a polyolefin (e.g., weight percent of comonomer incorporated into a polyolefin backbone) influences the properties of the polyolefin (and composition of the copolymers) and is dependent on the identity of the polymerization catalyst. As used herein, "low comonomer content" is defined as a polyolefin having less than about 8 weight percent of comonomer based upon the total weight of the polyolefin. As used herein, "high comonomer content" is defined as a polyolefin having greater than or equal to about 8 weight percent of comonomer based upon the total weight of the polyolefin.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Polyolefins compositions can have broad composition distributions that include a first polyolefin having low molecular weight and low comonomer content while a second polyolefin has a high molecular weight and high comonomer content. Alternatively, compositions can have a broad orthogonal composition distribution (BOCD) in which the comonomer is incorporated predominantly in the high molecular weight chains. This type of composition distribution can provide improved physical properties, for example toughness properties and environmental stress crack resistance (ESCR).

Also like comonomer content, a composition distribution of a copolymer composition is dependent on the identity of the catalyst or catalyst system used to form the polyolefins of the composition. Ziegler-Natta catalysts and chromium based catalysts produce compositions with broad composition distributions (BCD), whereas metallocene catalysts typically produce compositions with narrow composition distributions (NCD). Furthermore, catalyst systems can employ multiple metallocene catalysts simultaneously. This enables the overall comonomer content and composition distribution of the polymerization system and polymers thereof to be adjusted as desired. Accordingly new metallocene catalysts with unique narrow composition distributions and unique comonomer content are needed.

Nonetheless, polyolefin compositions formed by catalysts capable of forming low molecular weight polyolefins typically can have a narrow molecular weight distribution (MWD), as indicated by low polydispersity indices, and have low comonomer content. For example, xylene-bridged binuclear titanocenes for styrene and ethylene homopolymerization provide polymer compositions having PDI values of from 2.1 to 2.5. (Noh, et al., J. Organomet. Chem. 2006, 691, 5000).

Polyolefin compositions formed by catalysts capable of forming high molecular weight polyolefins typically are of such high molecular weight (e.g., Mn of 1,500,000) as to have processing difficulties due to hardness. Furthermore, catalysts capable of forming high molecular weight polyolefins typically have low activity (e.g., amount of desirable polymer produced per a period of time). For example, p-xylene bridged bimetallic zirconocenes and titanocenes were shown to have much lower activity ($1.38\times10^{-5}$ g PE/mol Cat h and $2.09\times10^{-5}$ g PE/mol Cat h) than ether bridged bimetallic zirconocenes and titanocenes due to steric hindrance provided by the p-xylene bridge, preventing access to the coordination site, which slows the propagation rate. (F. Lin, et al., Eur. Polym. J. 2007, 43, 1436-1443). Furthermore, p-xylene bridged titanocenes and zirconocenes were shown to have activity that is three times lower than biphenyl bridged bimetallic titanocenes and zirconocenes due to the increased steric hindrance (between the metal atoms) provided by the p-xylene bridge as compared to the biphenyl bridge. (J. Sun, et al., Eur. Polym. J. 2006, 42, 1259-1265).

There is a need for catalysts having high activity and capable of forming polyolefins, for example, with high molecular weight and narrow but multimodal (e.g., broadened) molecular weight distribution. There is also a need for catalysts capable of forming polyolefins, for example, with low molecular weight, broad molecular weight distribution, and substantially uniform comonomer distribution.

SUMMARY OF THE INVENTION

The present disclosure provides catalysts represented by Formula (I).

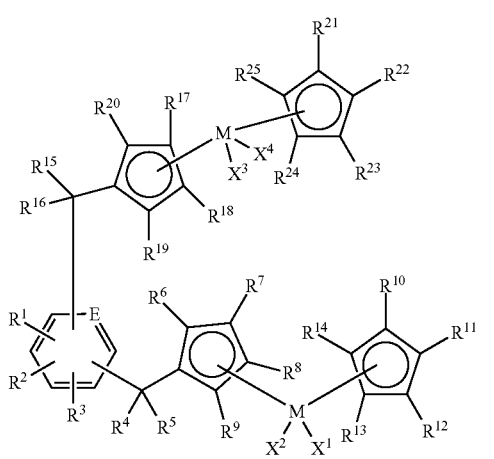

Each M is a group 4 metal;
E is C(H) or N;
Each of $X^1$, $X^2$, $X^3$, and $X^4$ is independently hydrogen, halogen, hydroxyl, $-N(C_1-C_{40}$ hydrocarbyl$)_2$, $C_1-C_{40}$ hydrocarbyl, or substituted $C_1-C_{40}$ hydrocarbyl;
Each of $R^1$, $R^2$, and $R^3$ is independently hydrogen, halogen, $C_1-C_{40}$ hydrocarbyl, substituted $C_1-C_{40}$ hydrocarbyl, $C_6-C_{10}$ aryl, substituted $C_6-C_{10}$ aryl, $-NR'_2$, $-SR'$, $-OR'$, $-OSiR'_3$, or $-PR'_2$, wherein each R' is hydrogen, halogen, $C_1-C_{10}$ alkyl, or $C_6-C_{10}$ aryl or one or both of $R^1$ and $R^2$ or $R^2$ and $R^3$ are joined to form a saturated ring, unsaturated ring, substituted saturated ring, or substituted unsaturated ring;

Each of $R^4$, $R^5$, $R^{15}$, and $R^{16}$ is independently hydrogen or $C_1-C_{40}$ hydrocarbyl; and Each of $R^6$, $R^7$, $R^8$, $R^9$, $R^{10}$, $R^{11}$, $R^{12}$, $R^{13}$, $R^{14}$, $R^{17}$, $R^{18}$, $R^{19}$, $R^{20}$, $R^{21}$, $R^{22}$, $R^{23}$, $R^{24}$, and $R^{25}$ is independently hydrogen, halogen, $C_1-C_{40}$ hydrocarbyl, substituted $C_1-C_{40}$ hydrocarbyl, $C_6-C_{10}$ aryl, substituted $C_6-C_{10}$ aryl, $-NR'_2$, $-SR'$, $-OR'$, $-OSiR'_3$, or $-PR'_2$, wherein each R' is hydrogen, halogen, $C_1-C_{10}$ alkyl, or $C_6-C_{10}$ aryl, or one or more of $R^6$ and $R^7$, $R^7$ and $R^8$, $R^8$ and $R^9$, $R^1$ and $R^{11}$, $R^{11}$ and $R^{12}$, $R^{12}$ and $R^{13}$, $R^{13}$ and $R^{14}$, $R^{17}$ and $R^{18}$, $R^{18}$ and $R^{19}$, $R^{17}$ and $R^{20}$, $R^{21}$ and $R^{22}$, $R^{22}$ and $R^{23}$, $R^{23}$ and $R^{24}$, $R^{24}$ and $R^{25}$, and $R^{21}$ and $R^{25}$ are joined to form a saturated ring, unsaturated ring, substituted saturated ring, or substituted unsaturated ring.

If E is C(H), then one or more of $R^6$ and $R^7$, $R^7$ and $R^8$, $R^8$ and $R^9$, $R^{10}$ and $R^{11}$, $R^{11}$ and $R^{12}$, $R^{12}$ and $R^{13}$, $R^{13}$ and $R^{14}$, $R^{17}$ and $R^{18}$, $R^{18}$ and $R^{19}$, $R^{17}$ and $R^{20}$, $R^{21}$ and $R^{22}$, $R^{22}$ and $R^{23}$, $R^{23}$ and $R^{24}$, $R^{24}$ and $R^{25}$, and $R^{21}$ and $R^{25}$ are joined to form a saturated ring, unsaturated ring, substituted saturated ring, or substituted unsaturated ring.

In yet another embodiment, the present disclosure provides a catalyst system comprising an activator and a catalyst of the present disclosure.

In yet another embodiment, the present disclosure provides a catalyst system comprising an activator, a catalyst support, and a catalyst of the present disclosure.

In still another embodiment, the present disclosure provides a polymerization process comprising a) contacting one or more olefin monomers with a catalyst system comprising: i) an activator and ii) a catalyst of the present disclosure.

In still another embodiment, the present disclosure provides a polyolefin formed by a catalyst system and or method of the present disclosure.

DETAILED DESCRIPTION OF THE INVENTION

Figure 1:
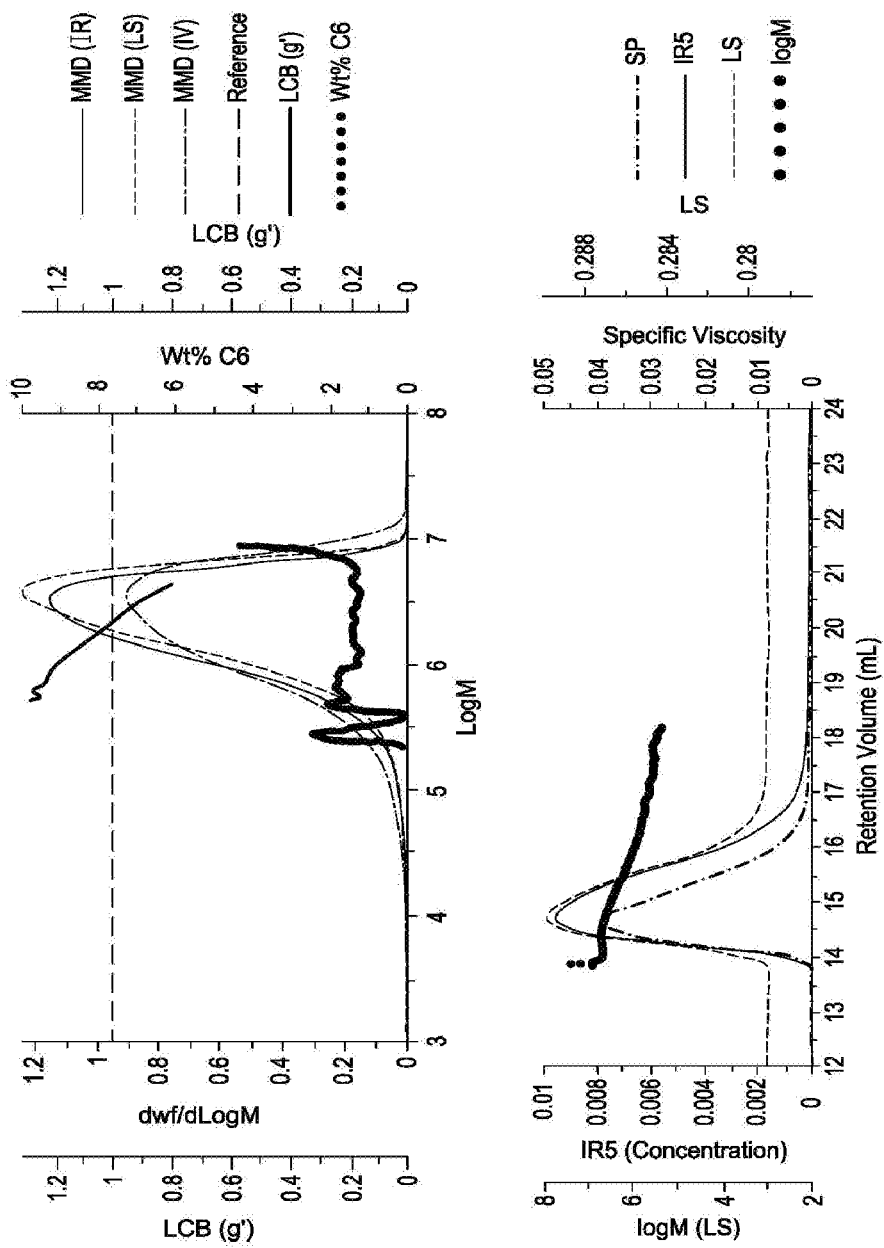
FIG. 1 is a gel permeation chromatography spectrum of the ethylene hexene copolymer formed by a catalyst system having a pyridyl tether catalyst, according to one embodiment.

Catalyst compounds of the present disclosure are bimetallic catalysts having a phenyl or pyridyl tether linking the two metal-containing groups of a catalyst compound. Catalysts of the present disclosure can be bimetallic having a pyridyl tether to provide high activity (e.g., from 0.1 kg/mol*h or greater) and can be capable of forming polyolefins, for example, with high molecular weight (e.g., Mw of 2,000,000 to 3,000,000), long chain branching (e.g., g'vis of 0.88 to 0.93) and broadened molecular weight distribution (e.g., Mw/Mn value of 2 to 9) as compared to single site catalysts. Alternatively, catalysts of the present disclosure can be bimetallic having a phenyl tether to provide formation of polyolefins, for example, with low molecular weight (e.g., Mw of 100,000 to 500,000), and low comonomer incorporation.

The specification describes catalysts that can be transition metal complexes. The term complex is used to describe molecules in which an ancillary ligand is coordinated to a central transition metal atom. The ligand is bulky and persistently bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

For the purposes of the present disclosure, the numbering scheme for the Periodic Table Groups is used as described in Chemical and Engineering News, 63(5), pg. 27 (1985). Therefore, a "Group 8 metal" is an element from Group 8 of the Periodic Table, e.g., iron.

The following abbreviations are used through this specification: o-biphenyl is an ortho-biphenyl moiety represented by the structure

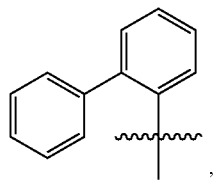 [SMILES: *c1ccccc1-c1ccccc1]

, dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as thf) is tetrahydrofuran, RT is room temperature (and is 20-24° C. unless otherwise indicated), tol is toluene, EtOAc is ethyl acetate, and Cy is cyclohexyl.

The term "substituted" means that at least one hydrogen atom has been replaced with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The terms "hydrocarbyl radical," "hydrocarbyl," "hydrocarbyl group," "alkyl radical," and "alkyl" are used interchangeably throughout this disclosure. Likewise, the terms "group", "radical", and "substituent" are also used interchangeably in this disclosure. For purposes of this disclosure, "hydrocarbyl radical" is defined to be C$_1$-C$_{100}$ radicals, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl and the like including their substituted analogues.

The term "arylalkenyl" means an aryl group where a hydrogen has been replaced with an alkenyl or substituted alkenyl group. For example, styryl indenyl is an indene substituted with an arylalkenyl group (a styrene group).

The term "alkoxy", "alkoxyl", or "alkoxide" means an alkyl ether or aryl ether radical wherein the term alkyl is as defined above. Examples of suitable alkyl ether radicals can include methoxy, ethoxy, n-propoxy, iso-propoxy, n-butoxy, iso-butoxy, sec-butoxy, tert-butoxy, phenoxy, and the like.

The term "aryl" or "aryl group" means a carbon-containing aromatic ring and the substituted variants thereof can include phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "arylalkyl" means an aryl group where a hydrogen has been replaced with an alkyl or substituted alkyl group. For example, 3,5'-di-tert-butyl-phenyl indenyl is an indene substituted with an arylalkyl group.

The term "alkylaryl" means an alkyl group where a hydrogen has been replaced with an aryl or substituted aryl group. For example, phenethyl indenyl is an indene substituted with an ethyl group bound to a benzene group.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

The term "ring atom" means an atom that is part of a cyclic ring structure. Accordingly, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

For purposes of the present disclosure, a "catalyst system" is a combination of at least one catalyst compound, an activator, and an optional support material. The catalyst systems may further comprise one or more additional catalyst compounds. The terms "mixed catalyst system", "dual catalyst system", "mixed catalyst", and "supported catalyst system" may be used interchangeably herein with "catalyst system." For the purposes of the present disclosure, when catalyst systems are described as comprising neutral stable forms of the components, it is well understood by one of ordinary skill in the art, that the ionic form of the component is the form that reacts with the monomers to produce polymers. Catalysts represented by Formula (I) of the present disclosure are intended to embrace ionic (e.g., cationic) forms thereof of the compounds in addition to the neutral forms of the compounds.

"Neutral radical anionic product" is a neutral complex containing a radical anion (e.g., a radical anion may reside on the ligand structure).

"Complex" as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be premixed with the transition metal compound to form an alkylated transition metal compound.

Non-coordinating anion (NCA) means an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metalloids can include boron, aluminum, phosphorus, and silicon. The term non-coordinating anion activator includes neutral activators, ionic activators, and Lewis acid activators.

In the description herein, a metallocene catalyst may be described as a catalyst precursor, a pre-catalyst compound, metallocene catalyst compound or a transition metal compound, and these terms are used interchangeably. A polymerization catalyst system is a catalyst system that can polymerize monomers into polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of the present disclosure, in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$hr$^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole (or mmol) of catalyst (cat) used (kgP/molcat or gP/mmolCat), and catalyst activity can also be expressed per unit of time, for example, per hour (h) with units, for example, kgP/molcat*h.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have a "propylene" content of 35 weight percent to 55 weight percent, it is understood that the mer unit in the copolymer is derived from propylene in the polymerization reaction and the derived units are present at 35 weight percent to 55 weight percent, based upon the weight of the copolymer.

For purposes herein a "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, copolymer, as used herein, can include terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Furthermore, Mz/Mn indicates viscosity of a polymer. For example, a high Mz/Mn value indicates a low viscosity whereas a low Mz/Mn value indicates high viscosity. Accordingly, a polymer with a larger Mz/Mn ratio would be expected to have a lower viscosity at high shear rates than a polymer with a similar weight average molecular weight but a smaller Mz/Mn ratio.

The term "continuous" means a system that operates without interruption or cessation for a period of time, preferably where reactants are continually fed into a reaction zone and products are continually or regularly withdrawn without stopping the reaction in the reaction zone. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res., 2000, 29, 4627.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

Catalysts

In at least one embodiment, the present disclosure provides bimetallic catalysts having a tether. A tether can have be a pyridyl or phenyl group.

In at least one embodiment, the present disclosure provides a catalyst compound, and catalyst systems comprising such compounds, represented by formula (I). In at least one embodiment, the catalyst compound represented by formula (I) is represented by formula (Ia).

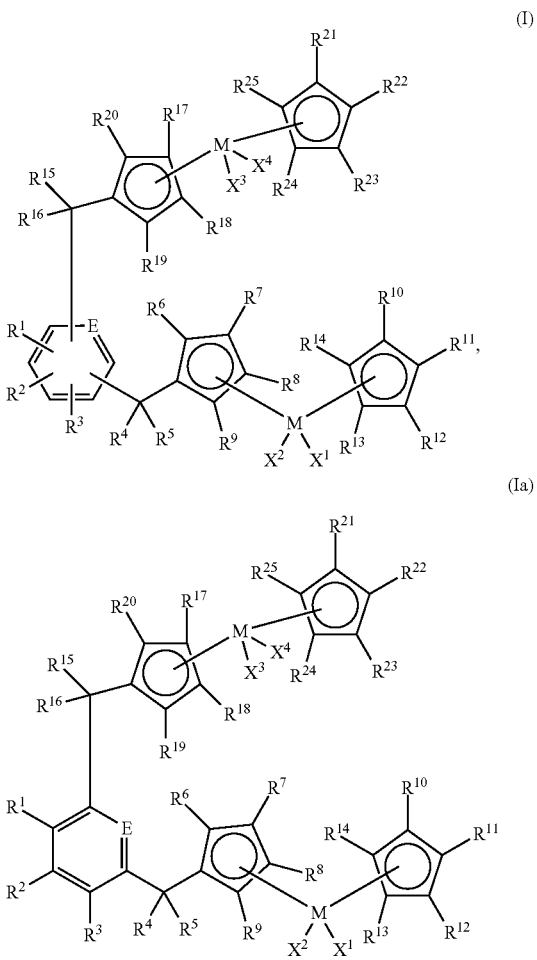

In formulas (I) and (Ia):

Each M is a group 4 metal. In at least one embodiment, M is hafnium or zirconium.

Each of $X^1$, $X^2$, $X^3$, and $X^4$ is independently hydrogen, halogen, hydroxyl, $-N(C_1-C_{40}$ hydrocarbyl$)_2$, $C_1-C_{40}$ hydrocarbyl, or substituted $C_1-C_{40}$ hydrocarbyl. In at least one embodiment, each of $X^1$, $X^2$, $X^3$, and $X^4$ is independently halogen or $C_1-C_{40}$ hydrocarbyl. In at least one embodiment, $C_1-C_{40}$ hydrocarbyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

Each of $R^1$, $R^2$, and $R^3$ is independently hydrogen, halogen, $C_1-C_{40}$ hydrocarbyl, substituted $C_1-C_{40}$ hydrocarbyl, $C_6-C_{10}$ aryl, substituted $C_6-C_{10}$ aryl, $-NR'_2$, $-SR'$, $-OR'$, $-OSiR'_3$, or $-PR'_2$, wherein each R' is hydrogen, halogen, $C_1-C_{10}$ alkyl, or $C_6-C_{10}$ aryl or one or both of $R^1$ and $R^2$ or $R^2$ and $R^3$ are joined to form a saturated ring, unsaturated ring, substituted saturated ring, or substituted unsaturated ring. In at least one embodiment, each of $R^1$, $R^2$, and $R^3$ is independently hydrogen, $C_1-C_{40}$ hydrocarbyl, or substituted $C_1-C_{40}$ hydrocarbyl. In at least one embodiment, each of $R^1$, $R^2$, and $R^3$ is hydrogen. In at least one embodiment, $R^1$ and $R^3$ are hydrogen and $R^2$ is selected from halogen, $C_1-C_{40}$ hydrocarbyl, substituted $C_1-C_{40}$ hydrocarbyl, $C_6-C_{10}$ aryl, substituted $C_6-C_{10}$ aryl, $-NR'_2$, $-SR'$, $-OR'$, $-OSiR'_3$, or —PR'$_2$, wherein each R' is hydrogen, halogen, $C_1$-$C_{10}$ alkyl, or $C_6$-$C_{10}$ aryl. In at least one embodiment, $C_1$-$C_{40}$ hydrocarbyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

Each of $R^4$, $R^5$, $R^{15}$, and $R^{16}$ is independently hydrogen or $C_1$-$C_{40}$ hydrocarbyl. In at least one embodiment, each of $R^4$, $R^5$, $R^{15}$, and $R^{16}$ is hydrogen. In at least one embodiment, $C_1$-$C_{40}$ hydrocarbyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

Each of $R^6$, $R^7$, $R^8$, $R^9$, $R^{10}$, $R^{11}$, $R^{12}$, $R^{13}$, $R^{14}$, $R^{17}$, $R^{18}$, $R^{19}$, $R^{20}$, $R^{21}$, $R^{22}$, $R^{23}$, $R^{24}$, and $R^{25}$ is independently hydrogen, halogen, $C_1$-$C_{40}$ hydrocarbyl, substituted $C_1$-$C_{40}$ hydrocarbyl, $C_6$-$C_{10}$ aryl, substituted $C_6$-$C_{10}$ aryl, —NR'$_2$, —SR', —OR', —OSiR'$_3$, or —PR'$_2$, wherein each R' is hydrogen, halogen, $C_1$-$C_{10}$ alkyl, or $C_6$-$C_{10}$ aryl, or one or more of $R^6$ and $R^7$, $R^7$ and $R^8$, $R^8$ and $R^9$, $R^{10}$ and $R^{11}$, $R^{11}$ and $R^{12}$, $R^{12}$ and $R^{13}$, $R^{13}$ and $R^{14}$, $R^{17}$ and $R^{18}$, $R^{18}$ and $R^{19}$, $R^{17}$ and $R^{20}$, $R^{21}$ and $R^{22}$, $R^{22}$ and $R^{23}$, $R^{23}$ and $R^{24}$, $R^{24}$ and $R^{25}$, and $R^{21}$ and $R^{25}$ are joined to form a saturated ring, unsaturated ring, substituted saturated ring, or substituted unsaturated ring. In at least one embodiment, each of $R^{10}$, $R^{11}$, $R^{12}$, $R^{13}$, $R^{14}$, $R^{21}$, $R^{22}$, $R^{23}$, $R^{24}$, and $R^{25}$ is independently hydrogen or $C_1$-$C_2$ hydrocarbyl. In at least one embodiment, $C_1$-$C_{40}$ hydrocarbyl or $C_1$-$C_2$ hydrocarbyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

In at least one embodiment, each of $R^{10}$, $R^{11}$, $R^{12}$, $R^{13}$, and $R^{14}$ is methyl. Each of $R^{21}$, $R^{22}$, $R^{23}$, $R^{24}$, and $R^{25}$ can be methyl. Each of $R^{10}$, $R^1$, $R^{12}$, $R^{13}$, and $R^{14}$ can be hydrogen. In at least one embodiment, each of $R^{21}$, $R^{22}$, $R^{23}$, $R^{24}$, and $R^{25}$ is hydrogen. In at least one embodiment, each of $R^{10}$, $R^{11}$, $R^{12}$, and $R^{13}$ is hydrogen and $R^{14}$ is n-propyl. Each of $R^{21}$, $R^{22}$, $R^{23}$, and $R^{24}$ can be hydrogen and $R^{25}$ can be n-propyl.

In at least one embodiment, one or more of $R^6$ and $R^7$, $R^7$ and $R^8$, $R^8$ and $R^9$, $R^{17}$ and $R^{18}$, $R^{18}$ and $R^{19}$, $R^{17}$ and $R^{20}$ are joined to form a saturated ring, unsaturated ring, substituted saturated ring, or substituted unsaturated ring. In at least one embodiment, one of $R^6$ and $R^7$, $R^7$ and $R^8$, and $R^8$ and $R^9$ and one of $R^{17}$ and $R^{18}$, $R^{18}$ and $R^{19}$, $R^{17}$ and $R^{20}$ are joined to form a saturated ring, unsaturated ring, substituted saturated ring, or substituted unsaturated ring. In at least one embodiment, one of $R^6$ and $R^7$, $R^7$ and $R^8$, and $R^8$ and $R^9$ are joined to form a saturated ring or unsaturated ring substituted with one or more of halogen, $C_1$-$C_{40}$ hydrocarbyl, substituted $C_1$-$C_{40}$ hydrocarbyl, —NR'$_2$, —SR', —OR', —OSiR'$_3$, or —PR'$_2$, wherein each R' is hydrogen, halogen, $C_1$-$C_{10}$ alkyl, or $C_6$-$C_{10}$ aryl. In at least one embodiment, one of $R^{17}$ and $R^{18}$, $R^{18}$ and $R^{19}$, $R^{17}$ and $R^{20}$ are joined to form a saturated or unsaturated ring substituted with one or more of halogen, $C_1$-$C_{40}$ hydrocarbyl, substituted $C_1$-$C_{40}$ hydrocarbyl, —NR'$_2$, —SR', —OR', —OSiR'$_3$, or —PR'$_2$, wherein each R' is hydrogen, halogen, $C_1$-$C_{10}$ alkyl, or $C_6$-$C_{10}$ aryl. In at least one embodiment, $C_1$-$C_{40}$ hydrocarbyl or C-CM hydrocarbyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, iso- heptyl, sec-heptyl, n-octyl, isooctyl, sec-octyl, n-nonyl, isononyl, sec-nonyl, n-decyl, isodecyl, or sec-decyl.

E is C(H) or N. If E is C(H), then one or more of $R^6$ and $R^7$, $R^7$ and $R^8$, $R^8$ and $R^9$, $R^{10}$ and $R^{11}$, $R^{11}$ and $R^{12}$, $R^{12}$ and $R^{13}$, $R^{13}$ and $R^{14}$, $R^{17}$ and $R^{18}$, $R^{18}$ and $R^{19}$, $R^{17}$ and $R^{20}$, $R^{21}$ and $R^{22}$, $R^{22}$ and $R^{23}$, $R^{23}$ and $R^{24}$, $R^{24}$ and $R^{25}$, and $R^{21}$ and $R^{25}$ are joined to form a saturated ring, unsaturated ring, substituted saturated ring, or substituted unsaturated ring. In at least one embodiment, E is N and each of $R^6$, $R^7$, $R^8$, $R^9$, $R^{17}$, $R^{18}$, $R^{19}$, and $R^{20}$ is hydrogen.

In at least one embodiment, the catalyst represented by formula (I) or formula (a) is one or more of:

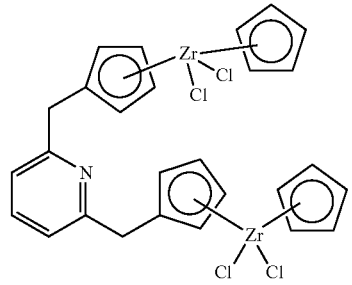

1

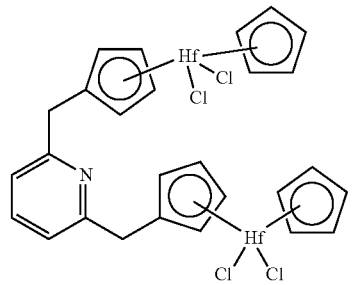

2

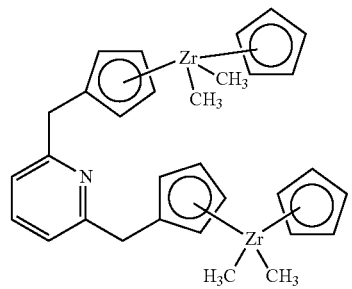

3

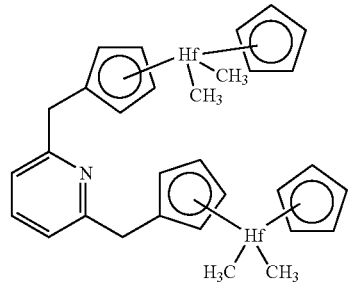

4

5
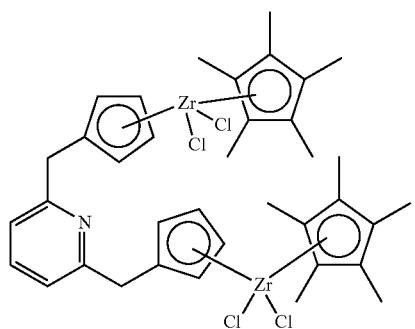
6
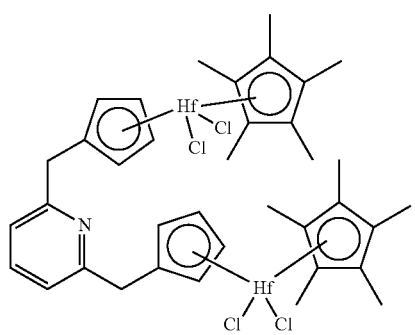
7
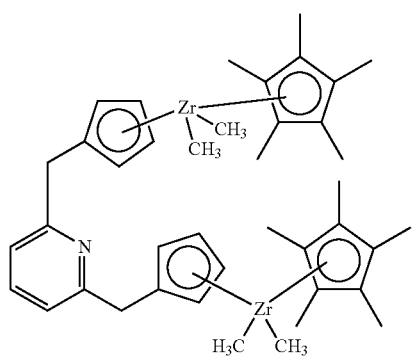
8
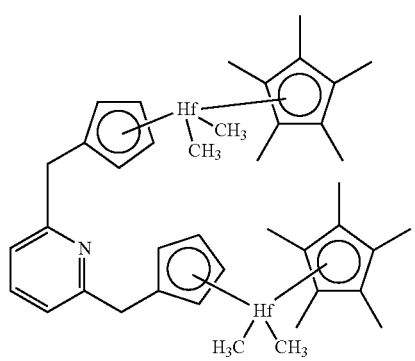
9
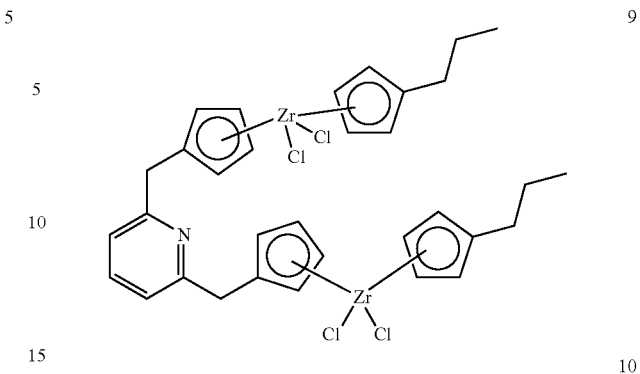
10
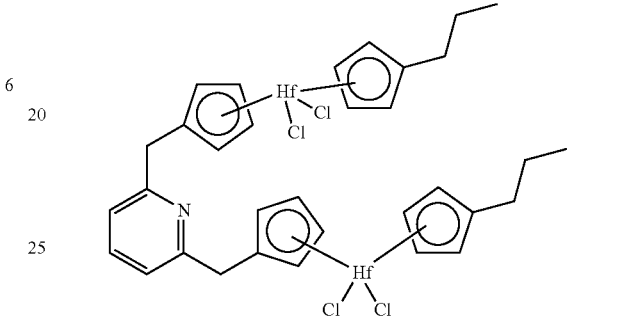
11
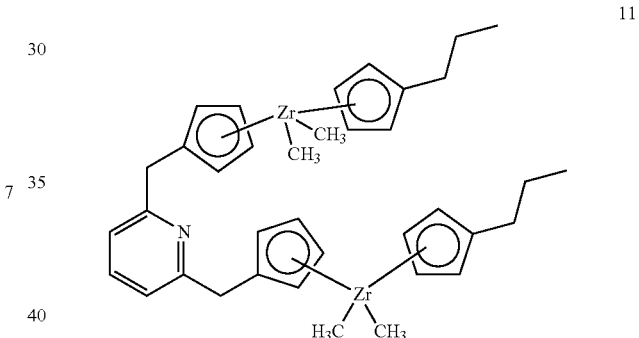
12
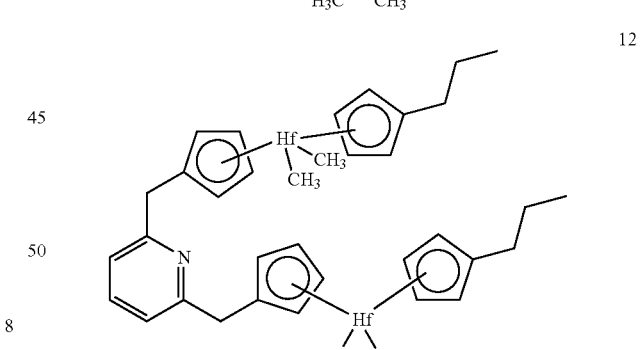
13
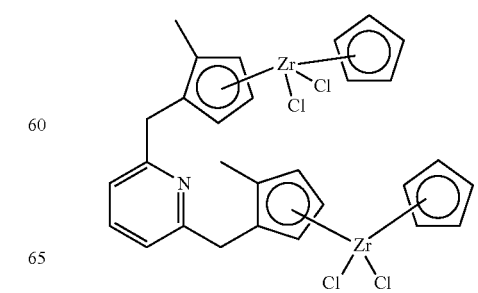

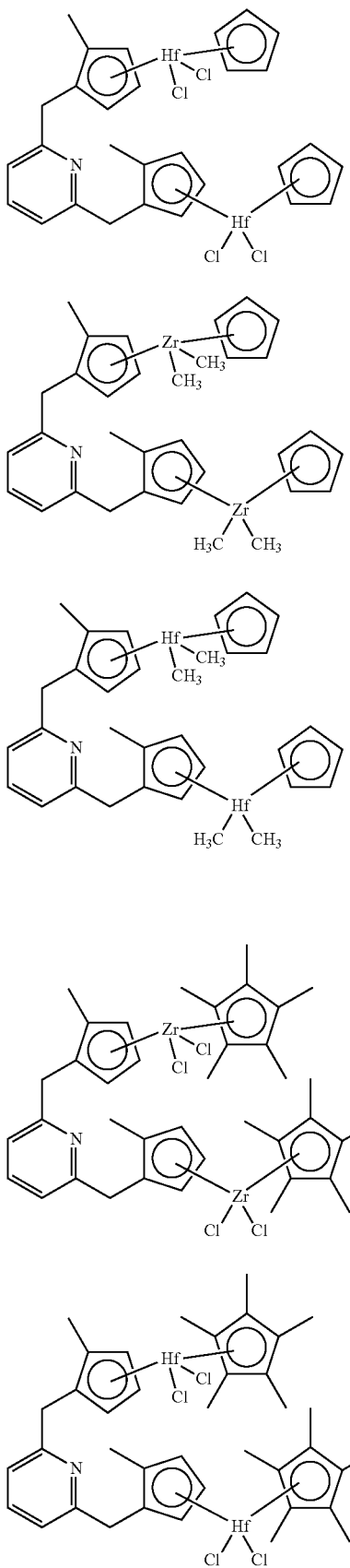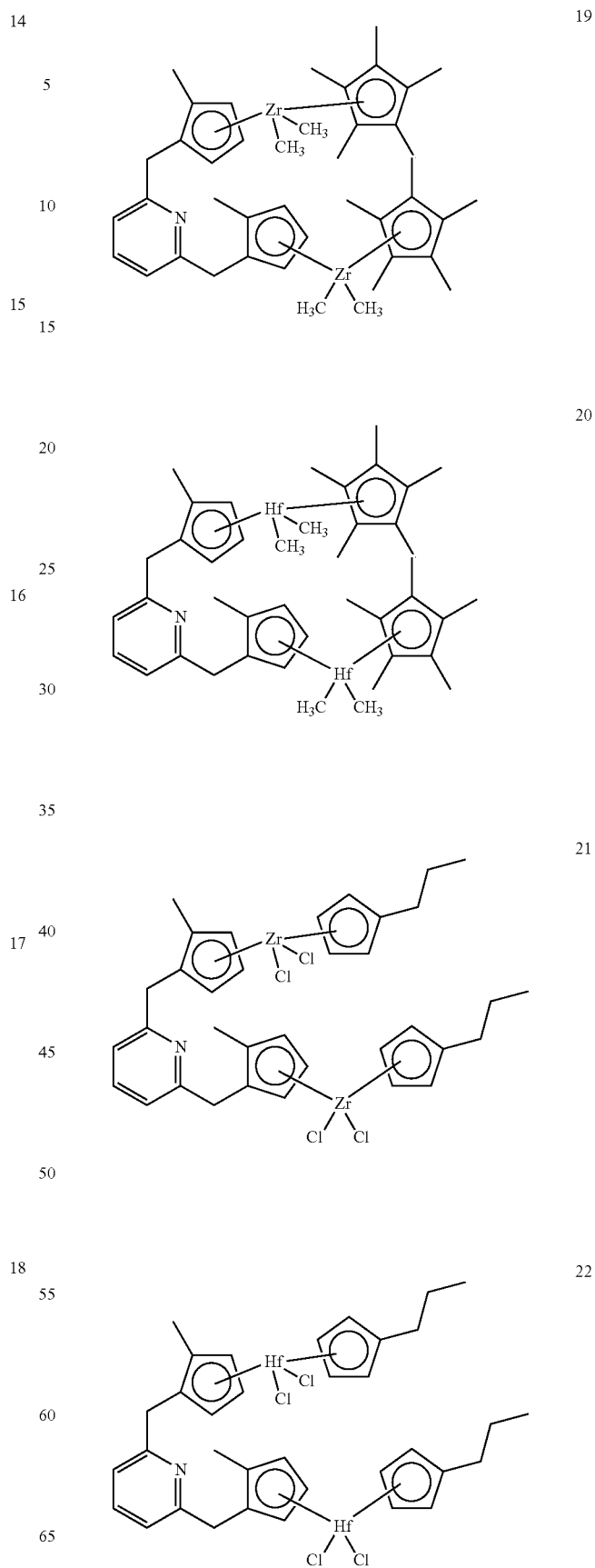

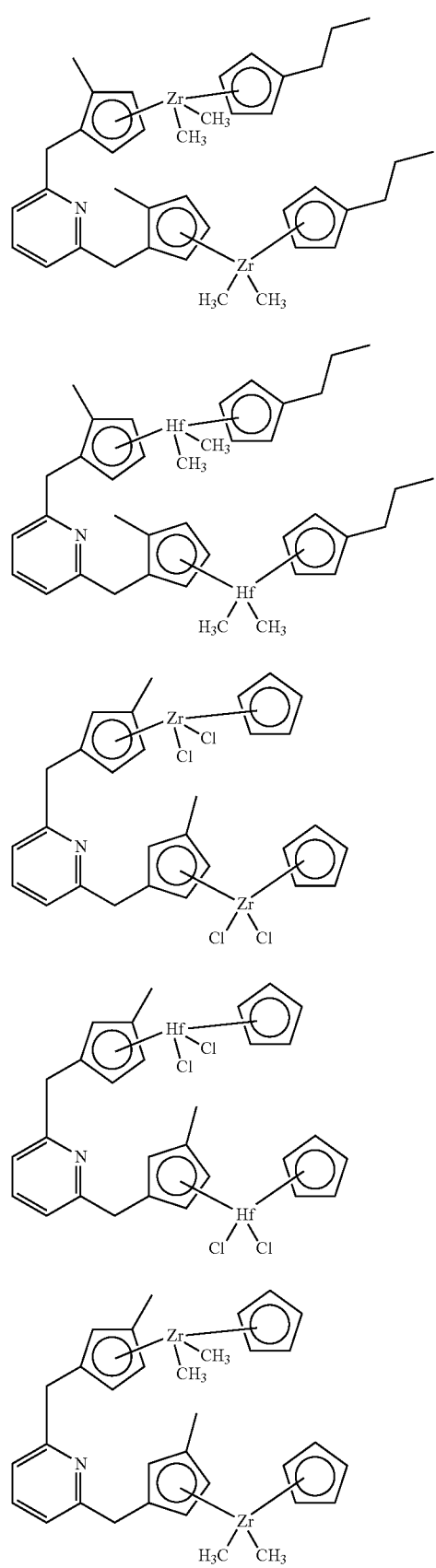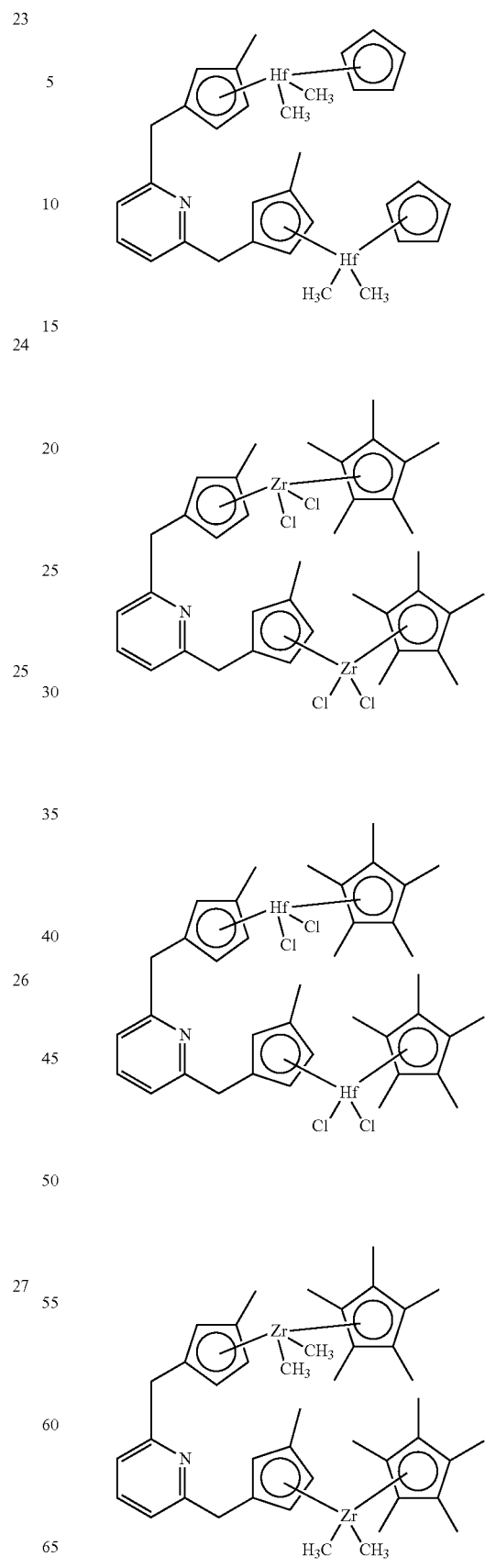

-continued
32
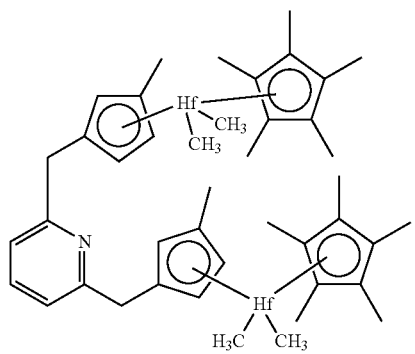
33
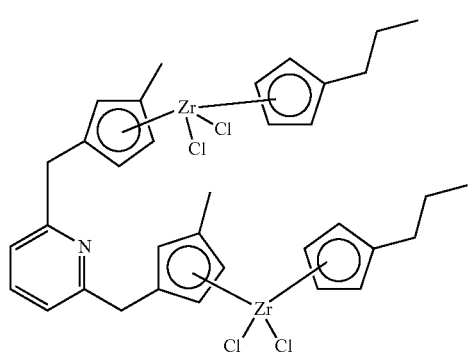
34
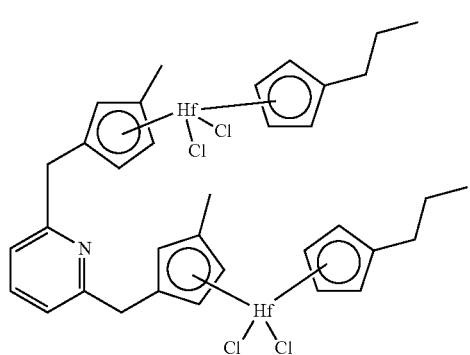
35
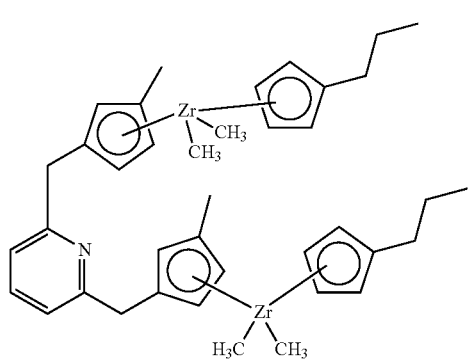
-continued
36
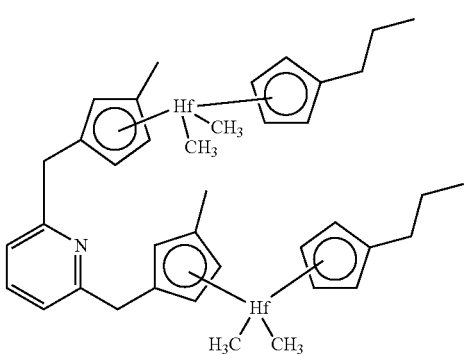
37
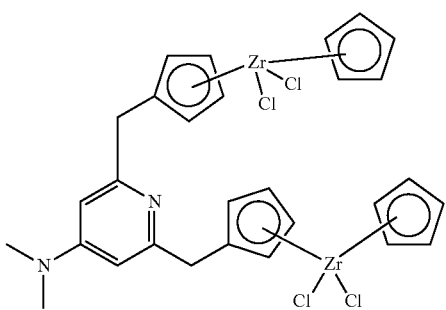
38
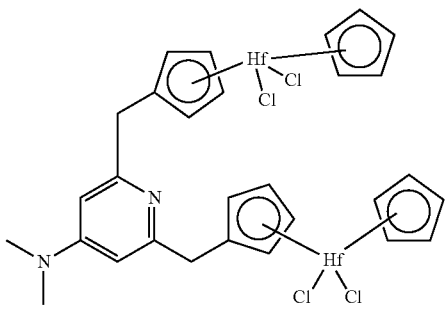
39
40
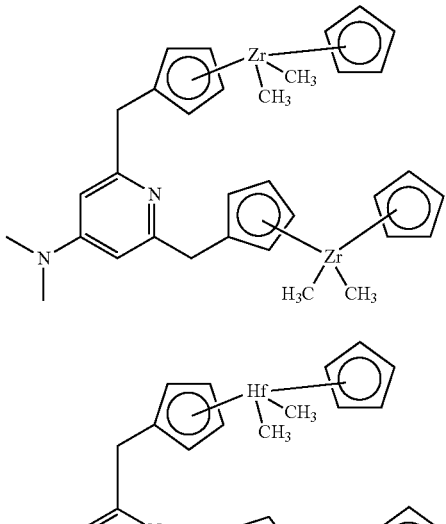

41
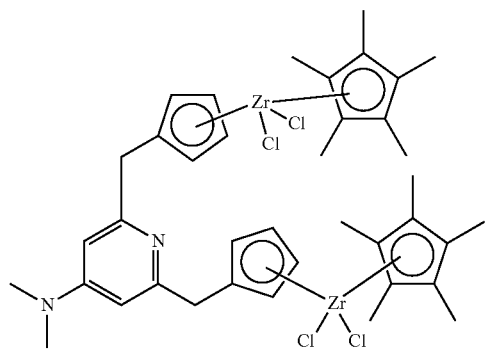
42
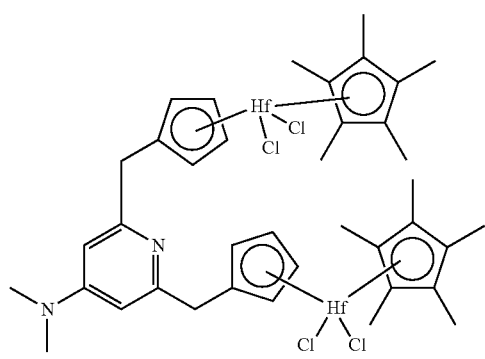
43
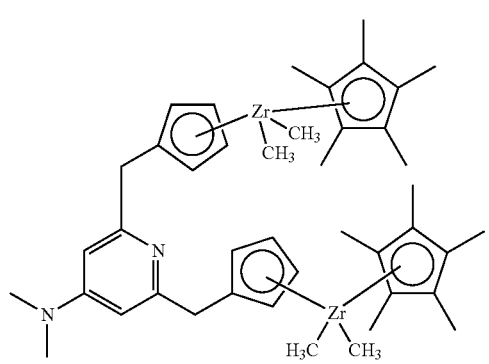
44
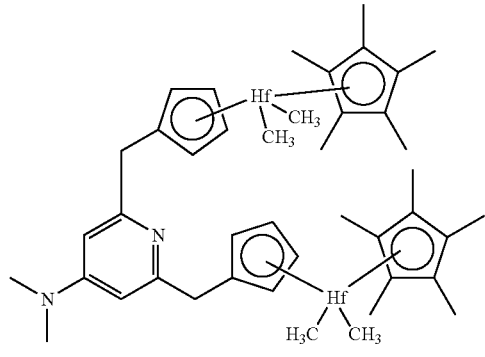
45
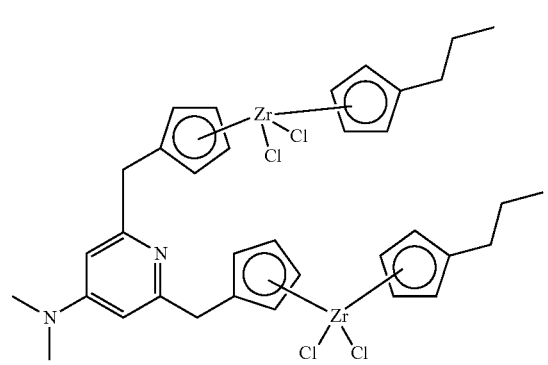
46
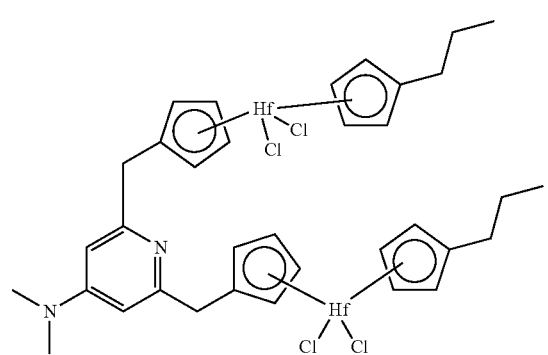
47
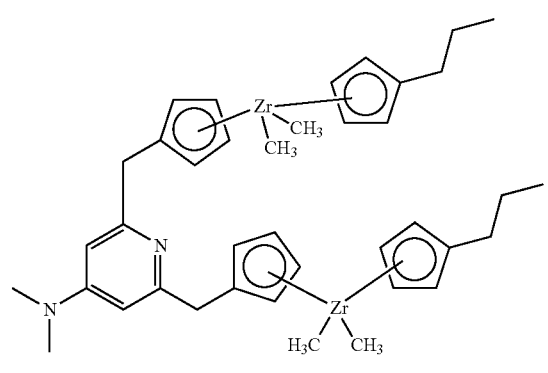
48
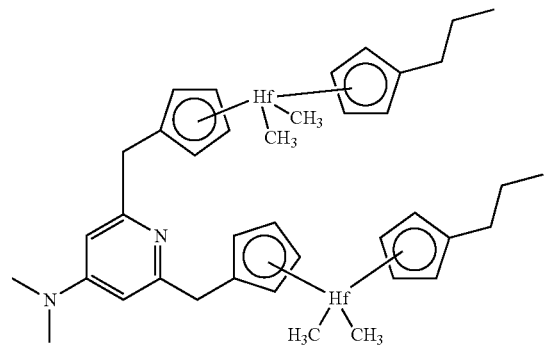

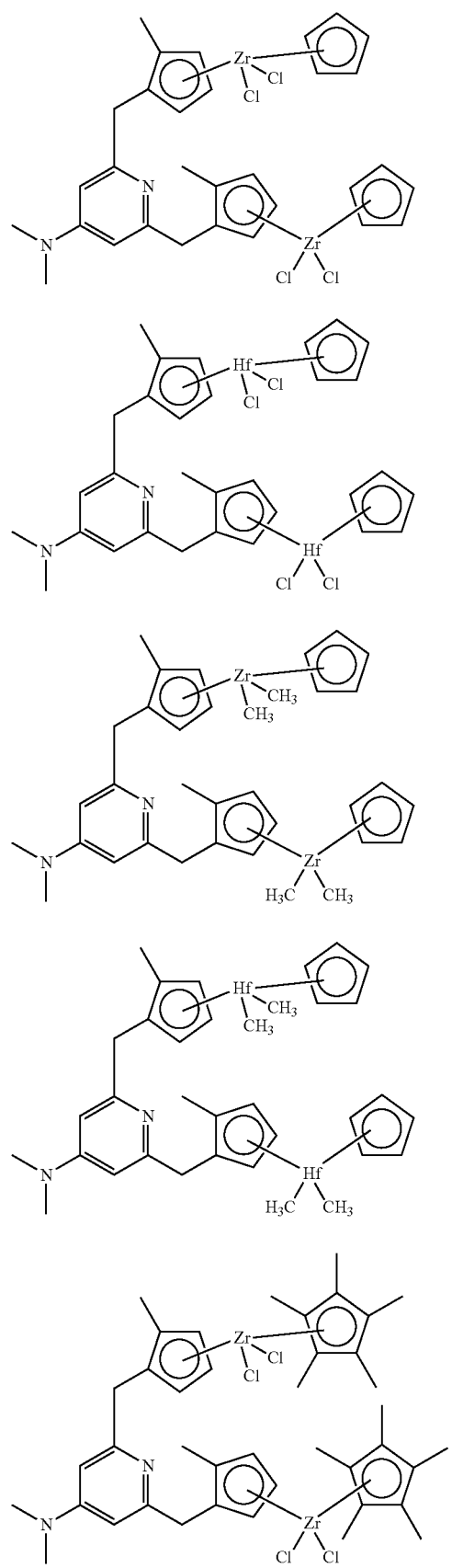
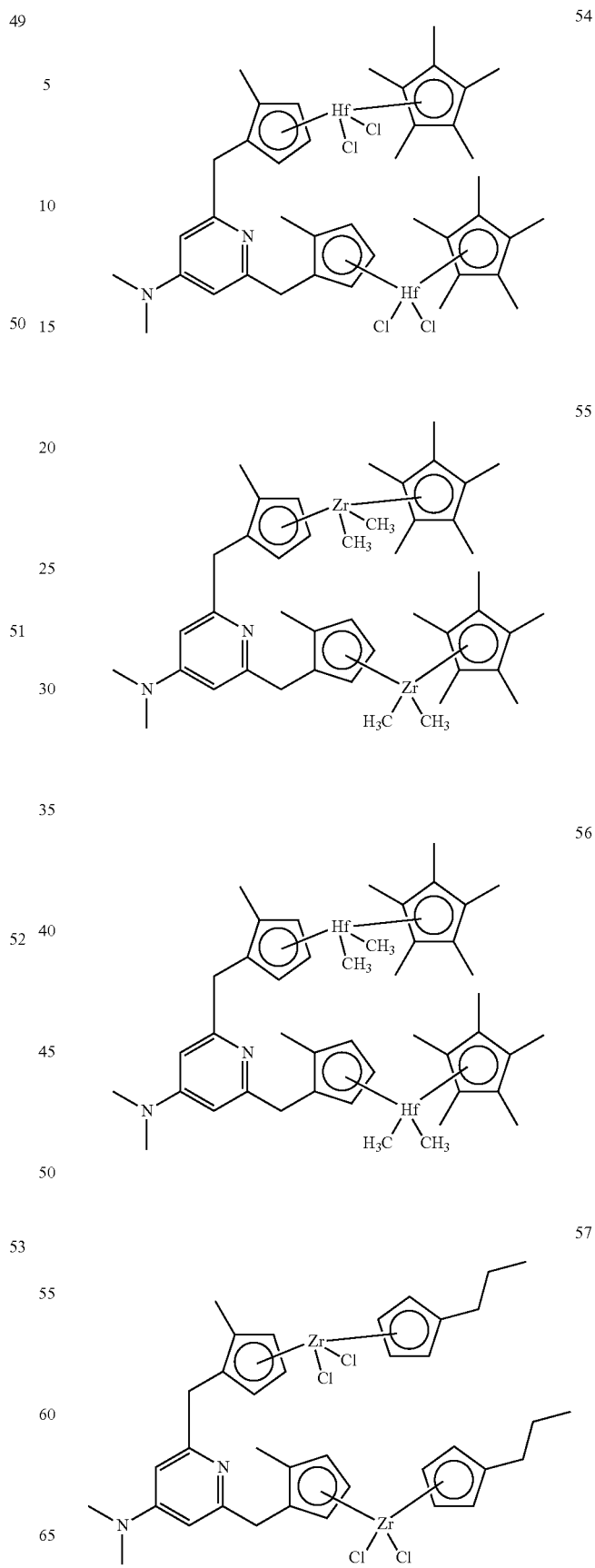

58
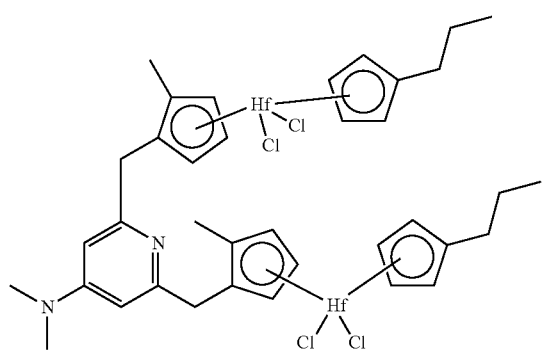
59
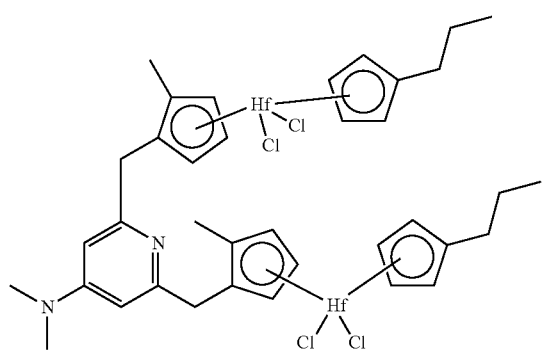
60
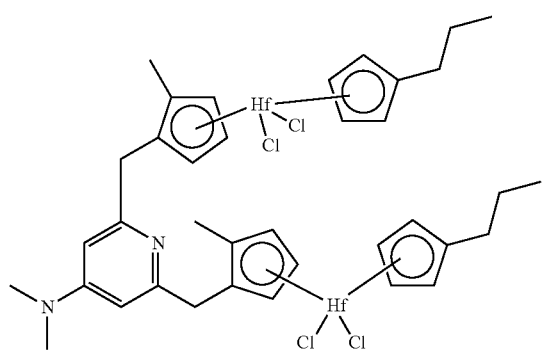
61
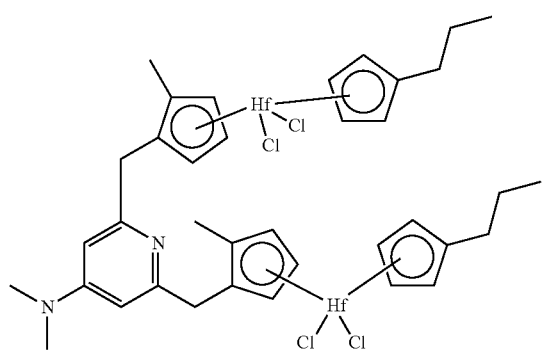
62
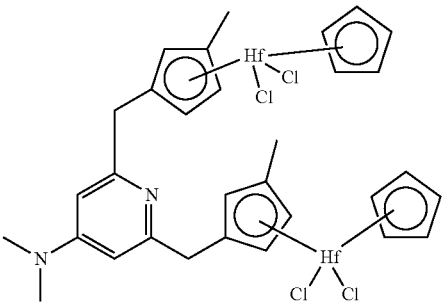
63
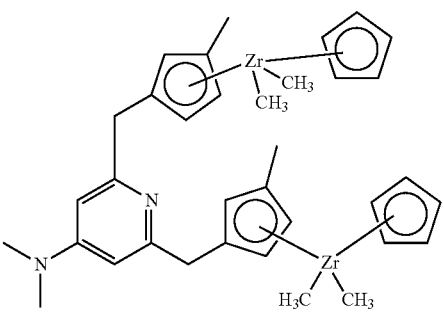
64
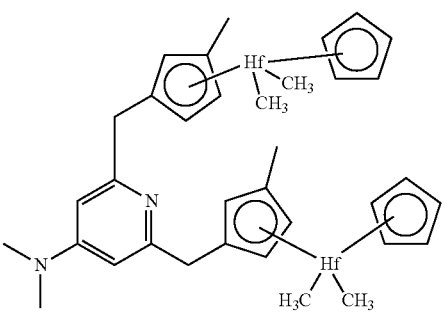
65
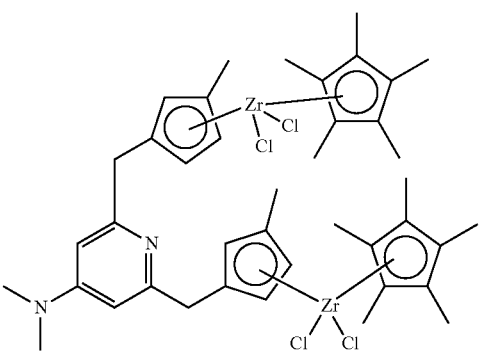
66
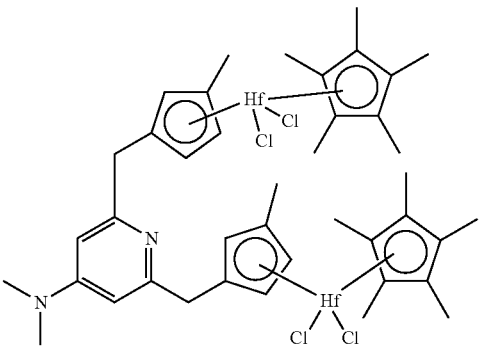

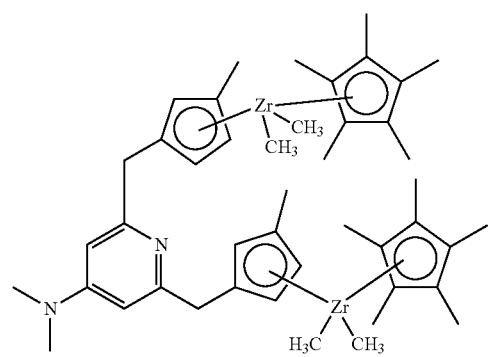
67
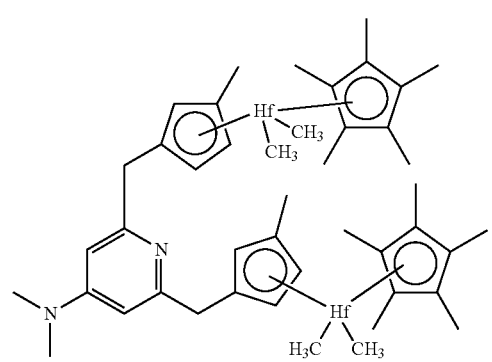
68
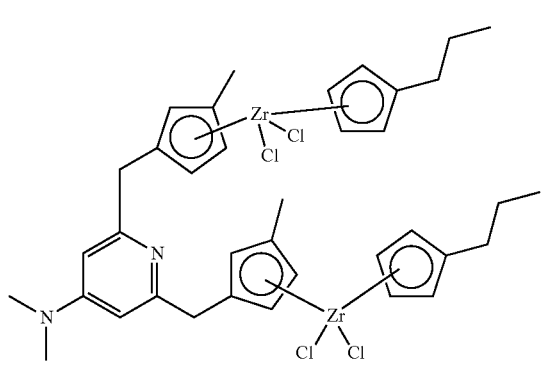
69
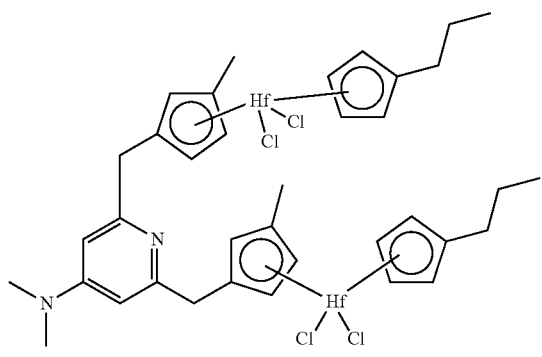
70
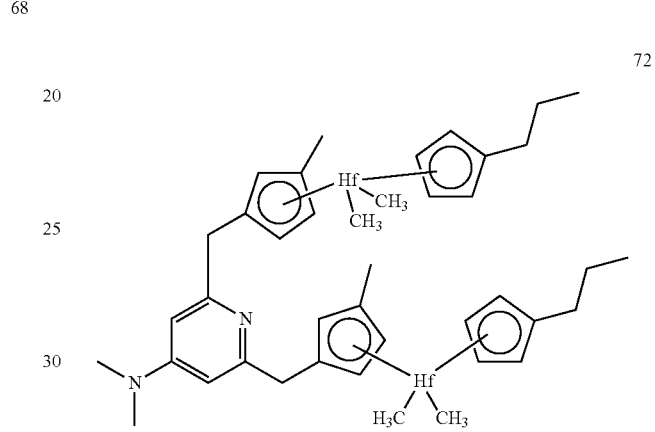
71
72
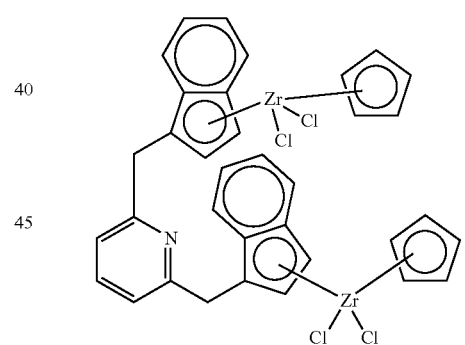
73
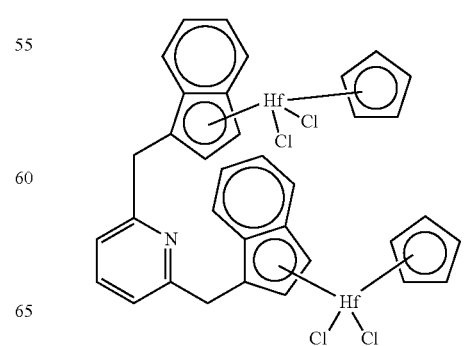
74

75
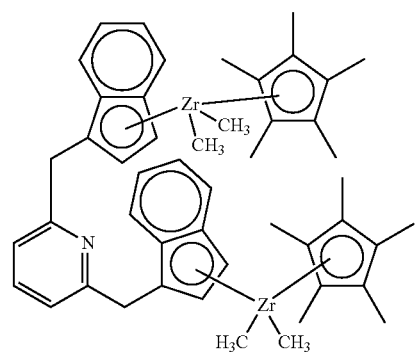
79
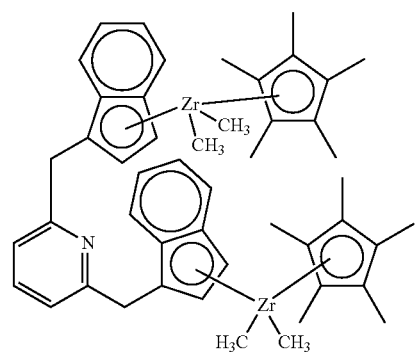
76
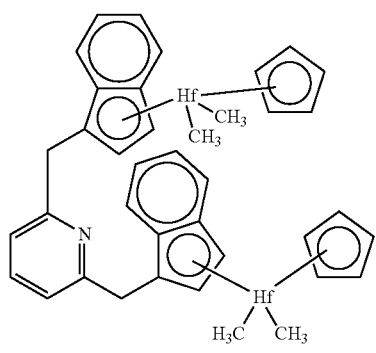
80
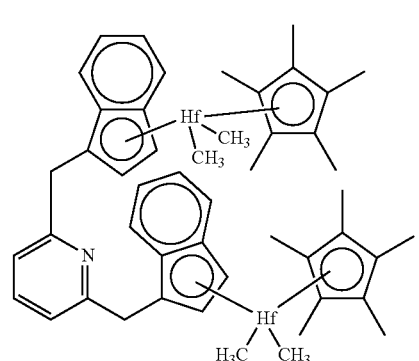
77
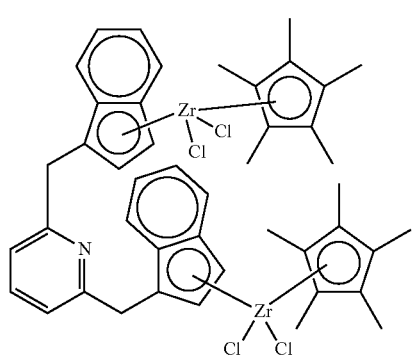
81
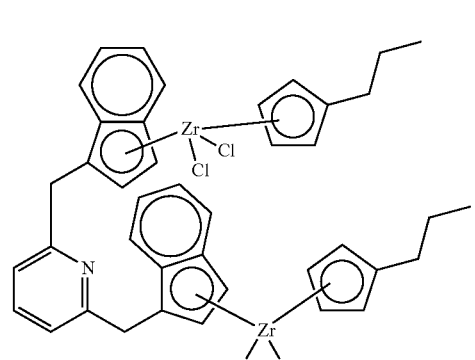
78
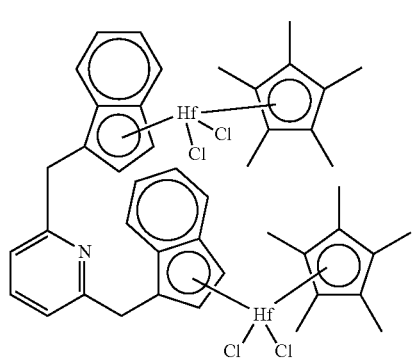
82
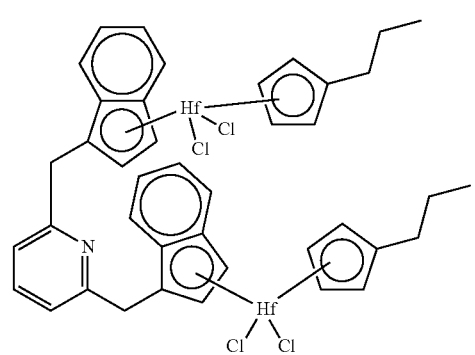

83
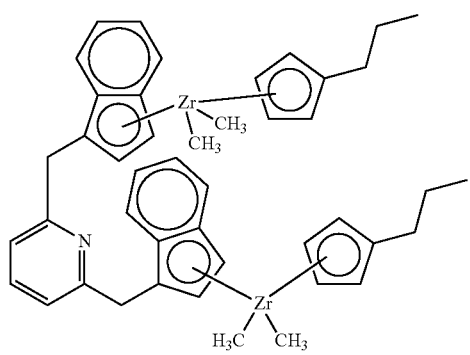
84
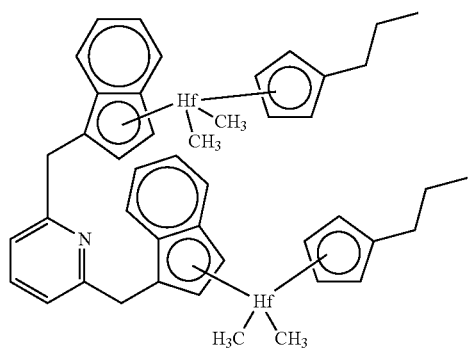
In at least one embodiment, the catalyst represented by formula (I) is one or more of:
1
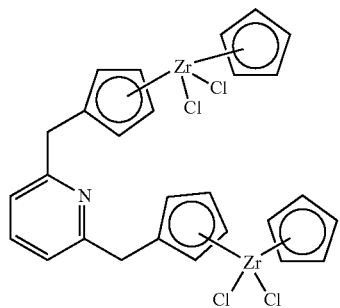
5
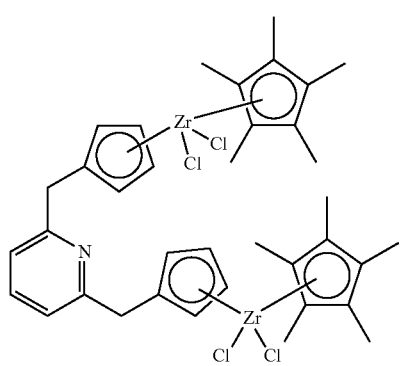
6
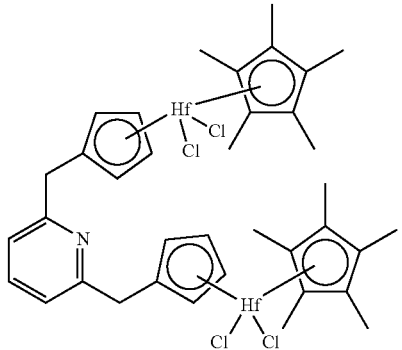
7
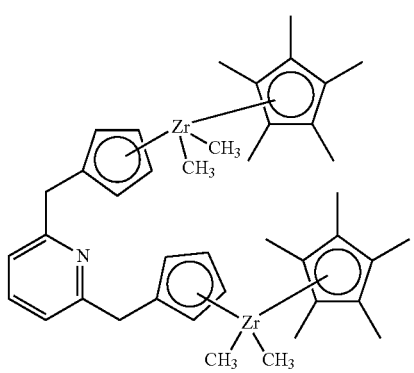
9
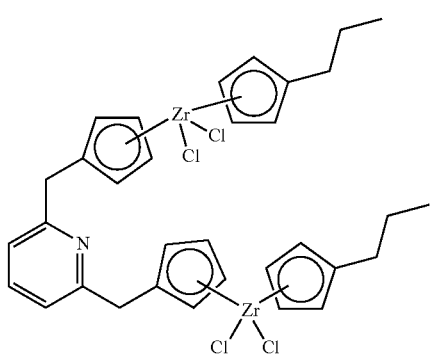
10
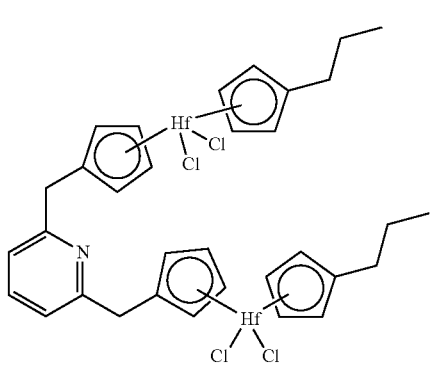
In at least one embodiment, the catalyst represented by formula (I) is one or more of:

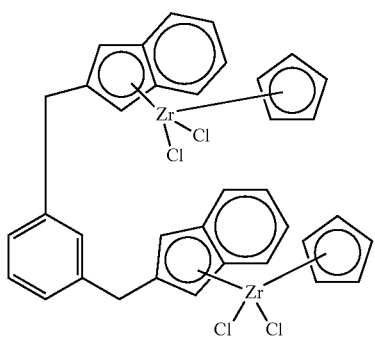
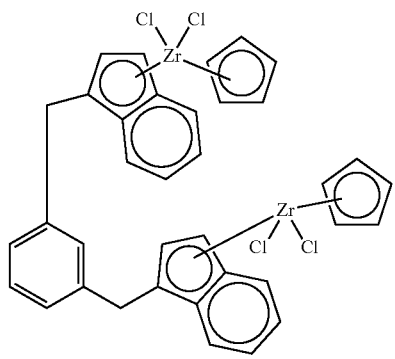
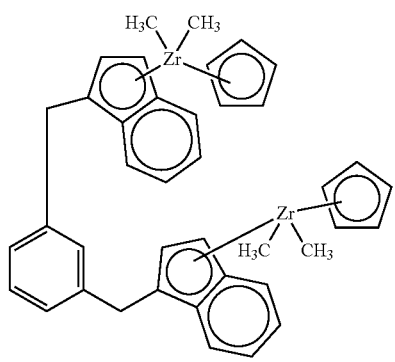
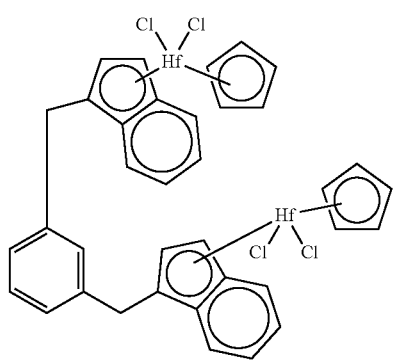
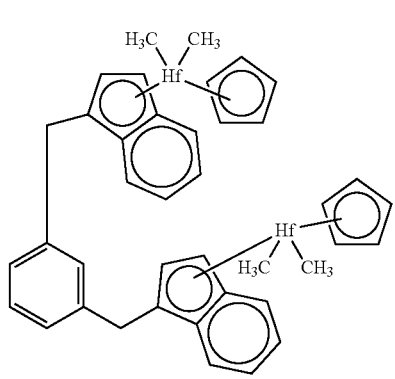

-continued
9
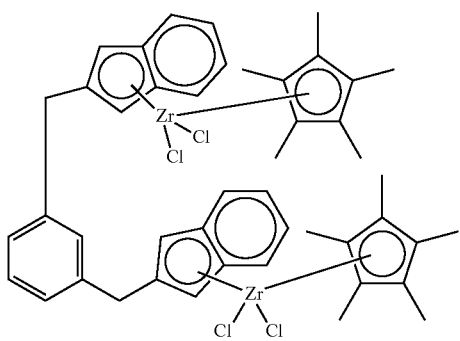
10
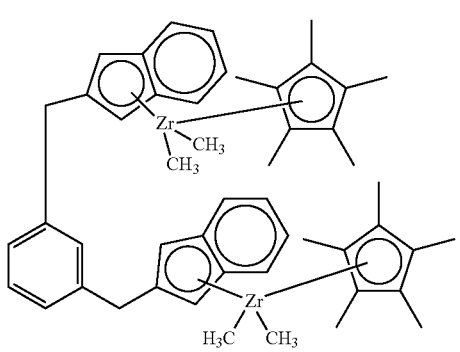
11
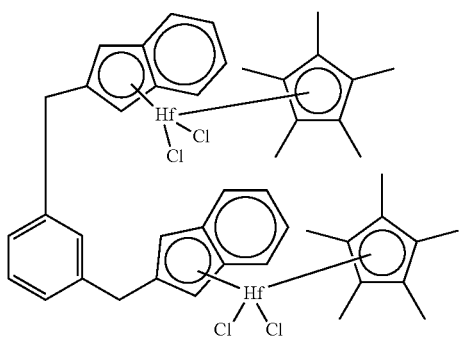
12
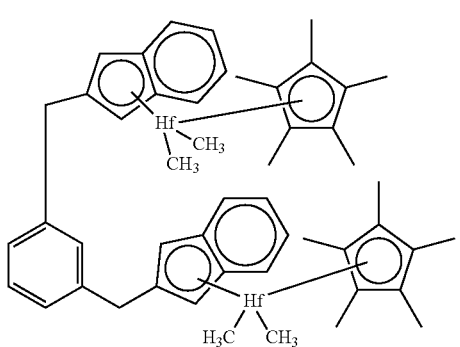
-continued
13
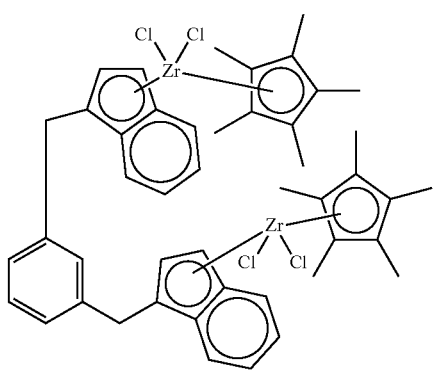
14
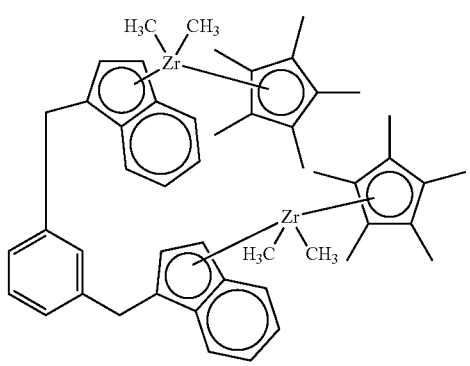
15
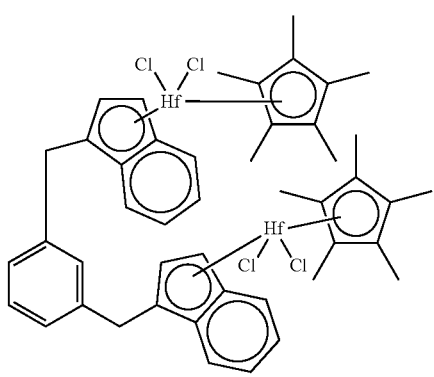
16
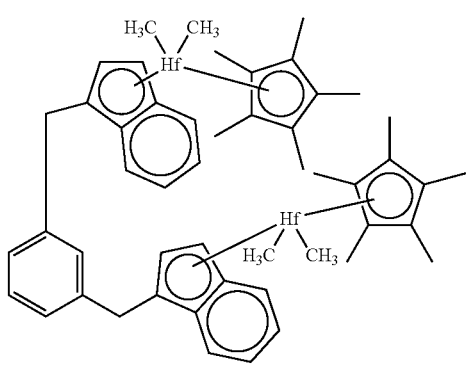

17
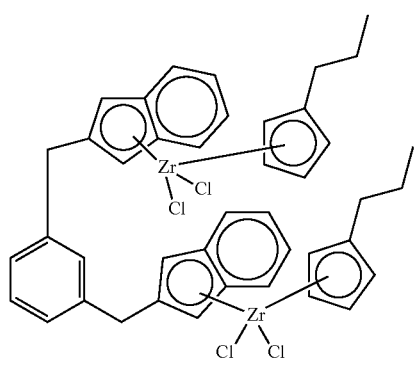
18
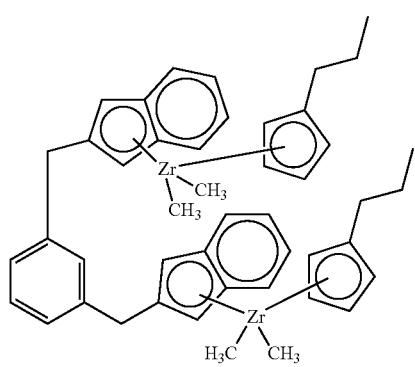
19
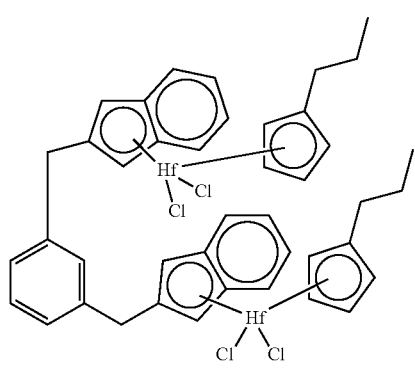
20
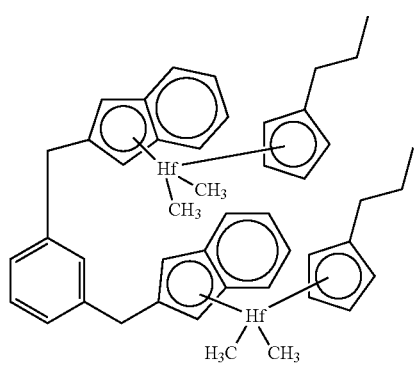
21
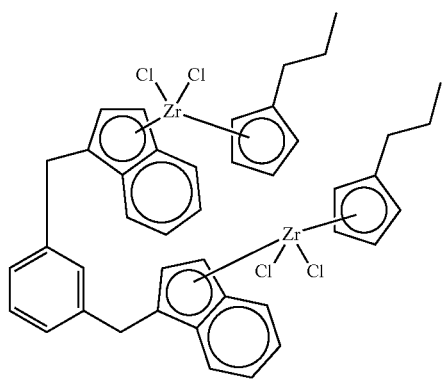
22
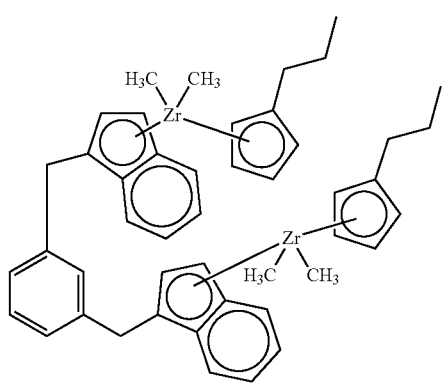
23
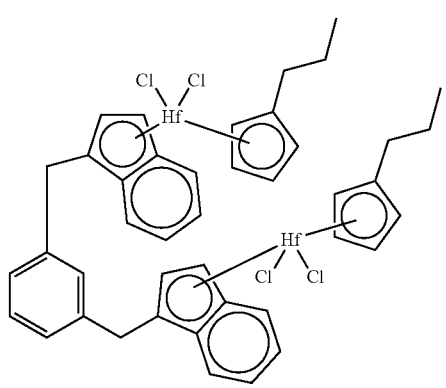
24
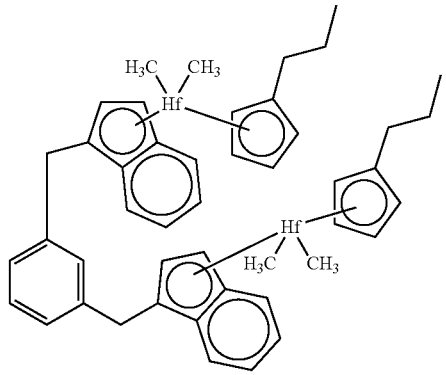

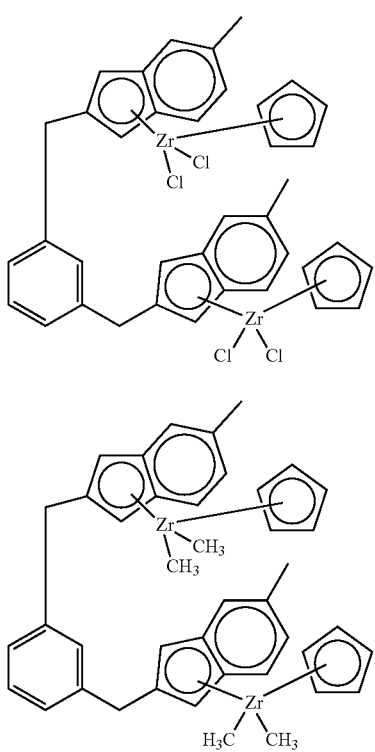
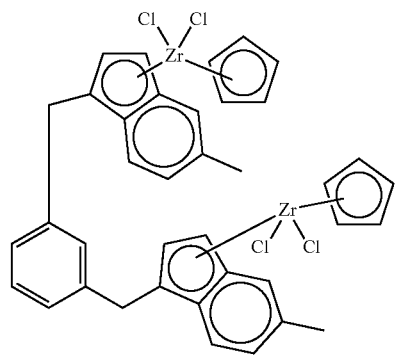
25
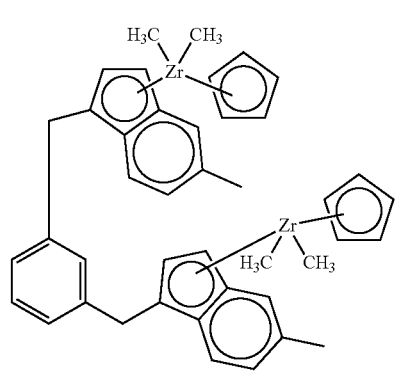
26
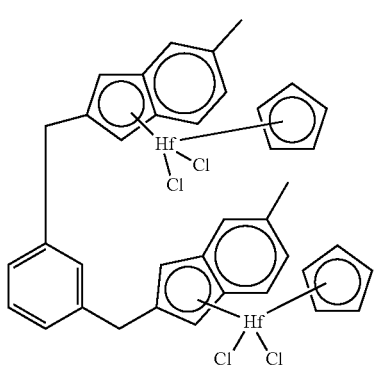
27
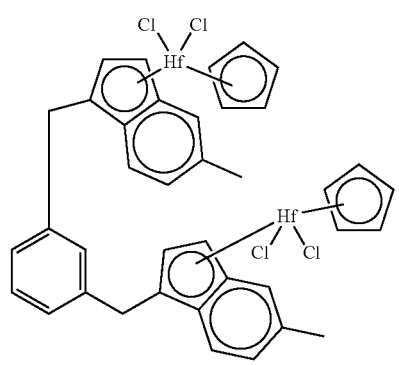
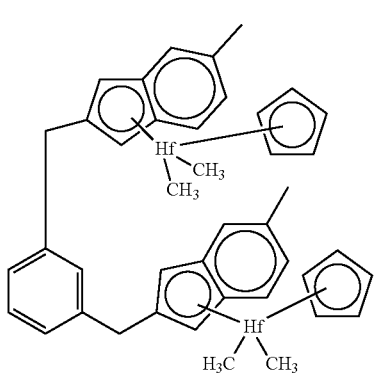
28
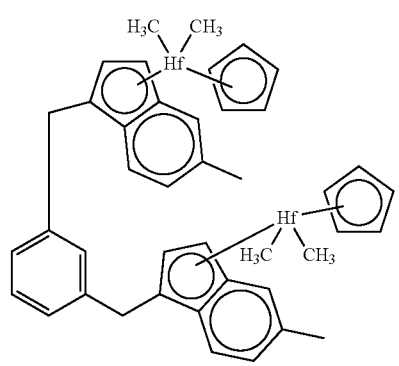

33
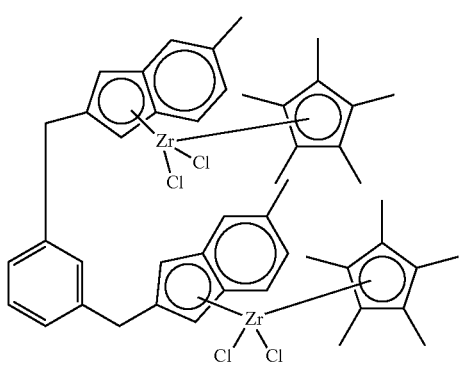
34
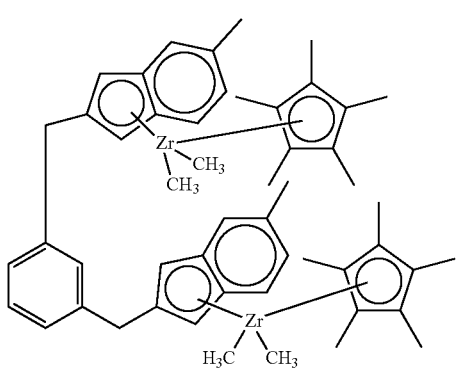
35
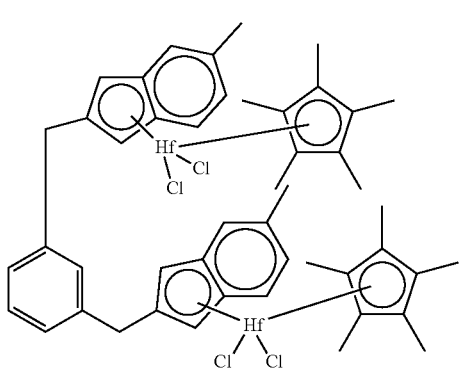
36
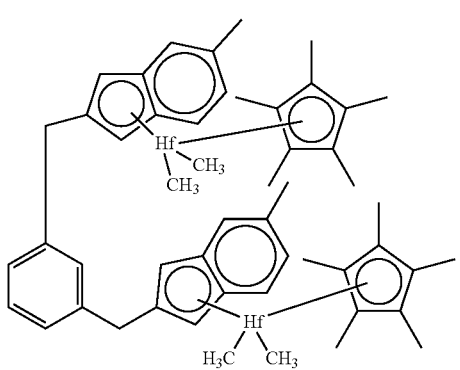
37
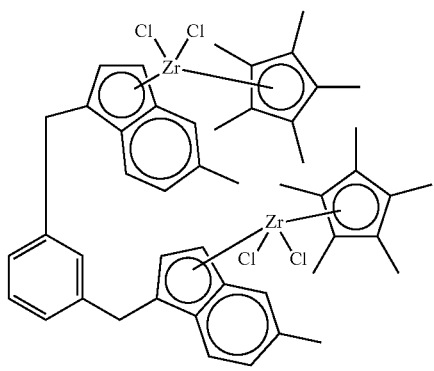
38
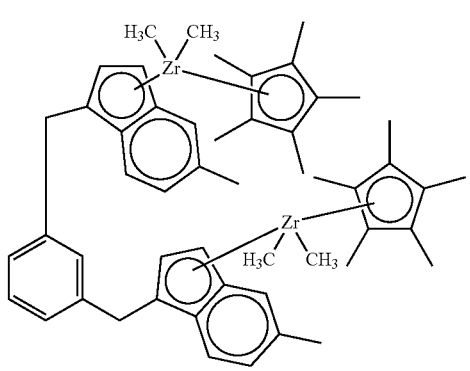
39
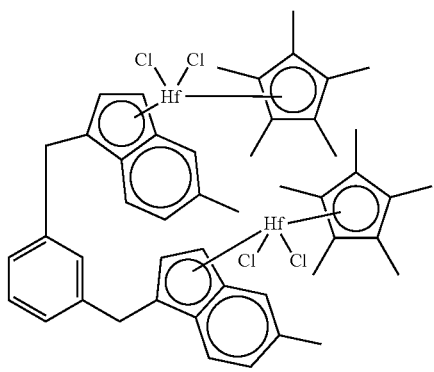
40
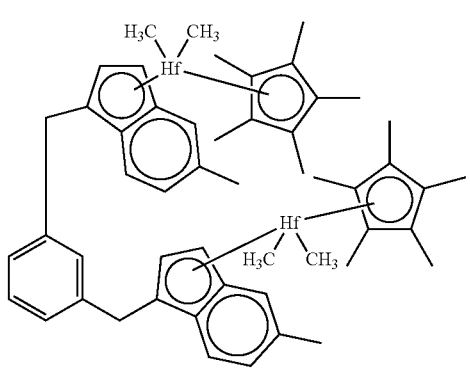

41
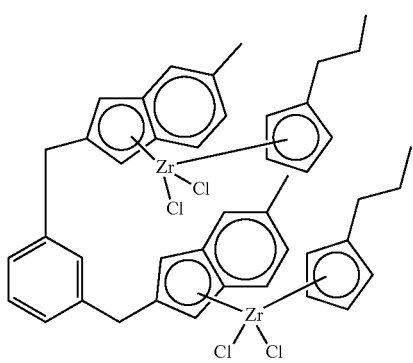
42
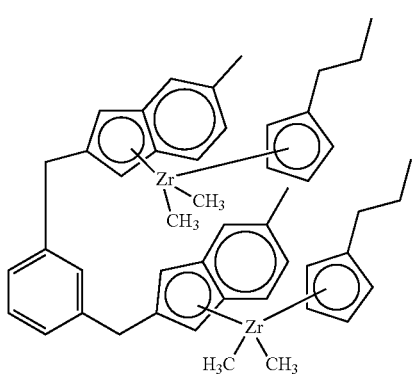
43
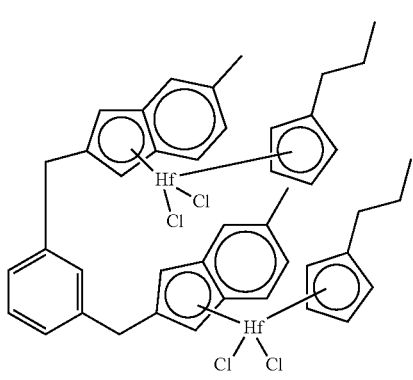
44
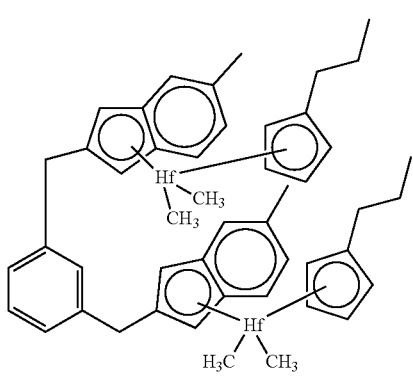
45
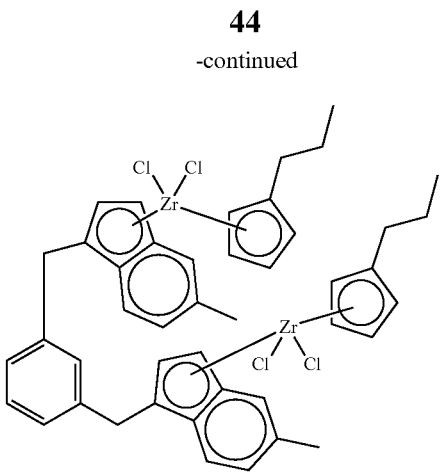
46
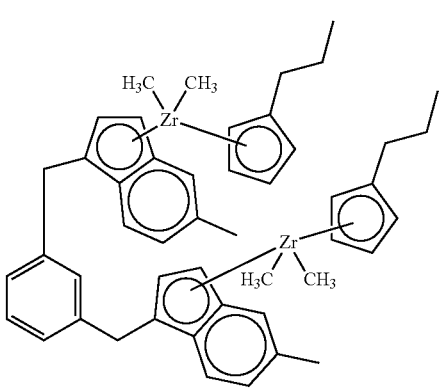
47
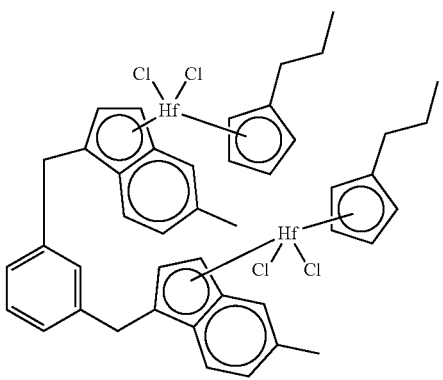
48
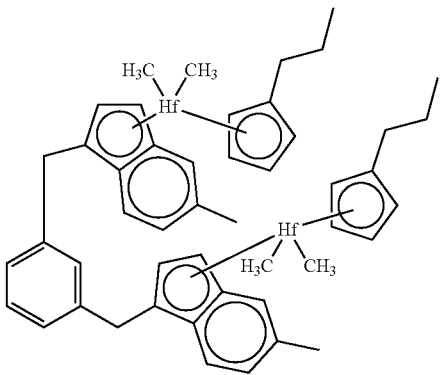

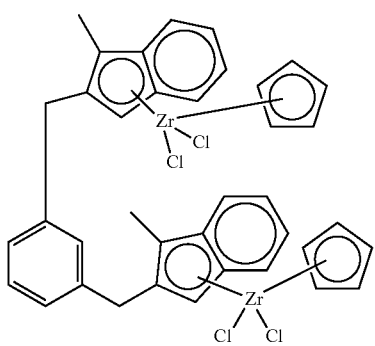
49
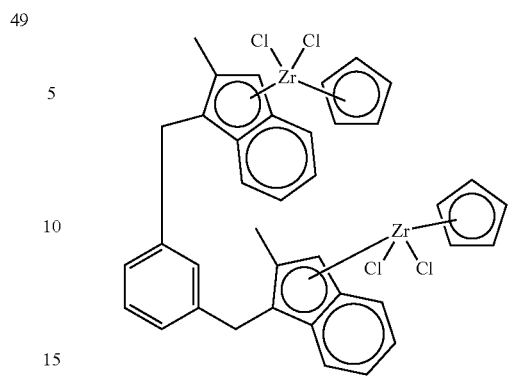
53
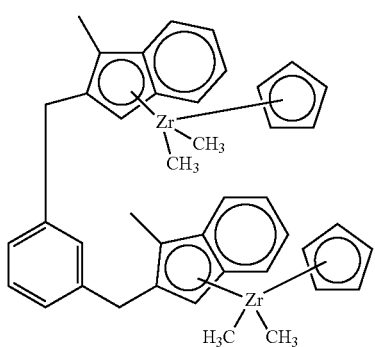
50
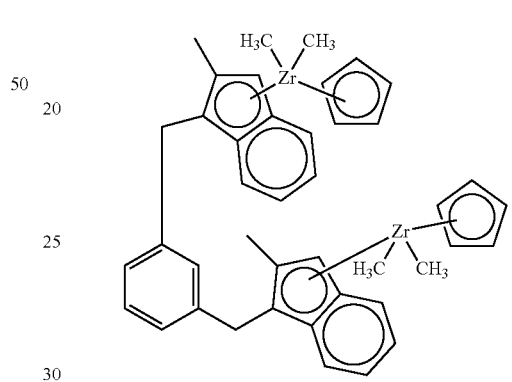
54
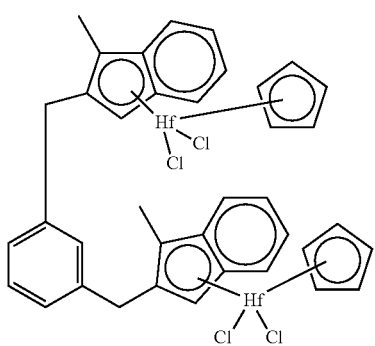
51
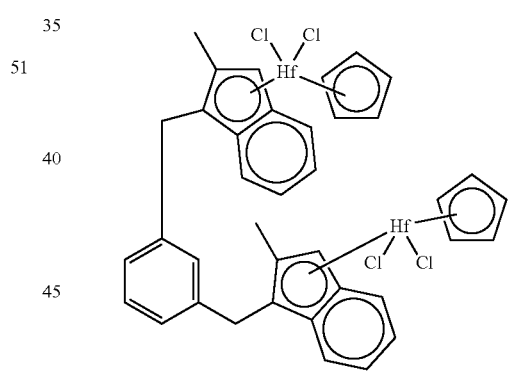
55
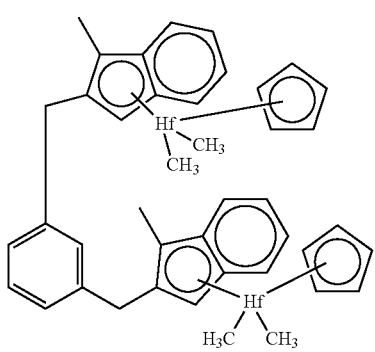
52
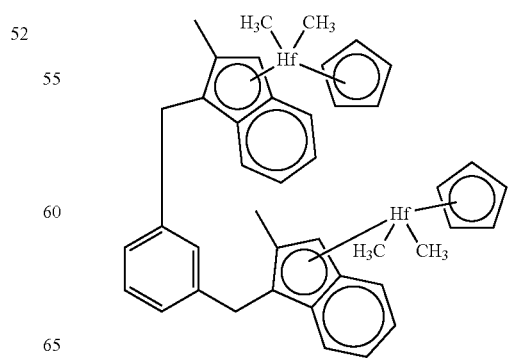
56

57
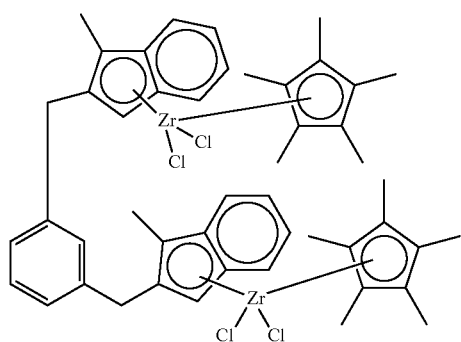
58
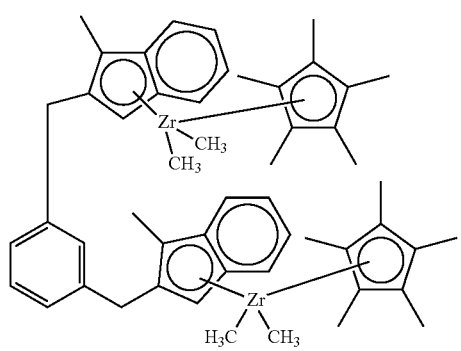
59
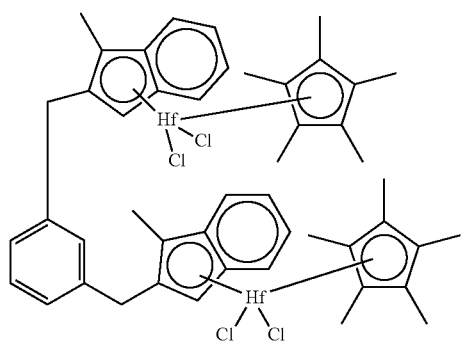
60
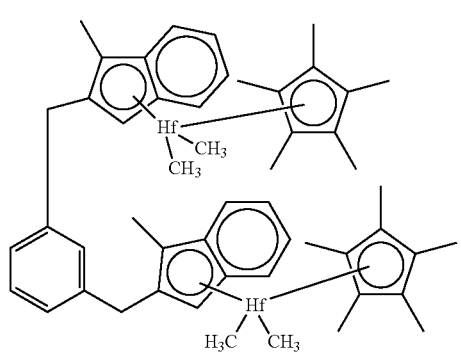
61
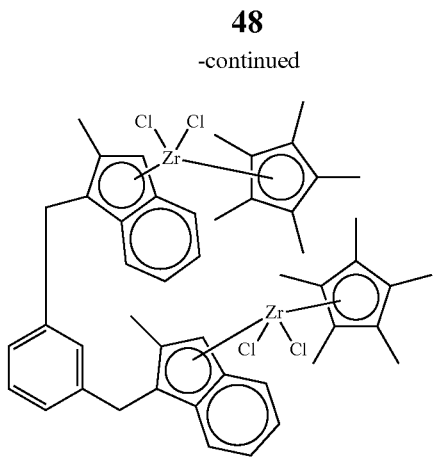
62
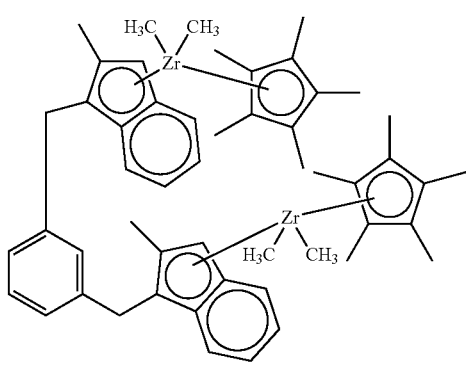
63
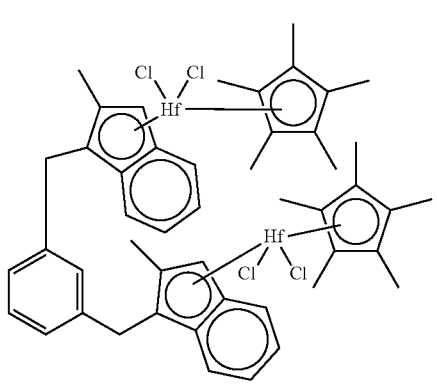
64
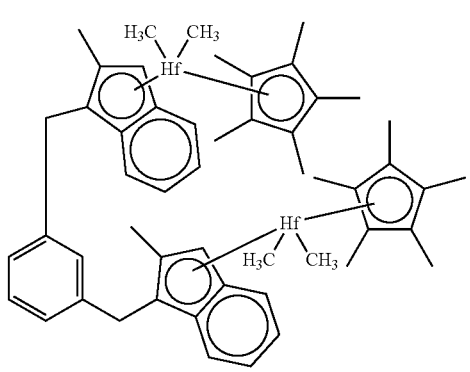

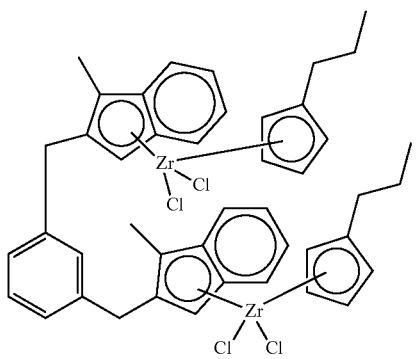
65
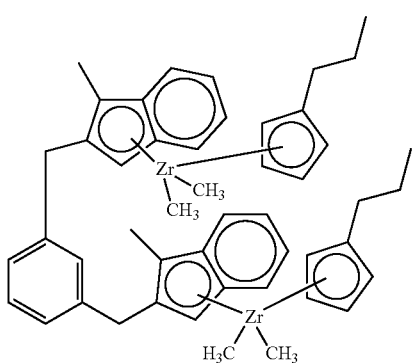
66
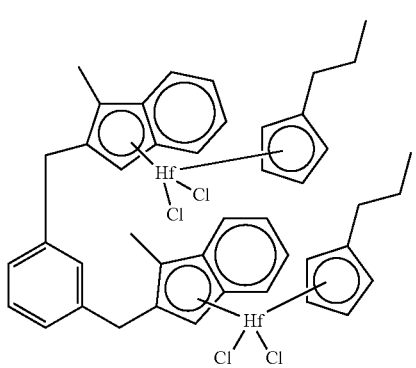
67
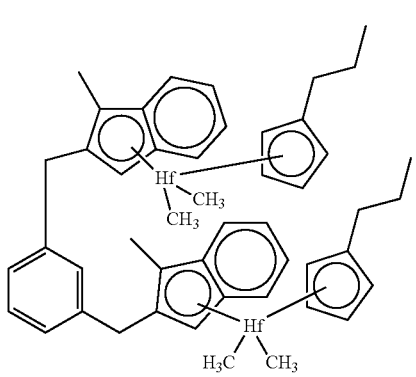
68
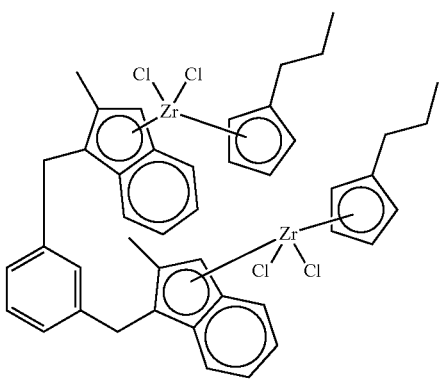
69
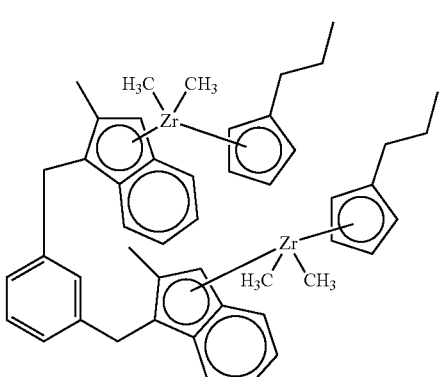
70
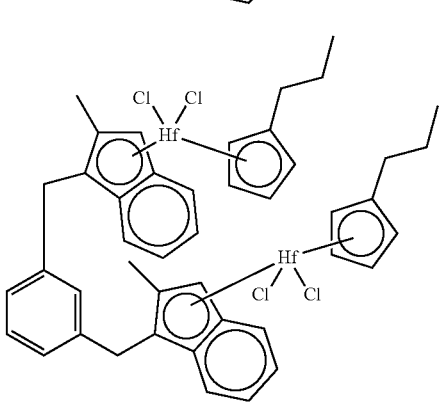
71
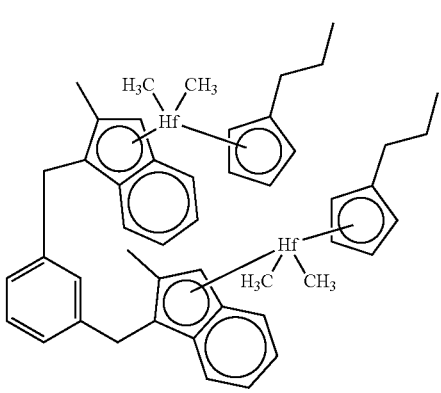
72
In at least one embodiment, the catalyst represented by formula (I) is one or more of:

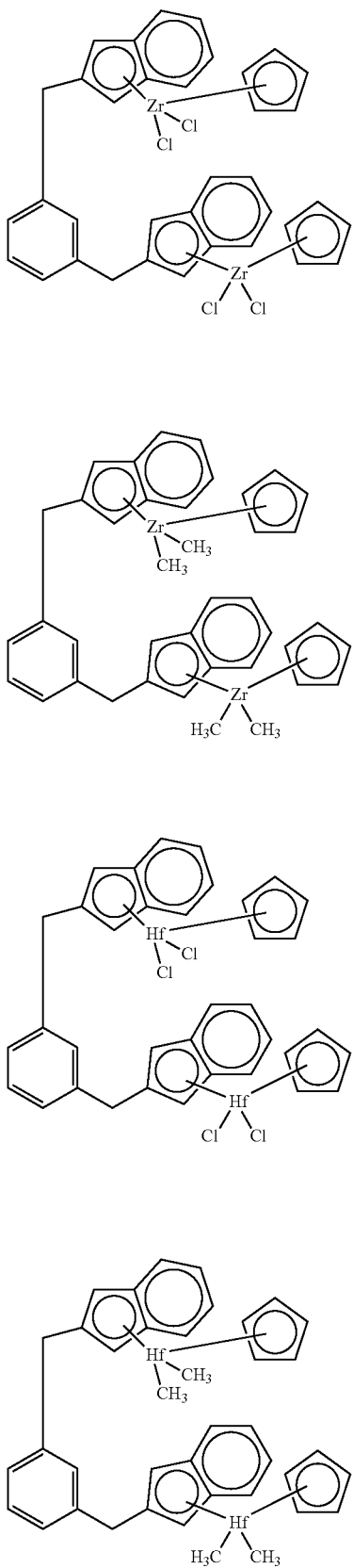

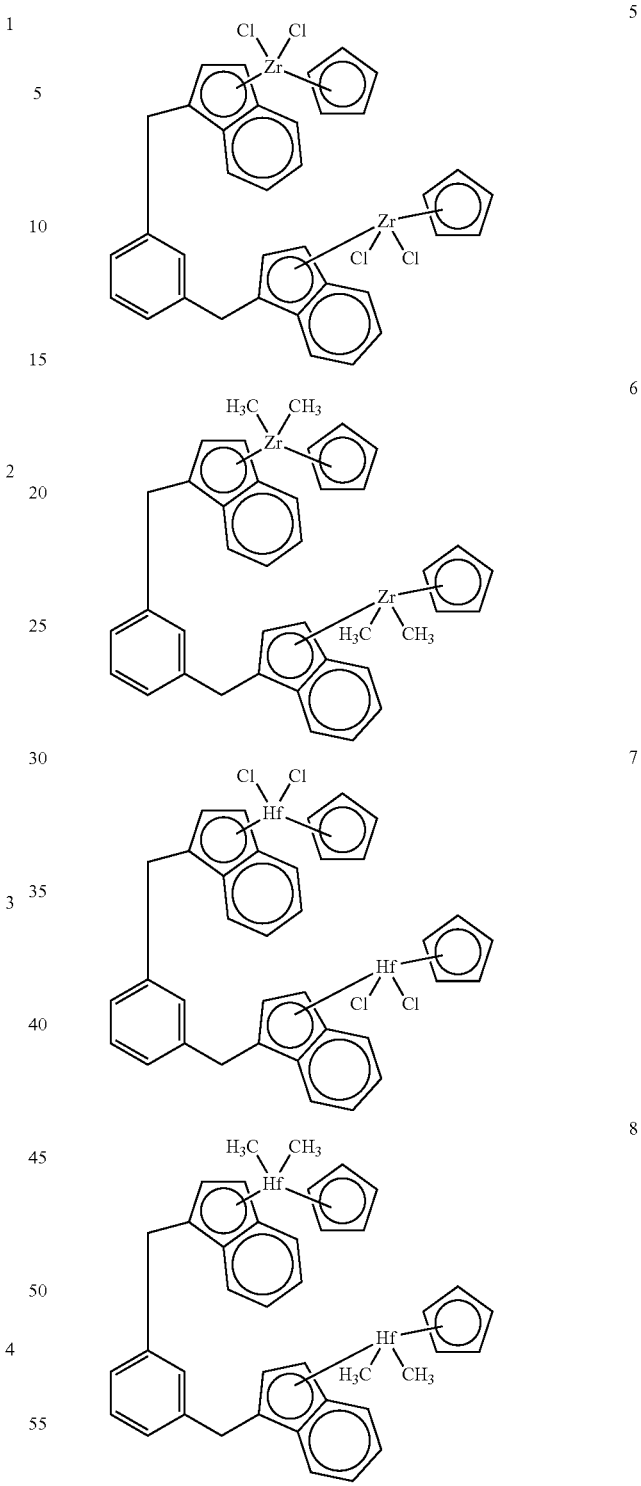

In at least one embodiment, one catalyst compound is used, e.g., the catalyst compounds are not different. For purposes of the present disclosure one catalyst compound is considered different from another if they differ by at least one atom. For example "bisindenyl $ZrCl_2$" is different from (indenyl)(2-methylindenyl) $ZrCl_2$" which is different from "(indenyl)(2-methylindenyl) $HfCl_2$." Catalyst compounds that differ only by isomer are considered the same for purposes of the present disclosure, e.g., rac-dimethylsilylbis (2-methyl 4-phenyl)Hf(Me)$_2$ is considered to be the same as meso-dimethylsilylbis(2-methyl 4-phenyl)Hf(Me)$_2$.

Methods to Prepare the Catalyst Compounds

All air sensitive syntheses are carried out in nitrogen purged dry boxes. All solvents are available from commercial sources. 2,6-bis(chloromethyl)pyridine, dicyclopentadiene, sodium cyclopentadienide, tetrahydrofuran, 1,3-bis(chloromethyl)benzene, indene, 1,3-bis(chloromethyl) benzene, lithium indenide, n-butyl lithium, group IV metal trichlorides, and methyl lithium are available from commercial sources or are readily prepared from commercially available reagents.

Generally, the ancillary ligand represented by Formula (I-III) can be synthesized by several general approaches: 1) a one-pot procedure; 2) a two-step alkylation/deprotonation synthesis; 3) a fulvene condensation and reduction strategy as shown in Scheme 1. Once formed, metallation is conveniently mediated by reaction with half-sandwich metal trichlorides.

Scheme 1

One-Pot Strategy

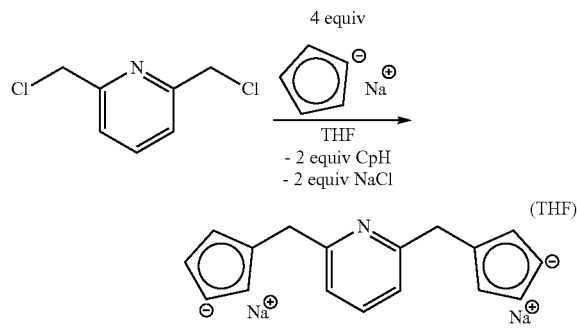

Alkylation/Deprotection Strategy

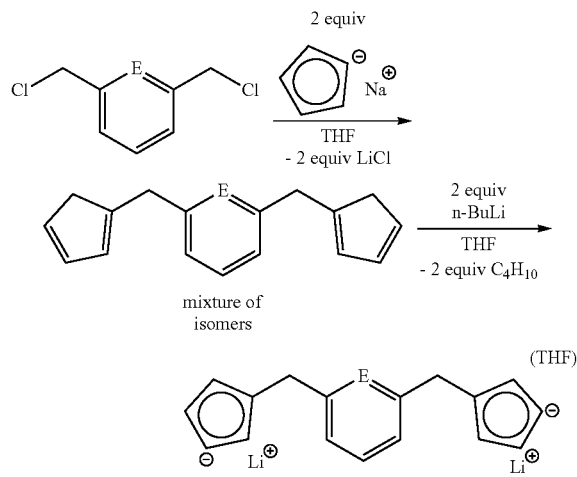

Fulvene/Reduction Strategy

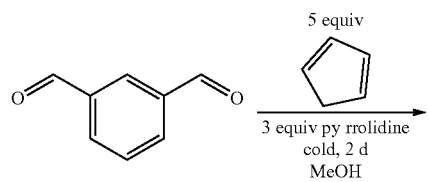

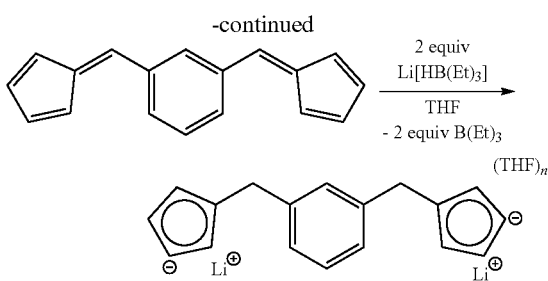

As shown in Scheme 1, a disodium salt of 2,6-bis(methylcyclopentadienyl)pyridine can be synthesized by treating 2,6-bis(chloromethyl)pyridine with four equivalents of sodium cyclopentadienide in tetrahydrofuran solvent. This procedure also works with 1,3-bis(chloromethyl)benzene, indenyl analogues of 1,3-bis(chloromethyl)benzene and 2,6-bis(chloromethyl)pyridine, and substituted forms of these compounds. Alternatively, a dilithium salt of 2,6-bis(methylindenyl)pyridine is synthesized by treating 2,6-bis(chloromethyl)pyridine with two equivalents of lithium indenide in diethylether solvent to form 2,6-bis((1H-inden-2-yl)methyl)pyridine. 2,6-bis((1H-inden-2-yl)methyl)pyridine is then treated with two equivalents of n-butyl lithium (or sodium hydride or NaNH$_2$) to provide a dilithium salt (or disodium salt) of 2,6-bis(methylindenyl)pyridine. This procedure also works with 1,3-bis(chloromethyl)benzene, indenyl analogues of 1,3-bis(chloromethyl)benzene and 2,6-bis(chloromethyl)pyridine, and substituted forms of these compounds. A fulvene route may also be utilized to access 1,3-bis(methylcyclopentadienyl)benzene and related derivatives.

Scheme 2

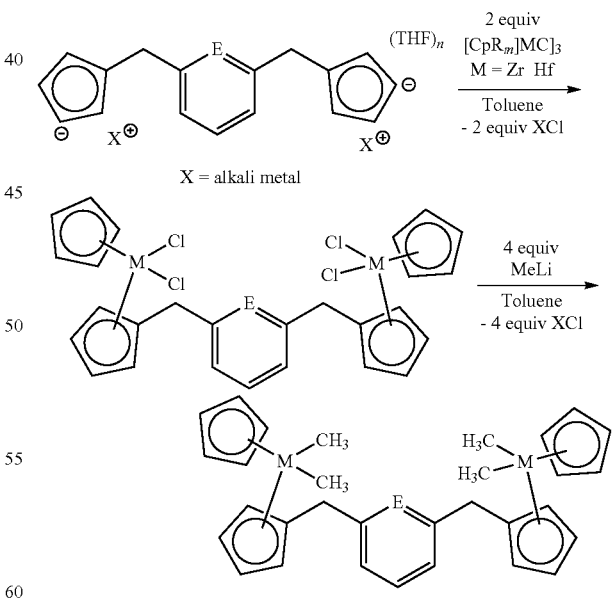

Scheme 2 provides a non-limiting generalized scheme illustrating that bimetallic complexes can be synthesized by addition of two equivalents of Group IV metal trichlorides to the disodium salts or dilithium salts synthesized in Scheme 1 in toluene solvent. If alkylation of a group IV metal is desired, the synthesized bimetallic complexes can be treated with four equivalents of alkyl lithium (such as methyl lithium) in toluene at room temperature to afford the alkylated species.

Activators

The terms "cocatalyst" and "activator" are used herein interchangeably and are defined to be any compound which can activate any one of the catalyst compounds described above by converting the neutral catalyst compound to a catalytically active catalyst compound cation.

After the catalysts have been synthesized, catalyst systems may be formed by combining the catalysts with activators in any suitable manner, including by supporting them for use in slurry or gas phase polymerization. The catalyst systems may also be added to or generated in solution polymerization or bulk polymerization (in the monomer, i.e., no solvent).

Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In at least one embodiment, a catalyst system has an activator and a catalyst and a molar ratio of the activator to the catalyst is from 1.5:1 to 5:1, such as from 2:1 to 4:1, for example about 4:1. It has been discovered that a molar ratio of activator to catalyst represented by formula (I), particularly where E is N, can control the molecular weight of the polymer produced while substantially maintaining the activity of the catalyst. For example, increasing a molar ratio of activator to catalyst from 2 to 3 can provide a reduction in molecular weight of polymer produced without affecting the catalyst activity.

Alumoxane Activators

In one embodiment, alumoxane activators are utilized as an activator in the catalyst system. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209, the disclosures of which are herein incorporated by reference. Aluminum alkyls are available as hydrocarbon solutions from commercial sources. Methylalumoxane ("MAO") is available from Albemarle as a 30 wt % solution in toluene.

The catalyst system typically comprises a transition metal complex as described above and an activator such as alumoxane or a non-coordinating anion activator. Activation may be performed using alumoxane solution including an alkylalumoxane such as methyl alumoxane, referred to as MAO, as well as modified MAO, referred to herein as MMAO, which contains some higher alkyl groups to improve the solubility. MAO can be purchased from Albemarle Corporation, Baton Rouge, La., typically in a 10 wt % solution in toluene. The catalyst system employed in the present disclosure can use an activator selected from alumoxanes, such as methyl alumoxane, modified methyl alumoxane, ethyl alumoxane, iso-butyl alumoxane, TEAL (triethyl aluminum) and the like. When an alumoxane or modified alumoxane is used, the molar ratio of the activator to the catalyst is from 3000:1 to 1:1; such as 2000:1 to 1:10; such as 1000:1 to 1:10; such as 500:1 to 1:1; such as 300:1 to 1:1; such as 200:1 to 1:1; such as 100:1 to 1:1; such as 50:1 to 1:1; such as 10:1 to 1:1. When the activator is an alumoxane (modified or unmodified), some embodiments select the maximum amount of activator at a 5000-fold molar excess over the catalyst (per metal catalytic site). The minimum activator to catalyst ratio can be 1:1 molar ratio.

Non-Coordinating Anion Activators

A non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals can include aluminum, gold, and platinum. Suitable metalloids can include boron, aluminum, phosphorus, and silicon.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

Activation may be performed using non-coordinating anions (NCAs) of the type, for example, described in EP 277 003 A1 and EP 277 004 A1. NCA may be added in the form of an ion pair using, for example, [DMAH]+ [NCA]− in which the N,N-dimethylanilinium (DMAH) cation reacts with a basic leaving group on the transition metal complex to form a transition metal complex cation and [NCA]−. The cation in the precursor may, alternatively, be trityl (($Ph)_3C^+$). Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate (i.e., [$PhNMe_2H$]$B(C_6F_5)_4$) and N,N-dimethylanilinium tetrakis (heptafluoronaphthyl)borate, where Ph is phenyl, and Me is methyl.

Additionally activators useful herein include those described in U.S. Pat. No. 7,247,687 at column 169, line 50 to column 174, line 43, particularly column 172, line 24 to column 173, line 53.

In an embodiment of the present disclosure, the non-coordinating anion activator is represented by the following formula (1):

$$(Z)^{d+}(A^{d-}) \quad (1)$$

wherein Z is (L-H) or a reducible Lewis acid, L is a neutral Lewis base, H is hydrogen and $(L-H)^+$ is a Bronsted acid; $A^{d-}$ is a non-coordinating anion having the charge d−; and d is an integer from 1 to 3.

When Z is (L-H) such that the cation component is $(L-H)^{d+}$, the cation component may include Bronsted acids such as protonated Lewis bases capable of protonating a moiety, such as an alkyl or aryl, from the catalyst precursor, resulting in a cationic transition metal species, or the activating cation $(L-H)^{d+}$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: ($Ar_3C+$), where Ar is aryl or aryl substituted with a heteroatom, or a $C_1$ to $C_{40}$ hydrocarbyl, the reducible Lewis acid may be represented by the formula: ($Ph_3C+$), where Ph is phenyl or phenyl substituted with a heteroatom, and/or a $C_1$ to $C_{40}$ hydrocarbyl. In an embodiment, the reducible Lewis acid is triphenyl carbenium.

Embodiments of the anion component $A^{d-}$ include those having the formula $[M^k+Q^n]^{d-}$ wherein k is 1, 2, or 3; n is 1, 2, 3, 4, 5 or 6, or 3, 4, 5 or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, the Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable $A^{d-}$ components also include diboron compounds as disclosed in U.S. Pat. No. 5,447,895, which is fully incorporated herein by reference.

Illustrative examples of boron compounds which may be used as an activating cocatalyst are the compounds described as (and particularly those specifically listed as) activators in U.S. Pat. No. 8,658,556, which is incorporated by reference herein.

In an embodiment in any of the NCA's represented by Formula 1 described above, the anion component $A^{d-}$ is represented by the formula $[M*k*+Q*n*]d*-$ wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, the Q* having up to 20 carbon atoms with the proviso that in not more than 1 occurrence is Q* a halogen.

The present disclosure also provides a method to polymerize olefins comprising contacting olefins (such as ethylene or propylene) with a catalyst complex as described above and an NCA activator represented by the Formula (2):

$$R_nM**(ArNHal)^{4-n} \quad (2)$$

where R is a monoanionic ligand; $M**$ is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is Zd+ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl radicals; —SRa, —NRa$_2$, and —PRa$_2$, where each Ra is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: ($Ar_3C+$), where Ar is aryl or aryl substituted with a heteroatom, and/or a $C_1$ to $C_{40}$ hydrocarbyl, or the reducible Lewis acid represented by the formula: ($Ph_3C+$), where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, $(L-H)^{d+}$, wherein L is an neutral Lewis base; H is hydrogen; (L-H) is a Bronsted acid; and d is 1, 2, or 3, or $(L-H)^{d+}$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \quad (3)$$

wherein $OX^{e+}$ is a cationic oxidizing agent having a charge of e+; e is 1, 2 or 3; d is 1, 2 or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of Ad− include tetrakis (pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4^-$], [Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In at least one embodiment, an activator is one or more of: N,N-dimethylanilinium tetra(perfluorophenyl)borate; N,N-dimethylanilinium tetrakis(perfluoronaphthyl)borate; N,N-dimethylanilinium tetrakis(perfluorobiphenyl)borate; N,N-dimethylanilinium tetrakis(3,5-bis(trifluoromethyl)phenyl)borate; triphenylcarbenium tetrakis(perfluoronaphthyl)borate; triphenylcarbenium tetrakis(perfluorobiphenyl)borate; triphenylcarbenium tetrakis(3,5-bis(trifluoromethyl)phenyl)borate; triphenylcarbenium tetra(perfluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-diethylanilinium tetrakis(perfluoronaphthyl)borate; N,N-dimethyl-(2,4,6-trimethylanilinium) tetrakis(perfluoronaphthyl)borate; and tropillium tetrakis(perfluoronaphthyl)borate.

Bulky activators are also useful herein as NCAs. "Bulky activator" as used herein refers to anionic activators represented by the formula:

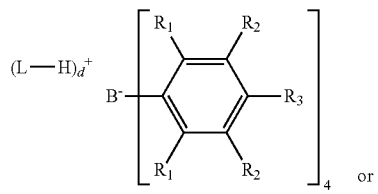

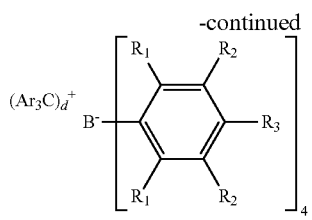

where:
each R$_1$ is, independently, a halide, preferably a fluoride;
Ar is substituted or unsubstituted aryl group (preferably a substituted or unsubstituted phenyl), preferably substituted with C$_1$ to C$_{40}$ hydrocarbyls, preferably C$_1$ to C$_{20}$ alkyls or aromatics; each R$_2$ is, independently, a halide, a C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_2$ is a fluoride or a perfluorinated phenyl group);
each R$_3$ is a halide, C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_3$ is a fluoride or a C$_6$ perfluorinated aromatic hydrocarbyl group); wherein R$_2$ and R$_3$ can form one or more saturated or unsaturated, substituted or unsubstituted rings (preferably R$_2$ and R$_3$ form a perfluorinated phenyl ring); and
L is an neutral Lewis base; (L-H)$^+$ is a Bronsted acid; d is 1, 2, or 3;
wherein the anion has a molecular weight of greater than 1020 g/mol;
wherein at least three of the substituents on the B atom each have a molecular volume of greater than 250 cubic Å, alternately greater than 300 cubic Å, or alternately greater than 500 cubic Å.

Preferably (Ar$_3$C)$_d^+$ is (Ph$_3$C)$_d^+$, where Ph is a substituted or unsubstituted phenyl, preferably substituted with C$_1$ to C$_{40}$ hydrocarbyls or substituted C$_1$ to C$_{40}$ hydrocarbyls, preferably C$_1$ to C$_{20}$ alkyls or aromatics or substituted C$_1$ to C$_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3V$_S$, where V$_S$ is the scaled volume. V$_S$ is the sum of the relative volumes of the constituent atoms, and is calculated from the molecular formula of the substituent using the following table of relative volumes. For fused rings, the V$_S$ is decreased by 7.5% per fused ring.

| Element | Relative Volume |
|---|---|
| H | 1 |
| 1$^{st}$ short period, Li to F | 2 |

-continued

| Element | Relative Volume |
|---|---|
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In at least one embodiment, two NCA activators may be used in the polymerization and the molar ratio of the first NCA activator to the second NCA activator can be any ratio. In at least one embodiment, the molar ratio of the first NCA activator to the second NCA activator is 0.01:1 to 10,000:1, or 0.1:1 to 1000:1, or 1:1 to 100:1.

In at least one embodiment, the NCA activator-to-catalyst ratio is a 1:1 molar ratio, or 0.1:1 to 100:1, or 0.5:1 to 200:1, or 1:1 to 500:1 or 1:1 to 1000:1. In at least one embodiment, the NCA activator-to-catalyst ratio is 0.5:1 to 10:1, or 1:1 to 5:1.

In at least one embodiment, the catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator, all of which are incorporated by reference herein).

In at least one embodiment, when an NCA (such as an ionic or neutral stoichiometric activator) is used, the catalyst-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Likewise, a co-activator, such as a group 1, 2, or 13 organometallic species (e.g., an alkyl aluminum compound such as tri-n-octyl aluminum), may be used in the catalyst system herein. The catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Support Materials

In embodiments herein, the catalyst system may comprise an inert support material. In at least one embodiment, the support material is a porous support material, for example, talc, or inorganic oxides. Other support materials include zeolites, clays, organoclays, or any other suitable organic or inorganic support material and the like, or mixtures thereof.

In at least one embodiment, the support material is an inorganic oxide. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, functionalized polyolefins, such as polyethylene. Supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area in the range of from 10 to 700 $m^2/g$, pore volume in the range of from 0.1 to 4.0 cc/g and average particle size in the range of from 5 to 500 µm. In at least one embodiment, the surface area of the support material is in the range of from 50 to 500 $m^2/g$, pore volume of from 0.5 to 3.5 cc/g and average particle size of from 10 to 200 µm. In at least one embodiment, the surface area of the support material is in the range is from 100 to 400 $m^2/g$, pore volume from 0.8 to 3.0 cc/g and average particle size is from 5 to 100 µm. The average pore size of the support material useful in the present disclosure is in the range of from 10 to 1000 Å, such as 50 to 500 Å, such as 75 to 350 Å. In some embodiments, the support material is a high surface area, amorphous silica (surface area=300 $m^2/gm$; pore volume of 1.65 $cm^3/gm$). Silicas are marketed under the trade names of Davison 952 or Davison 955 by the Davison Chemical Division of W.R. Grace and Company. In other embodiments DAVISON 948 is used.

The support material should be dry, that is, substantially free of absorbed water. Drying of the support material can be effected by heating or calcining at 100° C. to 1000° C., such as at least about 600° C. When the support material is silica, it is heated to at least 200° C., such as 200° C. to 850° C., such as at about 600° C.; and for a time of 1 minute to about 100 hours, from 12 hours to 72 hours, or from 24 hours to 60 hours. The calcined support material should have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from 0.5 hours to 24 hours, from 2 hours to 16 hours, or from 4 hours to 8 hours. The solution of the catalyst compound is then contacted with the isolated support/activator. In some embodiments, the supported catalyst system is generated in situ. In at least one embodiment, the slurry of the support material is first contacted with the catalyst compound for a period of time in the range of from 0.5 hours to 24 hours, from 2 hours to 16 hours, or from 4 hours to 8 hours. The slurry of the supported catalyst compound is then contacted with the activator solution.

The mixture of the catalyst, activator and support is heated to 0° C. to 70° C., such as to 23° C. to 60° C., such as at room temperature. Contact times typically range from 0.5 hours to 24 hours, from 2 hours to 16 hours, or from 4 hours to 8 hours.

Suitable non-polar solvents are materials in which all of the reactants used herein, e.g., the activator, and the catalyst compound, are at least partially soluble and which are liquid at room temperature. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Bronsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

In embodiments herein, the present disclosure provides polymerization processes where monomer (such as propylene or ethylene), and optionally comonomer (e.g., butene, hexene, octene), are contacted with a catalyst system comprising an activator and at least one catalyst compound, as described above. The catalyst compound and activator may be combined in any order, and are combined typically prior to contacting with the monomer.

In at least one embodiment, a polymerization process includes a) contacting one or more olefin monomers with a catalyst system comprising: i) an activator and ii) a catalyst compound of the present disclosure. The activator may be an alumoxane or a non-coordination anion activator. The one or more olefin monomers may be propylene and/or ethylene and the polymerization process further comprises heating the one or more olefin monomers and the catalyst system to 70° C. or more to form polypropylene or polyethylene, preferably polyethylene.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer comprises ethylene and an optional comonomers comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises ethylene and an optional comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 to 1.0 wt %, such as 0.002 to 0.5 wt %, such as 0.003 to 0.2 wt %, based upon the total weight of the composition. In some embodiments 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Diene monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diene monomers can be selected from alpha, omega-diene monomers (i.e., di-vinyl monomers). The diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be performed. (A useful homogeneous polymerization process is one where at least 90 wt % of the product is soluble in the reaction media.) A bulk homogeneous process can be used. (A preferred bulk process is one where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In at least one embodiment, the process is a slurry polymerization process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such that aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. The polymerization can be performed in a bulk process.

Polymerizations can be performed at any temperature and/or pressure suitable to obtain the desired polymers, such as ethylene and or propylene polymers. Typical temperatures and/or pressures include a temperature in the range of from 0° C. to 300° C., such as 20° C. to 200° C., such as 35° C. to 150° C., such as 40° C. to 120° C., such as 45° C. to 80° C., for example about 74° C., and at a pressure in the range of from 0.35 MPa to 10 MPa, such as 0.45 MPa to 6 MPa, such as 0.5 MPa to 4 MPa.

In a typical polymerization, the run time of the reaction is up to 300 minutes, such as in the range of from 5 to 250 minutes, such as 10 to 120 minutes.

In at least one embodiment, hydrogen is present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

In at least one embodiment, the productivity of a catalyst of the present disclosure is from 500 gPgcat$^{-1}$hr$^{-1}$ to 20,000 gPgcat$^{-1}$hr$^{-1}$, such as from 2,000 gPgcat$^{-1}$hr$^{-1}$ to 15,000 gPgcat$^{-1}$ hr$^{-1}$, such as from 4,000 gPgcat$^{-1}$hr$^{-1}$ to 14,000 gPgcat$^{-1}$ hr$^{-1}$, such as from 6,000 gPgcat$^{-1}$hr$^{-1}$ to 13,000 gPgcat$^{-1}$ hr$^{-1}$, such as from 8,000 gPgcat$^{-1}$hr$^{-1}$ to 12,000 gPgcat$^{-1}$ hr$^{-1}$. In at least one embodiment, the activity of the catalyst is from 50 gP/mmolCat/hour to 40,000 gP/mmolCat/hr, such as from 100 gP/mmolCat/hr to 10,000 gP/mmolCat/hr, such as from 200 gP/mmolCat/hr to 1,000 gP/mmolCat/hr, such as about 400 gP/mmolCat/hr or more, such as 11,000 gP/mmolCat/hr or more. In at least one embodiment, the activity of the catalyst is from 0.1 kgP/molcat*h to 0.5 kgP/molcat*h, such as from 0.1 kgP/molcat*h to 0.4 kgP/molcat*h, such as from 0.15 kgP/ molcat*h to 0.3 kgP/molcat*h. In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, a catalyst of the present disclosure is capable of producing polyethylene having an Mw from 40,000 to 3,500,000, such as from 200,000 to 3,000,000, such as from 200,000 to 2,500,000, such as from 1,000,000 to 2,500,000, such as from 2,000,000 to 3,000,000, such as from 100,000 to 300,000.

In at least one embodiment, a catalyst of the present disclosure is capable of producing polyethylene having an Mn from 5,000 to 1,500,000, such as from 20,000 to 1,000,000, such as from 30,000 to 100,000, such as from 40,000 to 80,000. In at least one embodiment, a catalyst of the present disclosure is capable of producing polyethylene having an Mw/Mn value from 1 to 35, such as from 2 to 9, such as from 3 to 8, such as from 3 to 6, such as from 4 to 5, for example about 4.5.

In at least one embodiment, for catalyst systems of the present disclosure comprising a catalyst of formula (I) and one or more second catalysts (such as a metallocene catalyst), as described above, a polyethylene formed by the catalyst system can have an Mw/Mn value from 1 to 10, such as from 2 to 8, such as from 3 to 8.

In at least one embodiment, little or no alumoxane is used in the process to produce the polymers. Alumoxane can be present at zero mol %, alternatively the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. Scavenger (such as trialkyl aluminum) can be present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 70 to 110° C.); 2) is conducted at a pressure of atmospheric pressure to 10 MPa (such as 0.35 to 10 MPa, such as from 0.45 to 6 MPa, such as from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, where aromatics are present in the solvent at less than 1 wt %, such as less than 0.5 wt %, such as at 0 wt % based upon the weight of the solvents); and 4) the productivity of the catalyst compound is at least 80,000 gP/mmolCat/hr (such as at least 150,000 gP/mmolCat/hr, such as at least 200,000 gP/mmolCat/hr, such as at least 250,000 gP/mmolCat/hr, such as at least 300,000 gP/mmolCat/hr). In at least one embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228 all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent to which monomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The diluent employed should be liquid under the conditions of polymerization and relatively inert. When a propane diluent is used, the process must be operated above the reaction diluent critical temperature and pressure. Preferably, a hexane or an isobutane diluent is employed.

In at least one embodiment, a preferred polymerization process is referred to as a particle form polymerization, or a slurry process, where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those using a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isohexane or as a dry free flowing powder, is injected regularly to the reactor loop, which is itself filled with circulating slurry of growing polymer particles in a diluent of isohexane containing monomer and comonomer. Hydrogen, optionally, may be added as a molecular weight control. (In one embodiment hydrogen is added from 50 ppm to 500 ppm, such as from 100 ppm to 400 ppm, such as 150 ppm to 300 ppm.)

The reactor may be maintained at a pressure of 2,000 kPa to 5,000 kPa, such as from 3620 kPa to 4309 kPa, and at a temperature in the range of about 60° C. to about 120° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isohexane diluent and all unreacted monomer and comonomers. The resulting hydrocarbon free powder is then compounded for use in various applications.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ hydrocarbyl, preferably methyl, ethyl, propyl, butyl, pentyl, hexyl octyl or an isomer thereof). Examples can include diethyl zinc, methylalumoxane, trimethylaluminum, triisobutylaluminum, trioctylaluminum, or a combination thereof.

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, et al., *Ind. Eng, Chem. Res.* 2000, 29, 4627. Generally solution polymerization involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 0° C. to about 250° C., preferably from about 10° C. to about 150° C., more preferably from about 40° C. to about 140° C., more preferably from about 50° C. to about 120° C. and at pressures of about 0.1 MPa or more, preferably 2 MPa or more. The upper pressure limit is not critically constrained but typically can be about 200 MPa or less, preferably, 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

Polyolefin Products

The present disclosure also provides compositions of matter which can be produced by the methods described herein.

In at least one embodiment, processes of the present disclosure produce ethylene homopolymers or ethylene copolymers, such as propylene-ethylene and/or ethylene-alphaolefin (such as $C_4$ to $C_{20}$) copolymers (such as ethylene-hexene copolymers or ethylene-octene copolymers) having an Mw/Mn of from 1 to 35, such as from 1 to 9, such as from 2 to 5.

Likewise, processes of the present disclosure can produce olefin polymers, such as polyethylene and polypropylene homopolymers and copolymers. In at least one embodiment, the polymers produced herein are homopolymers of ethylene or propylene, are copolymers of ethylene such as copolymer of ethylene having from 0 to 25 mole % (such as from 0.5 to 20 mole %, such as from 1 to 15 mole %, such as from 3 to 10 mole %) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene), or are copolymers of propylene such as copolymers of propylene having from 0 to 25 mole % (such as from 0.5 to 20 mole %, such as from 1 to 15 mole %, such as from 3 to 10 mole %) of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In at least one embodiment, the monomer is ethylene and the comonomer is hexene, at a comonomer content of from 1 wt % to 18 wt % hexene, such as from 1 wt % to 12 wt %, such as from 1 wt % to 6 wt %, such as from 2 wt % to 5 wt %, for example about 3 wt %.

In at least one embodiment, a polymer, such as polyethylene, has an Mw from 40,000 to 3,500,000, such as from 50,000 to 3,000,000, such as from 60,000 to 2,500,000, such as from 60,000 to 200,000, such as from 2,000,000 to 3,000,000.

In at least one embodiment, a polymer, such as polyethylene, has an Mn from 10,000 to 1,500,000, such as from 20,000 to 300,000, such as from 20,000 to 200,000, such as from 20,000 to 100,000. In at least one embodiment, a polymer, such as polyethylene, has an Mw/Mn value from 1 to 35, such as from 2 to 10, such as from 4 to 8, for example about 5.

Polymers produced herein typically have an Mz/Mw from 1 to 10, such as from 2 to 7, such as from 2 to 5, such as from 2 to 3. Polymers produced herein typically have an Mz/Mn from 1 to 10, such as from 2 to 6, such as from 3 to 5.

In at least one embodiment, a polymer of the present disclosure has a g'vis of greater than 0.9, such as greater than 0.92, preferably greater than 0.95. In at least one embodiment, a polymer of the present disclosure has a g'vis of 0.88 to 0.93, for examples about 0.88 or about 0.91.

In at least one embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In at least one embodiment, a bimodal polymer, such as a bimodal polyethylene (e.g., formed by a catalyst system having a catalyst represented by formula (I)) has an Mw/Mn value from 1 to 10, such as from 1.5 to 8, such as from 2 to 6, such as from 3 to 6.

In at least one embodiment, the polymer produced herein has a composition distribution breadth index (CDBI) of 50% or more, such as 60% or more, such as 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from 10 to 99 wt %, based upon the weight of the polymers in the blend, such as 20 to 95 wt %, such as at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Films

One or more of the foregoing polymers, such as the foregoing polyethylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from 1 to 50 m are usually suitable. Films intended for packaging are usually from 10 to 50 m thick. The thickness of the sealing layer is typically 0.2 to 50 m. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

EXPERIMENTAL

General Synthetic Considerations: Unless otherwise stated, materials were handled using standard glovebox and Schlenk techniques. All potential air or water sensitive materials were manipulated and stored under dry dinitrogen. Reagent grade starting materials were purchased from commercial sources. Commercially sourced materials were utilized as received or purified according to standard procedures (Anarego, W. L.; Chai, C. L. *Purification of Laboratory Chemicals;* 5 ed.; Elsevier: Oxford, 2003). Anhydrous solvents were purchased from commercial sources and stored over 3 Å molecular sieves following standard procedures for drying and degassing. The compounds Cp$_2$ZrCl$_2$, CpZrCl$_3$, Cp*ZrCl$_3$ were purchased and used as received from Strem Chemicals. (n-PrCp)ZrCl$_3$, (n-PrCp)HfCl$_3$, (Cp*)HfCl$_3$ were prepared according to standard literature procedures.

$^1$H NMR Spectroscopy for Compound Characterization:

Chemical structures were determined by $^1$H NMR spectroscopy collected at room temperature (e.g., 23° C.) in a 5 mm probe or 10 mm probe using either a 400 or 500 MHz Bruker spectrometer with deuterated solvent, such as deuterated methylene chloride or deuterated benzene. $^1$H and $^{13}$C{$^1$H} chemical shifts are reported in ppm relative to SiMe$_4$ ($^1$H and $^{13}$C{$^1$H} δ=0.0 ppm) using residual protio resonances of 7.16 ppm ($^1$H) and 128.07 ppm ($^{13}$C{$^1$H}) for benzene-d$_6$, 3.58 ppm ($^1$H) and 67.21 ($^{13}$C{$^1$H}) for THF-d$_8$, 5.32 ppm ($^1$H) and 53.84 ($^{13}$C{$^1$H}) for methylenechloride-d2.

Pyridinyl Tether Examples

Synthesis of Pyridinyl Tether Catalysts (and Catalyst Precursor Compounds)

Synthesis of Disodium 2,6-bis(cyclopentadienylmethyl)pyridine (Na$_2$[2,6-bis(CpCH$_2$)2Py].THF$_n$)

Sodium cyclopentadienide (0.83 M, 171 mL, 143 mmol, 4 equiv) was slowly added to a stirred THF solution of 2,6-bis(chloromethyl)pyridine (6.32 g, 36 mmol, 150 mL) over the course of 1 h. The mixture was stirred for 16 h then filtered through a medium porosity fritted funnel to remove precipitated NaCl. The volume of the dark purple solution was placed under reduced pressure and concentrated to a volume of 80 mL. Pentane (60 mL) was then layered on top and the biphasic mixture stored overnight to induce precipitation of the desired product. The precipitate was collected by filtration and washed with portions of n-hexane then dried in vacuo. Yield: 2.6 g, 9.31 mmol. 26.0%. $^1$H NMR (400.1 MHz, THF-d$_8$, 20° C.): δ=7.41 (t, 1H, J=7 Hz, p-Py), 6.90 (d, 2H, J=7 Hz, m-Py), 5.21 (m, 4H, Cp), 5.34 (m, 4H, Cp), 3.94 (s, 4H, CH$_2$) ppm. $^{13}$C{$^1$H} NMR (120.2 MHz, THF-d$_8$, 20° C.): δ=165.99, 136.09, 119.53, 115.27, 104.18, 103.04, 39.6 ppm. ATR-FTIR (powder): 3062 (m), 2976 (m), 2878 (m), 1590 (sh), 1571 (s), 1444 (s), 1414 (m), 1222 (w), 1179 (w), 1154 (m), 1055 (s), 1034 (s), 1024 (s), 996 (w), 898 (m), 787 (w), 740 (m), 711 (vs), 659 (w) cm$^{-1}$. THF content can vary between sample preparations, typical values range from 1.5-3.0 equivalents THF per (CpCH$_2$)$_2$Py moiety.

Synthesis of [2,6-bis(CpCH$_2$)$_2$Py]Zr$_2$(Cp*)$_2$Cl$_4$

A THF solution of Cp*ZrCl$_3$ (0.212 g, 0.645 mmol, 10 mL, 2 equiv), was combined at room temperature with a THF slurry of Na$_2$[(CpCH$_2$)Py] (0.098 g, 0.323 mmol, 5 mL). The resulting mixture was placed in sealed flask and heated to 60° C. for 48 h. The material was then cooled to room temperature and concentrated to a solid under reduced pressure. It was then re-dissolved in THF, filtered through a medium porosity fritted funnel packed with Celite to remove NaCl. Pentane (5-10 mL) was then added to the filtrate to induce precipitation of the desired product which was isolated by filtration to afford a pale yellow solid which was then dried under reduced pressure. Yield: 0.180 g, 0.219 mmol, 67.8%. $^1$-H NMR (400.1 MHz, C$_6$D$_6$, 20° C.): δ=6.99 (t, 1H, J=7 Hz, p-Py), 6.76 (d, 2H, J=7 Hz, m-Py), 6.15 (m, 4H, Cp), 5.72 (m, 4H, Cp), 4.34 (s, 4H, CH$_2$), 1.82 (s, 30H, Cp*) ppm.

Preparation of [2,6-bis(CpCH$_2$)Py]Zr$_2$(Cp*)$_2$(CH$_3$)$_4$

The precursor tetrachloride, [2,6-bis(CpCH$_2$)Py]Zr$_2$(Cp*)$_2$Cl$_4$ (0.074 g, 0.089 mmol), was dissolved in toluene (18 mL) and cooled to −78° C. Once equilibrated, An Et$_2$O solution of MeMgBr (119 μL, 0.357 mmol, 3.0 M, 4 equiv) was added via syringe over the course of 5 min. The reaction mixture was allowed to stir at −78° C. for 1 h before it was warmed to room temperature and stirred for an additional 2 h. Once at room temperature, the reaction mixture gradually turned cloudy and a precipitate (putatively MgX$_2$, x=Cl, Br) formed. The reaction mixture was filtered through Celite and the filtrate concentrated to a colorless solid. Yield 0.053 g, 0.071 mmol, 80.1%. $^1$H NMR (400.1 MHz, C$_6$D$_6$ 20° C.): δ=7.09 (t, 1H, J=7 Hz, p-Py), 6.84 (d, 2H, J=7 Hz, m-Py), 5.87 (m, 4H, Cp), 5.41 (m, 4H, Cp), 4.09 (s, 4H, CH$_2$), 1.72 (s, 30H, Cp*), −0.27 (s, 12H, CH$_3$) ppm.

Preparation of [2,6-bis(CpCH$_2$)Py]Hf$_2$(Cp*)$_2$Cl$_4$

A toluene suspension of Na$_2$[(CpCH$_2$)Py] (0.150, 0.540 mmol, 8 mL, 1 equiv) was added to a toluene solution of CpHfCl$_3$ (454 mg, 1.08 mmol, 8 mL, 2 equiv) dropwise over 5 min. The reaction mixture was allowed to react at ambient temperatures for 14 h. Thereafter, the toluene suspension was filtered through Celite to remove by-products and NaCl. The pale yellow filtrate was then concentrated to an off-white solid under gentle nitrogen flow. Yield 0.403 g, 0.402 mmol, 74.4%. $^1$H NMR (400.1 MHz, C$_6$D$_6$ 20° C.): δ=6.99 (t, 1H, J=7 Hz, p-Py), 6.72 (d, 2H, J=7 Hz, m-Py), 6.03 (m, 4H, Cp), 5.62 (m, 4H, Cp), 4.29 (s, 4H, CH$_2$), 1.85 (s, 30H, Cp*) ppm. $^{13}$C{$^1$H}NMR (120.2 MHz, C$_6$D$_6$, 20° C.): δ=160.08, 131.08, 121.95, 120.98, 116.16, 114.65, 111.81, 39.39, 12.11 ppm. ATR-FTIR (powder): 3639 (w), 2980 (w), 2957 (w), 2912 (s), 2856 (m), 1589 (m) 1576 (s), 1490 (m), 1452 (vs), 1430 (s), 1379 (s), 1219 (w), 1043 (m), 1027 (m), 831 (vs), 818 (vs), 749 (m), 685 (m), 412 (w) cm$^{-1}$.

Preparation of [2,6-bis(CpCH$_2$)Py]Zr$_2$(n-PrCp)$_2$Cl$_4$

A toluene suspension of Na$_2$[(CpCH$_2$)Py] (0.100 g, 0.358 mmol, 10 mL) was slowly added to a toluene solution of (n-PrCp)ZrCl$_3$(DME) (0.279 g, 0.716 mmol, 10 mL, 2 equiv). The resulting mixture was placed in sealed flask and heated to 40° C. for 12 h. The material was then cooled to room temperature, filtered through a medium porosity fritted funnel packed with Celite. The filtrate was concentrated to a pale yellow solid under reduced pressure, suspended in pentane and filtered. The resulting filter cake was washed with additional pentane (~3×5 mL) then dried in vacuo. Yield: 0.033 g, 0.043 mmol, 12.0%. $^1$H NMR (400.1 MHz, CD$_2$Cl$_2$ 20° C.): δ=7.71 (t, 1H, J=7 Hz, p-Py), 7.16 (d, 2H, J=7 Hz, m-Py), 6.35 (br m, 8H, nPrCp), 6.30 (m, 4H, Cp), 6.22 (m, 4H, Cp), 4.18 (s, 4H, CH$_2$), 2.59 (t, 4H, J=8 Hz, nf-Pr CH$_2$), 1.59 (dt, 4H, J$_{CH2}$=8 Hz, J$_{CH3}$=4 Hz, n-Pr CH$_2$), 0.93 (t, J=4 Hz, n-Pr CH$_3$) ppm.

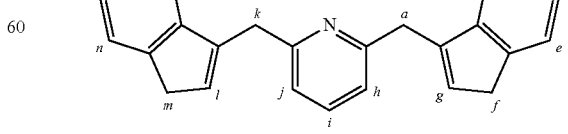

2,6-bis((1H-inden-3-yl)methyl)pyridine

Synthesis of 2,6-bis((H-inden-3-yl)methyl)pyridine ((IndCH$_2$)$_2$Py)

A THF solution of 2,6-bis(chloromethyl)pyridine (2.00 g, 11.36 mmol, 10 mL) was stirred at room temperature until homogenous. A THF solution of lithium indenide (3.00 g, 24.57 mmol, 20 mL) was added by dropwise addition. The resulting mixture solution was allowed to react overnight. During this time, the mixture turned from a colorless solution to an orange suspension. The reaction mixture was then concentrated to a solid under reduced pressure. The solid residue was extracted with pentane (100 mL) and filtered through Celite. The hydrocarbon filtrate was combined with CH$_2$Cl$_2$ (100 mL) and then washed with water (3×50-100 mL). Following washes, the organic phase was isolated, dried with MgSO$_4$, filtered and concentrated to a viscous yellow oil in vacuo. Yield: 3.27 g, 9.74 mmol, 85.80%. $^1$H NMR (400 MHz, CD$_2$Cl$_2$, 20° C.): δ=7.55-7.42 (m, 3H, b, i, q), 7.37-7.30 (m, 2H, n, e), 7.19 (m, J 4H, c, d, o, p), 7.06 (d, J=7.7 Hz, 2H, h, j), 6.25 (s, 2H, l, g), 4.10 (d, J=1.8 Hz, 4H, a, k), 3.38 (d, J=2.0 Hz, 4H, f, m) ppm. $^{13}$C{$^1$H} NMR (101 MHz, CD$_2$Cl$_2$, 20° C.): δ=159.46, 145.38, 144.89, 142.67, 137.03, 130.74, 126.27, 124.91, 124.00, 120.80, 119.99, 38.19, 37.80 ppm.

Synthesis of Li$_2$[((IndCH$_2$)$_2$Py]

An Et$_2$O solution of 2,6-bis(1H-inden-3-yl)methylpyridine (1.50 g, 4.47 mmol, 75 mL) was cooled to −30° C. A solution of n-BuLi in hexanes (3.3 mL, 8.94 mmol, 2.73 M) was then added dropwise over the course of 10 min resulting in the formation of a pale orange slurry. The mixture was allowed to stir for 2 h. It was then removed from cold bath and filtered over a medium porosity fritted funnel. The solids were washed with additional Et$_2$O (3×50 mL) and pentane (2×30 mL) then dried in vacuo. Yield: 1.30 g, 3.74 mmol, 83.7%. $^1$H NMR (400 MHz, THF-d8, 20° C.): δ=7.41 (t, 1H, J=8 Hz, p-Py), 7.25 (d, 2H, J=8 Hz, m-Py), 6.98-6.94 (m, 4Hm Ind), 6.40-6.37 (m, 4H, Ind), 6.31 (d, 2H, J=4 Hz, Ind), 5.74 (d 2H, J=4 Hz, Ind), 4.19 (s, 4H, CH$_2$) ppm.

Synthesis of Syn/anti Isomeric Mixture of [2,6-(IndCH$_2$)Py]Zr$_2$(Cp)$_2$Cl$_4$ Solid Li$_2$[2,6-(IndCH$_2$)$_2$Py] (0.500 g, 1.44 mmol) was slowly added in portions to a toluene solution of CpZrCl$_3$(DME) (1.02 g, 2.88 mmol, 50 mL, 2 equiv) over 20 min. This resulted in the gradual formation of a pale yellow solution. The mixture was then heated to 50° C. and allowed to react for 18 h. The mixture was then cooled to room temperature and filtered through medium porosity fritted funnel. The resulting filtrate was then concentrated to a solid in vacuo. The resulting solid was suspended in pentane (50 mL) and triturated for 15 min then filtered. The pale yellow filter-cake was then dried in vacuo for 2 h. Yield: 0.6 g. 0.76 mmol 52.9% i. $^1$H NMR (400 MHz, CD$_2$Cl$_2$, 20° C.): δ=7.77-7.58 (m, 6H, Ind), 7.33 (m, 1H, p-Py), 7.29-7.27 (m, 2H, m-Py), 6.73-6.67 (m, 4H, Ind), 6.49-6.44 (m, 2H, Ind), 6.18-6.16 (m, 10H, Cp), 4.53-4.49 (m, 2H, CH$_2$), 4.37-4.32 (m, 2H, CH$_2$) ppm.

Synthesis of Syn/anti Isomeric Mixture of [2,6-(IndCH$_2$)Py]Zr$_2$(n-PrCp)$_2$C$_4$ Solid Li$_2$[2,6-(IndCH$_2$)$_2$Py] (0.500 g, 1.44 mmol) was slowly added in portions to a toluene solution of CpZrCl$_3$(DME) (1.02 g, 2.88 mmol, 50 mL, 2 equiv) over 20 min. This resulted in the gradual formation of a pale orange solution. The mixture was then heated to 50° C. and allowed to react for 18 h. After 18 h, the reaction mixture had thickened considerably. Additional toluene (100 mL) was added and the mixture allowed to react an additional hour at 50° C. The mixture was then cooled to room temperature and concentrated to a solid under reduced pressure. The resulting solid was extracted with CH$_2$Cl$_2$ (50 mL) and filtered through a medium porosity fritted funnel packed with Celite. The filtrate was then dried in vacuo, suspended in pentane (50 mL) and triturated for 15 min then filtered. The pale yellow filter-cake was then dried in vacuo for 2 h. Yield: 0.267 g. 0.76 mmol 53.1%. $^1$H NMR (400 MHz, CD$_2$Cl$_2$, 20° C.): δ=7.69-7.51 (m, 4H), 7.29-7.22 (m, 5H), 7.08 (m, 2H), 6.66 (m, 2H), 6.38 (m, 2H), 6.01 (m, 2H), 5.89-5.84 (m, 6H), 4.50-4.33 (m, 4H, CH$_2$), 2.44 (t, 4H, J=8 Hz, Pr), 1.52-1.46 (m, 4H, Pr), 0.88 (t, 6H, J=8 Hz, Pr) ppm.

Synthesis of [2,6-(IndCH$_2$)Py]Zr$_2$(Cp*)$_2$Cl$_4$

Solid Li$_2$[2,6-(IndCH$_2$)$_2$Py] (0.200 g, 0.576 mmol) was slowly added in portions to a toluene solution of Cp*ZrCl$_3$(DME) (0.487 g, 1.15 mmol, 50 mL, 2 equiv) over 20 min. This resulted in the gradual formation of a pale orange solution. The mixture was then heated to 50° C. and allowed to react for 2 d. The mixture was then cooled to room temperature and concentrated to a solid under reduced pressure. The resulting solid was extracted with CH$_2$Cl$_2$ (50 mL) and filtered through a medium porosity fritted funnel packed with Celite. The filtrate was then dried in vacuo, suspended in pentane (50 mL) and triturated for 15 min then filtered. The pale yellow filter-cake was then dried in vacuo for 2 h. Yield: 0.3 g, mmol 56.1%. $^1$H NMR (400 MHz, CD$_2$Cl$_2$, 20° C.): δ=7.65-7.62 (m, 2H), 7.44 (br t, 1H, p-Py), 7.34-7.32 (m, 2H), 7.27-7.15 (m, 4H), 6.99-6.94 (m, 2H), 6.06 (m, 2H), 5.98-5.95 (m, 2H), 4.43-4.38 (m, 2H, CH$_2$), 4.02-3.93 (m, 2H, CH$_2$), 1.97-1.94 (30H, Me$_5$Cp, syn/anti) ppm.

| Catalyst | Structure |
|---|---|
| 5 | |
| 6 | |

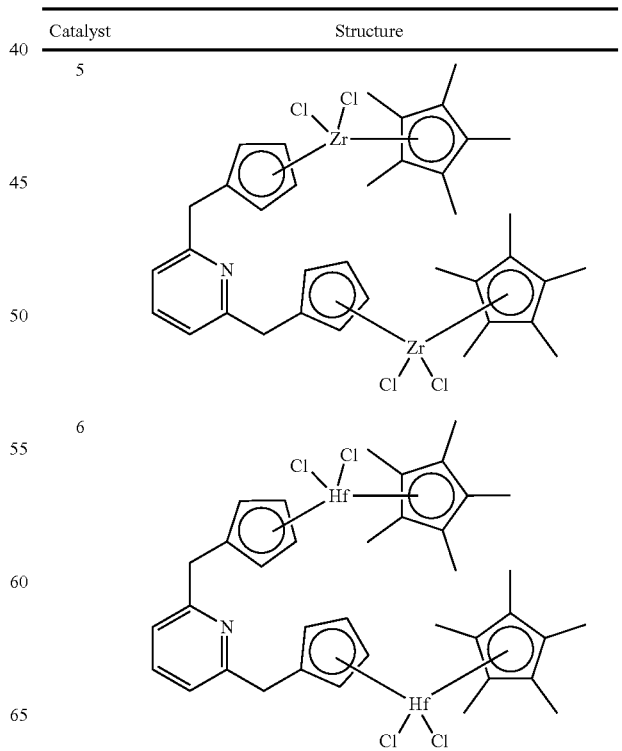

-continued

| Catalyst | Structure |
|---|---|
| 7 | 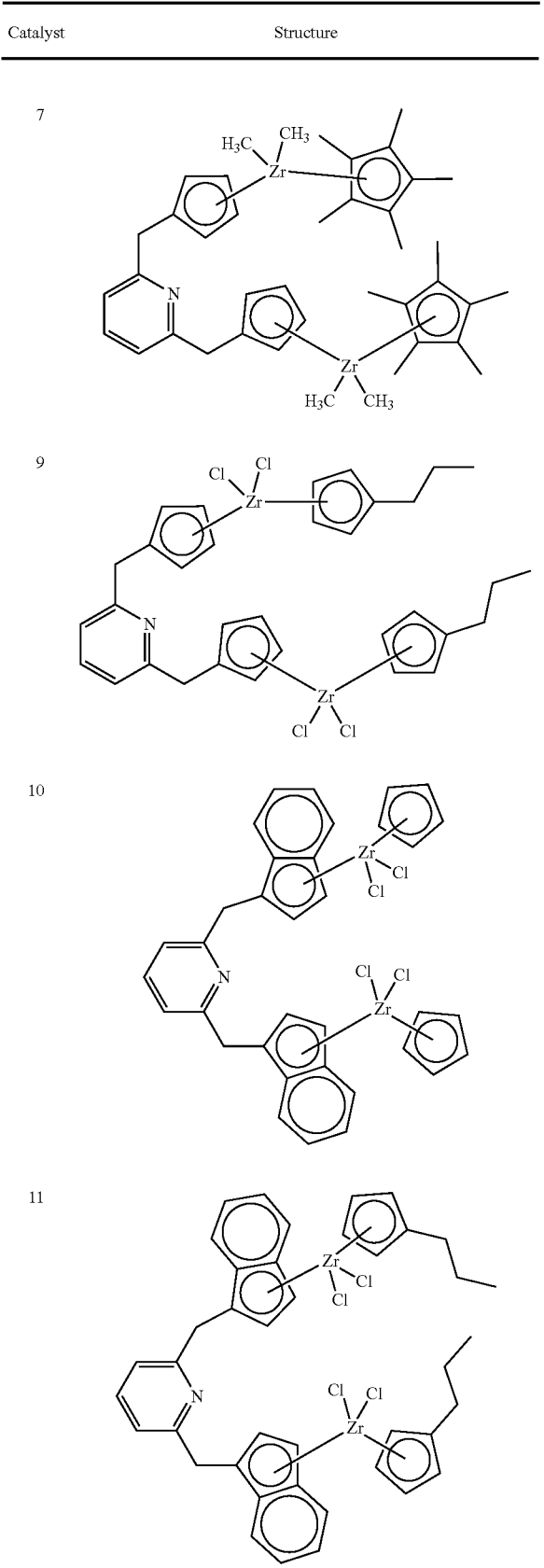 |
| 9 | |
| 10 | |
| 11 | |

-continued

| Catalyst | Structure |
|---|---|
| 12 | 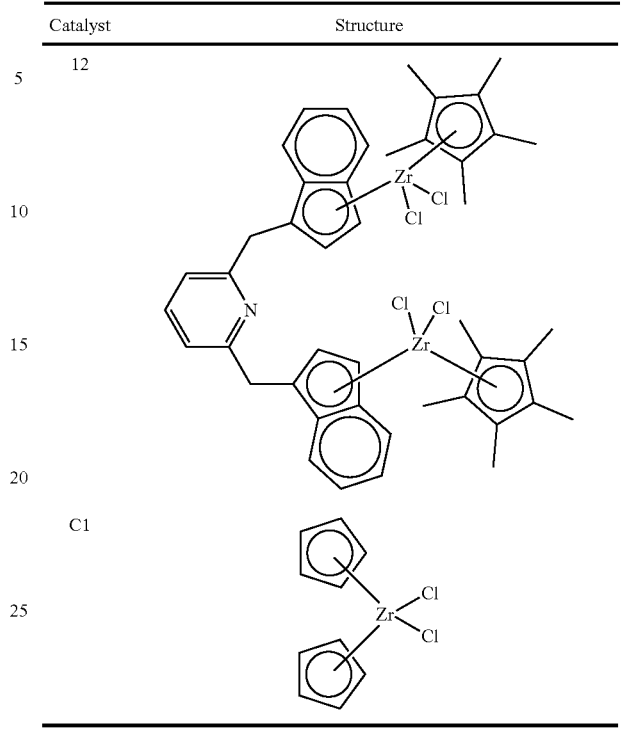 |
| C1 | |

Supportation on SMAO

For slurry polymerization screening, catalysts 10, 11 and 12 were supported on a methyl aluminoxane modified silica (SMAO). For additional details on SMAO see U.S. Pat. No. 9,120,879. In a representative supportation procedure a toluene solution of the catalyst (40 µmol, 5 mL) was combined to a vortexed suspension of SMAO. After a pre-determined contact time (20 min), volatiles were removed in vacuo to afford a pale colored, flowable powders. These supported catalysts were then utilized as obtained.

Polymerization Results

General Considerations

Polymerizations were conducted in either a 2 L stirred-tank reactor (zipper autoclave) or a high throughput parallel polymerization unit.

High Throughput Parallel Polymerization Reactor and Description

High throughput screening polymerizations were carried out in a parallel, pressure reactor, as generally described in U.S. Pat. Nos. 6,306,658; 6,455,316; 6,489,168; WO 00/09255; and Murphy et al., J. Am. Chem. Soc., 2003, 125, pp. 4306-4317, each of which is fully incorporated herein by reference. The experiments were conducted in an inert atmosphere ($N_2$) drybox using autoclaves equipped with an external heater for temperature control, glass inserts (internal volume of reactor=23.5 mL for C2 and C2/C8; 22.5 mL for C3 runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours. Although the specific quantities, temperatures, solvents, reactants, reactant ratios, pressures, and other variables are frequently changed from one polymerization run to the next, the following describes a typical polymerization performed in a parallel, pressure reactor.

In a typical procedure, a pre-weighed glass vial insert and disposable stirring paddle were fitted to each reaction vessel of the reactor, which contains 48 individual reaction vessels. The reactor was then closed and purged with ethylene. Each vessel was charged with enough solvent (typically isohexane) to bring the total reaction volume, including the subsequent additions, to the desired volume, typically 5 mL. A comonomer, if required, was injected into the reaction vessel and the reactor was heated to the set temperature and pressurized to the predetermined pressure of ethylene, while stirring at 800 rpm. The aluminum compound in toluene was then injected typically as scavenger followed by addition of the catalyst followed by the activator solution (typically 1.0-1.2 molar equivalents).

The catalyst solution (typically 0.020-0.080 umol of metal complex) was injected into the reaction vessel and the polymerization was allowed to proceed until a pre-determined amount of ethylene (quench value typically 20 psi) had been used up by the reaction. Alternatively, the reaction may be allowed to proceed for a set amount of time (maximum reaction time typically 30 to 60 minutes). Ethylene was added continuously (through the use of computer controlled solenoid valves) to the autoclaves during polymerization to maintain reactor gauge pressure (+/−2 psig) and the reactor temperature was monitored and typically maintained within +/−1° C. The reaction was quenched by pressurizing the vessel with compressed air. After the reactor was vented and cooled, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight.

Each polymerization was conducted using a parallel polymerization reactor as described above. In a typical experiment an automated syringe was used to introduce into the reactor the following reagents, if utilized, in the following order: isohexane (0.35 mL), an isohexane solution of TNOAL scavenger (200 µL, 5 mM), additional isohexane (0.35 mL), a toluene solution of the respective polymerization catalyst (150 µL, 0.4 mM), additional isohexane (0.35 mL), a toluene solution of the respective activator (150 µL, 0.4 mM), then additional isohexane so that the total solvent volume for each run was 5 mL. Each reaction was performed at a specified temperature range between 50 and 120° C., typically 95° C., while applying about 200 psig of ethylene (monomer) gas. Each reaction was allowed to run for about 1 hour (~3600 seconds) or until approximately 20 psig of ethylene gas uptake was observed, at which point the reactions were quenched with air (~300 psig). When sufficient polymer yield was attained (e.g., at least ~10 mg), the polyethylene product was analyzed by GPC using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 µm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.28 mg/mL and 400 uL of a polymer solution was injected into the system. The concentration of the polymer in the eluent was monitored using an evaporative light scattering detector. The molecular weights presented are relative to linear polystyrene standards and are uncorrected, unless indicated otherwise.

Equivalence is determined based on the mole equivalents relative to the moles of the transition metal in the catalyst complex.

For inventive Catalyst 7, the temperature was varied from 60° C. to 110° C. to study the effect of reactor temperature on molecular weight. Additionally, high throughput screening was utilized to establish the behavior of Catalyst 7 to varying molar ratios of activator to catalyst.

2 L Autoclave Reactor and Description

Autoclave polymerizations using a solution polymerization process in a 2.0-liter stirred-tank reactor (autoclave reactor). The autoclave reactor was equipped with a stirrer, a water-cooling/steam-heating element with a temperature controller, and a pressure controller. Solvents and monomers were first purified by passing through purification columns. Purification columns are regenerated periodically (twice/year) or whenever there was evidence of low catalyst activity.

Isohexane (0.7 L) was used as a solvent. It was fed into the reactor using a Pulsa pump and its flow rate was controlled by a mass flow controller. The purified ethylene feed was fed to the manifold upstream of the reactor and its flow rate was also regulated by a mass flow controller. A mixture of isohexane, tri-n-octylaluminum (TNOAL), and 1-hexene (0.03 L) was added to the same manifold through a separate line and the combined mixture of monomers and solvent was fed into the reactor using a single tube. The composition was controlled by adjusting the feed ratio of the monomers while the molecular weight of the polymer can be controlled using temperature. To establish comparative results, samples were produced with Catalyst C1 catalyst under identical process conditions. The collected samples were first placed on a boiling-water steam table in a hood to evaporate a large fraction of the solvent and unreacted monomers, and then, dried in a vacuum oven at a temperature of about 90° C. for about 12 hours. The vacuum oven dried samples were weighed to obtain yields. The comonomer content of the polymer was determined by FTIR. The monomer conversions were calculated using the polymer yield, composition and the amount of monomers fed into the reactor. Catalyst activity (also referred to as catalyst productivity) was calculated based on the yield and the feed rate of catalyst. All polymerizations were carried out at a gauge pressure of about 2.2 MPa. Melt flow rate (MFR) measurements were made as a proxy for molecular weight.

The catalysts used in these examples were Catalysts 5, 6, 7, and 9. The activator used was methylaluminoxane (30 wt % toluene solution). Both the catalyst and activator were first dissolved in toluene and the solution was kept in an inert atmosphere. The solutions of catalyst and activator were premixed and fed into the reactor using an ISCO syringe pump. The catalyst to activator feed ratio (molar) was set at 0.98. Tri-n-octylaluminum (TNOAL) solution (available from Sigma Aldrich, Milwaukee, Wis.) was further diluted in isohexane and used as a scavenger.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10 M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}=0.67$ and $K_{PS}=0.000175$ while a and K are for other materials as calculated and published in literature (Sun, T. et al. *Macromolecules* 2001, 34, 6812), except that for purposes of the present disclosure, $\alpha=0.695$ and K=0.000579 for linear ethylene polymers, $\alpha=0.705$ and K=0.0002288 for linear propylene polymers, $\alpha=0.695$ and K=0.000181 for linear butene polymers, a is 0.695 and K is 0.000579*(1−0.0087*w2b+0.000018*(w2b)^2) for ethylene-butene copolymer where w2b is a bulk wt % of butene comonomer, α is 0.695 and K is 0.000579*(1−0.0075*w2b) for ethylene-hexene copolymer where w2b is a bulk wt % of hexene comonomer, and α is 0.695 and K is 0.000579*(1−0.0077*w2b) for ethylene-octene copolymer where w2b is a bulk wt % of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3/1000$ TC) as a function of molecular weight. The short-chain branch (SCB) content per 1000 TC (SCB/1000 TC) is then computed as a function of molecular weight by applying a chain-end correction to the $CH_3/1000$ TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$w2=f*SCB/1000TC$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained.

$$\text{Bulk } IR \text{ ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the $CH_3/1000$ TC as a function of molecular weight, is applied to obtain the bulk $CH_3/1000$ TC. A bulk methyl chain ends per 1000 TC (bulk $CH_3$end/1000 TC) is obtained by weight-averaging the chain-end correction over the molecular-weight range. Then $w2b=f*\text{bulk } CH_3/1000TC$ bulk SCB/1000TC=bulk $CH_3$/1000TC−bulk CH3end/1000TC and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is wt % butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} \frac{[\eta]_{avg}}{KM_v^\alpha},$$

where $M_V$ is the viscosity-average molecular weight based on molecular weights determined by LS analysis and the K and α are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk wt % of butene comonomer, α is 0.695 and K is 0.000579*(1−0.0075*w2b) for ethylene-hexene copolymer where w2b is a bulk wt % of hexene comonomer, and α is 0.695 and K is 0.000579*(1−0.0077*w2b) for ethylene-octene copolymer where w2b is a bulk wt % of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

All molecular weights are reported in g/mol unless otherwise noted.

Autoclave Polymerization Results

Table 1 illustrates data of ethylene hexene copolymer formed by the catalyst systems having pyridyl tether Catalysts 5, 6, or 9. Table 1 also illustrates data of ethylene hexene copolymer formed by the comparative catalyst system having catalyst C1.

As shown in Table 1, Mw values for polymer formed by Catalysts 5 and 6 are high, while Mw values for polymer formed by Catalysts 9 and C1 are low. Polymer formed using Catalyst 5 has a narrow MWD, while polymer formed using Catalyst 6 has a very broad MWD. Furthermore, the activities of catalysts 5 and 9 are each above 0.4 kg/mmol*h. In addition, polymers formed by catalysts 5 and 6 have long chain branching with g'vis values of 0.91 and 0.88, respectively.

TABLE 1

| Catalyst | Catalyst Amount (mg) | Activity (Kg/mmol-hr) | T (° C.) | Time (s) | Yield (g) | $M_n$ (Kg/mol) |
|---|---|---|---|---|---|---|
| 5 | 2.5 | 0.4184 | 80 | 2844 | 9.981 | 1,073.08 |
| 6 | 2.2 | 0.1157 | 80 | 2778 | 1.960 | 67.79 |
| 9 | 1.1 | 0.4854 | 80 | 3600 | 6.917 | 35.53 |
| C1 | 1.2 | 0.6820 | 80 | 3602 | 28.01 | 38.53 |

| Catalyst | $M_w$ (Kg/mol) | $M_w/M_n$ | Wt % $C_6$ | LCB: g' (Vis Avg) |
|---|---|---|---|---|
| 5 | 2,602.89 | 2.42 | 1.53 | 0.91 |
| 6 | 2,072.77 | 30.58 | 2.03 | 0.88 |
| 9 | 305.23 | 8.59 | 5.13 | 1.03 |
| C1 | 147.94 | 3.8 | 3.49 | 1.00 |

Figure 2:
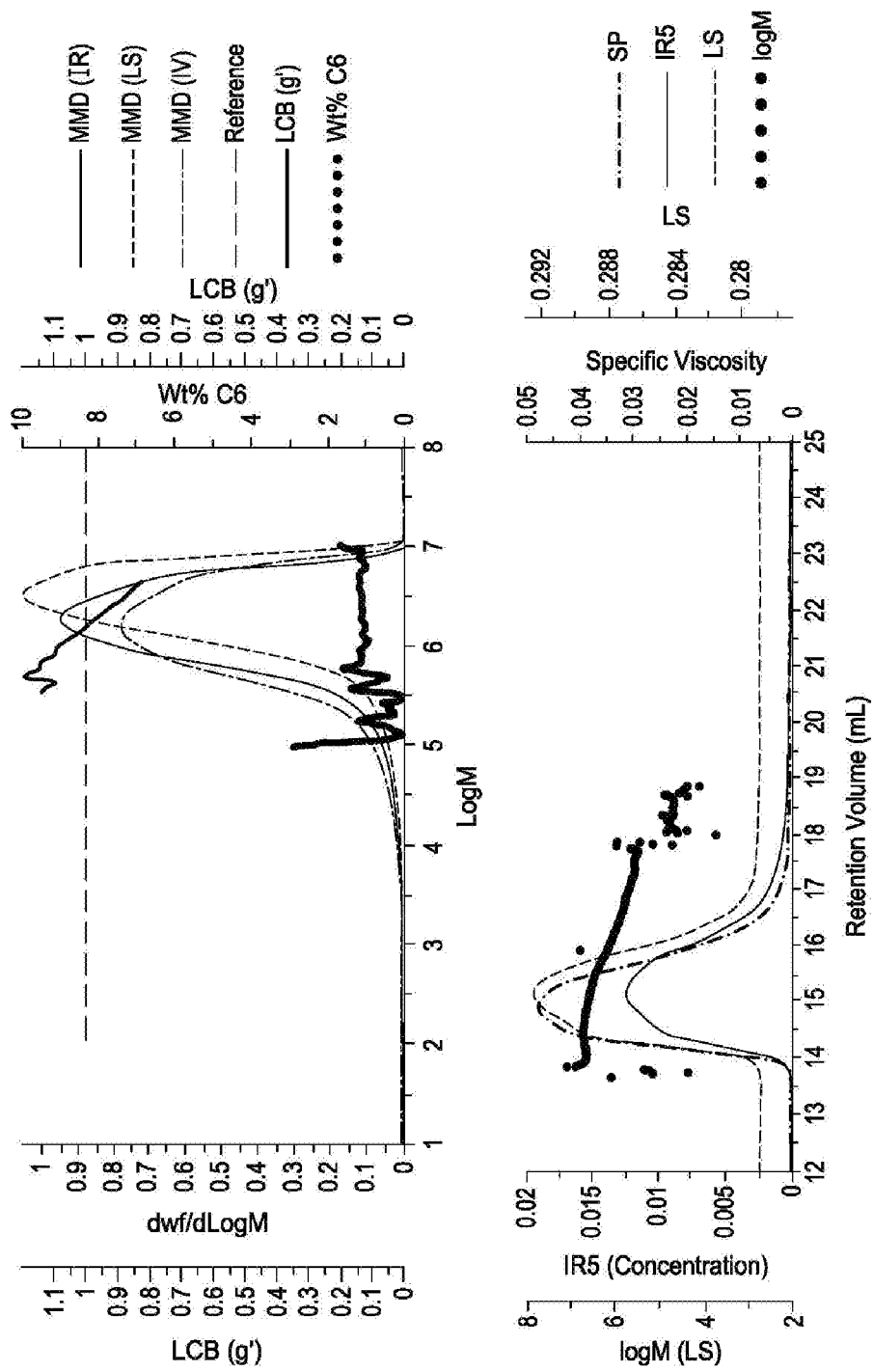
FIG. 2 is a gel permeation chromatography spectrum of the ethylene hexene copolymer formed by a catalyst system having a pyridyl tether catalyst, according to one embodiment.
Figure 3:
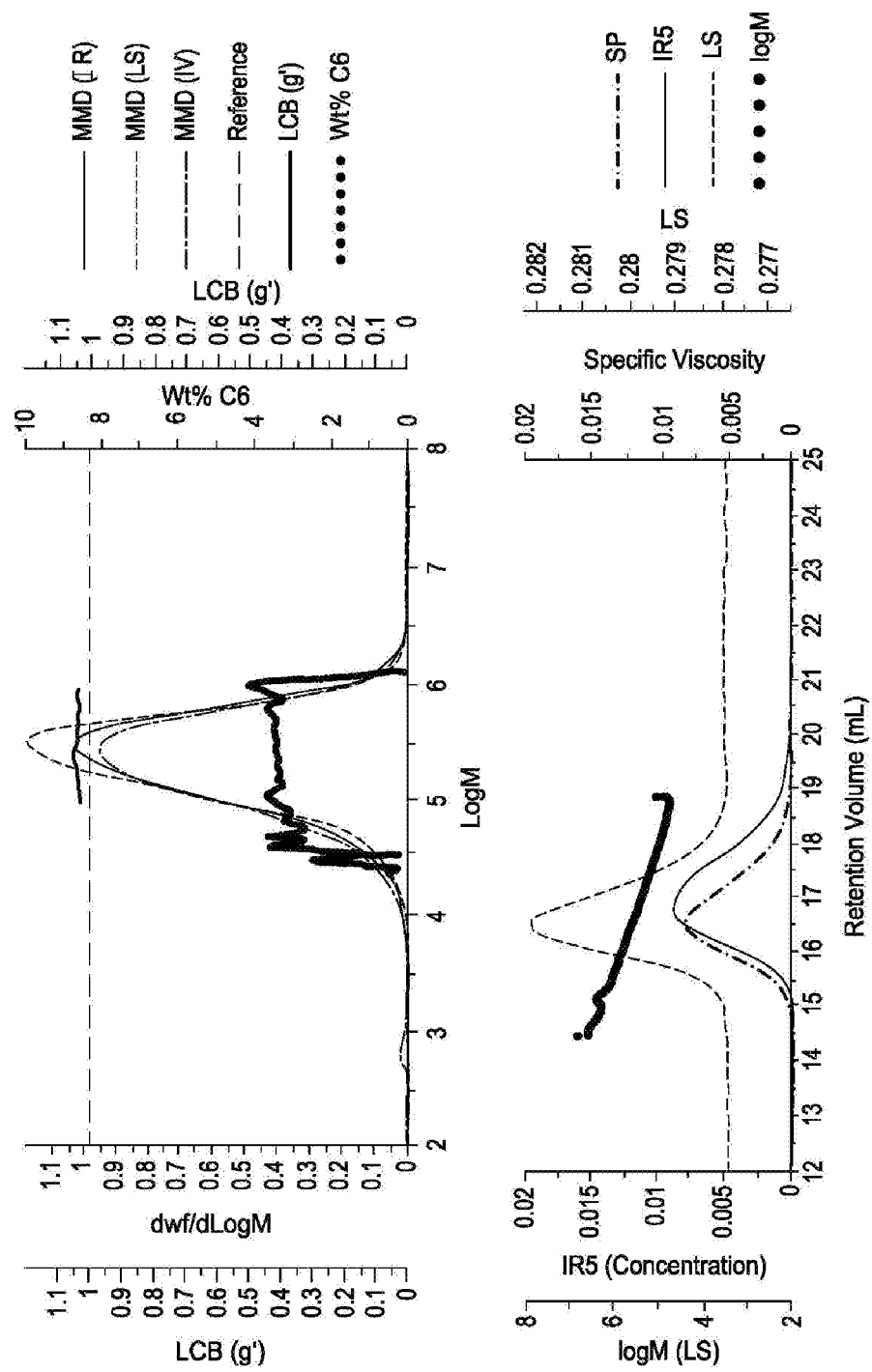
FIG. 3 is a gel permeation chromatography spectrum of the ethylene hexene copolymer formed by a catalyst system having a pyridyl tether catalyst, according to one embodiment.
Figure 4:
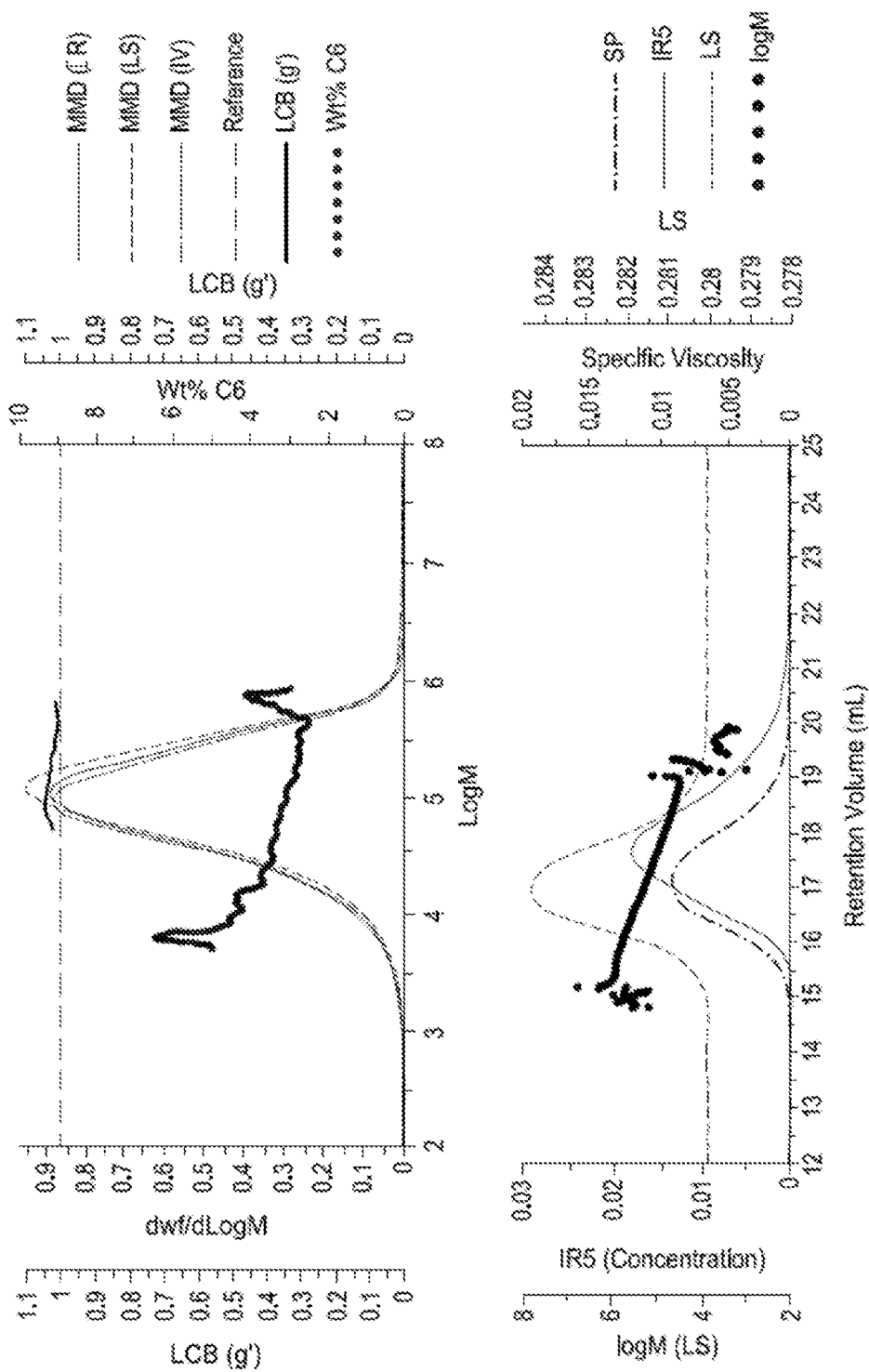
FIG. 4 is a gel permeation chromatography spectrum of the ethylene hexene copolymer formed by a catalyst system having a comparative catalyst, according to one embodiment.

FIG. 1 is a GPC spectrum of the ethylene hexene copolymer formed by the catalyst system having pyridyl tether catalyst 5. FIG. 2 is a GPC spectrum of the ethylene hexene copolymer formed by the catalyst system having pyridyl tether catalyst 6. FIG. 3 is a GPC spectrum of the ethylene hexene copolymer formed by the catalyst system having pyridyl tether catalyst 9. FIG. 4 is a GPC spectrum of the ethylene hexene copolymer formed by the catalyst system having comparative catalyst C1. The GPC results (FIGS. 1-4) demonstrate that pendent donor bimetallic catalysts can produce resins with narrow, yet multimodal, molecular weight distributions as indicated by the asymmetric (leaning shoulder) MWD trace obtained for polymers produced by Catalysts 5, 6, and 9. In contrast, the monometallic reference catalyst, C1, exhibits no such multimodal behavior when operated under comparative conditions. The GPC results also indicate that catalysts of the present disclosure can produce high molecular weight polyethylenes with long chain branching as indicated with g' slopes substantially less than 1. For example, polymers formed by Catalysts 5 and 6 have long chain branching with g'vis values of 0.91 and 0.88, respectively.

Solution High Throughput Screening Results

Figure 5:
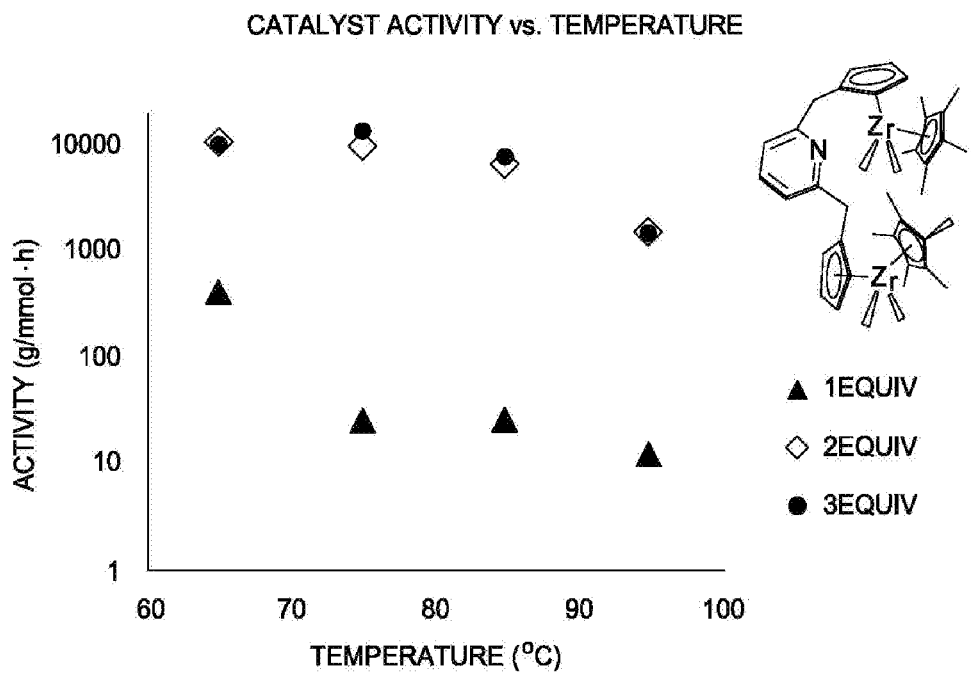
FIG. 5 is a graph illustrating catalyst activity versus temperature for a catalyst system having a pyridyl tether catalyst, according to one embodiment.
Figure 6:
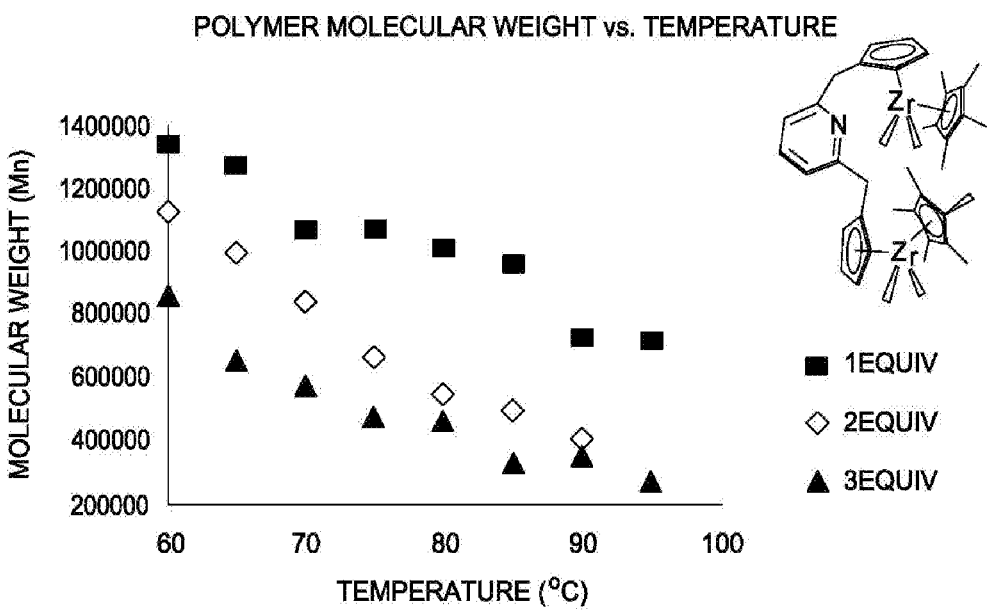
FIG. 6 is a graph illustrating molecular weight (Mn) of polymer versus temperature for ethylene hexene copolymer formed by a catalyst system having a pyridyl tether catalyst, according to one embodiment.

The behavior of this class of tethered catalysts was also assessed using high throughput screening tools to investigate the activity and molecular weight performance of these systems as a function of temperature and activator equivalents. FIG. 5 is a graph illustrating catalyst activity versus temperature for the catalyst system having pyridyl tether Catalyst 7. As shown in FIG. 5, utilization of a single activator equivalent with the tetra-alkylated catalyst, Catalyst 7, provided reasonably poor activities indicative of incomplete activation. FIG. 6 is a graph illustrating molecular weight (Mn) of polymer versus temperature for ethylene hexene copolymer formed by the catalyst system having Catalyst 7. As shown in FIG. 5 and FIG. 6, respectively, two equivalents of activator induced a substantial increase in catalyst activity with notable decrease in molecular weight performance across a broad temperature range. In the presence of 3 equivalents activator, Catalyst 7 exhibited no additional increase in activity but a decrease in molecular weight, providing molecular weight control of polymer formation by simply adjusting the amount of activator in a catalyst system.

These examples illustrate use of pyridine as a tether for bimetallic olefin polymerization catalysts. The pyridinyl moiety can interact with the activated metal centers to provide an activated catalyst having a unique bimetallic conformation which can provide polymers having unique properties (such as multimodality and broadened molecular weight distributions) as compared to monometallic analogues.

Table 2 further illustrates the polymerization performance of pyridyl tethered Catalysts 10, 11 and 12 on SMAO supports. Although supported catalysts 10, 11, and 12 exhibit low to moderate activities, they show broadened molecular weight distributions relative to single-site catalysts; many single site catalysts typically exhibit Mw/Mn<3.5. Rapid GPC analysis was not performed for samples producing less than 10 mg of polymer.

TABLE 2

| Supported Catalyst | Quantity Supported Catalyst (mg) | Supported Catalyst Loading (µmol/g) | Volume 1-Hexene co-monomer ((µL) | concentration 1-Hexene co-monomer (mM) | Activity kg[polymer]/ mmo[cat] 1 hr | T (° C.) | Time (s) | Yield (mg) |
|---|---|---|---|---|---|---|---|---|
| A-10 | 10 | 0.3 | 40 | 150 | 0.24 | 0.42 | 95 | 3600 | 5 |
| A-11 | 11 | 0.3 | 40 | 150 | 0.24 | 0.66 | 95 | 3601 | 7.9 |
| A-12 | 13 | 0.3 | 40 | 150 | 0.24 | 1.17 | 95 | 3601 | 14 |
| B-10 | 10 | 0.3 | 40 | 100 | 0.16 | 0.63 | 95 | 3601 | 7.6 |
| B-11 | 11 | 0.3 | 40 | 100 | 0.16 | 0.84 | 95 | 3602 | 10.1 |
| B-12 | 12 | 0.3 | 40 | 100 | 0.16 | 1.26 | 95 | 3601 | 15.1 |
| C-10 | 10 | 0.3 | 40 | 50 | 0.08 | 0.62 | 95 | 3601 | 7.5 |
| C-11 | 11 | 0.3 | 40 | 50 | 0.08 | 0.83 | 95 | 3600 | 10 |
| C-12 | 12 | 0.3 | 40 | 50 | 0.08 | 1.33 | 95 | 3600 | 16 |
| D-11 | 11 | 0.3 | 40 | 0 | 0 | 0.99 | 95 | 3601 | 11.9 |
| D-12 | 12 | 0.3 | 40 | 0 | 0 | 0.85 | 95 | 3601 | 10.2 |
| D-13 | 13 | 0.3 | 40 | 0 | 0 | 1.41 | 95 | 3600 | 17 |

| Supported Catalyst | Quantity Supported Catalyst (mg) | Supported Catalyst Loading (µmol/g) | Volume 1-Hexene co-monomer ((µL) | concentration 1-Hexene co-monomer (mM) | Mn (g/mol) | Mw (g/mol) | Mw/Mn |
|---|---|---|---|---|---|---|---|
| A-10 | 10 | 0.3 | 40 | 150 | 0.24 | — | — | — |
| A-11 | 11 | 0.3 | 40 | 150 | 0.24 | — | — | — |
| A-12 | 13 | 0.3 | 40 | 150 | 0.24 | 91074 | 368866 | 4.1 |
| B-10 | 10 | 0.3 | 40 | 100 | 0.16 | — | — | — |
| B-11 | 11 | 0.3 | 40 | 100 | 0.16 | 34904 | 405591 | 11.6 |
| B-12 | 12 | 0.3 | 40 | 100 | 0.16 | 82358 | 346009 | 4.2 |
| C-10 | 10 | 0.3 | 40 | 50 | 0.08 | — | — | — |
| C-11 | 11 | 0.3 | 40 | 50 | 0.08 | 67042 | 564868 | 8.4 |
| C-12 | 12 | 0.3 | 40 | 50 | 0.08 | 109274 | 459603 | 4.2 |
| D-10 | 10 | 0.3 | 40 | 0 | 0 | 204088 | 912743 | 4.5 |
| D-11 | 11 | 0.3 | 40 | 0 | 0 | 93542 | 899270 | 9.6 |
| D-12 | 12 | 0.3 | 40 | 0 | 0 | 138671 | 471425 | 3.4 |

Synthesis of Phenyl Tether Catalysts (and Catalyst Precursor Compounds)
Phenyl Tether Examples

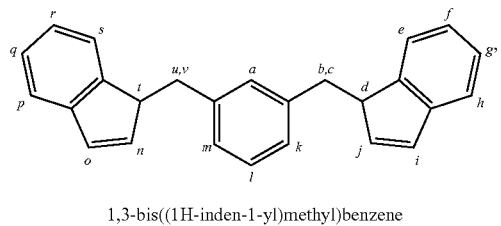 [SMILES: C1=CC(Cc2cccc(CC3C=Cc4ccccc43)c2)c2ccccc21]

1,3-bis((1H-inden-1-yl)methyl)benzene

Synthesis of 1,3-bis((H-inden-1-yl)methyl)benzene ((IndCH$_2$)$_2$Ph)

A bright red Et$_2$O solution of lithium indenide (10.20 g, 83.54 mmol, 150 mL, 2 equiv) was slowly added to 1,3-bis(bromomethyl)benzene (10.00 g, 37.88 mmol.) The resulting mixture was then heated to 40° C. in a sealed flask. The reaction mixture slowly turned pale yellow. The next morning the reaction was concentrated to a pale yellow semi-solid under reduced pressure. It was then stirred in hexanes (200 mL) for 30 minutes. The resulting slurry was filtered through celite and filtrate concentrated to a solid residue under nitrogen purge. The resulting clear yellow oil was analyzed via $^1$H NMR spectroscopy and showed to be desired product. Yield: 12.32 g, 36.87 mmol, 94.30%. $^1$H NMR (400 MHz, CD$_2$Cl$_2$, 20° C.): δ=7.36-7.06 (m, 12H, a, e-h, k-m, p-s), 6.79 (d, J=5.3 Hz, 2H, h, s), 6.41 (ddd, J=12.3, 5.5, 1.9 Hz, 2H, i, t), 3.71 (dt, J=8.8, 6.8 Hz, 2H, d, t), 3.10 (ddd, J=13.4, 6.7, 4.7 Hz, 2H, b, u), 2.72 (dd, J=13.4, 8.8 Hz, 2H, c, v). $^{13}$C{$^1$H}NMR (101 MHz, CD$_2$Cl$_2$) δ 147.47, 147.43, 144.74, 140.50, 140.47, 139.43, 139.41, 131.13, 131.11, 130.30, 130.19, 128.37, 127.32, 127.30, 126.94, 124.93, 123.58, 123.56, 121.35, 52.20, 52.18, 38.14 ppm.

Synthesis of Dilithium 1,3-bis(indenidemethyl)benzene (Li$_2$[(IndCH$_2$)Ph])

A hexane solution of n-BuLi (2.07 mL, 3.32 mmol, 1.6 M, 2.01 equiv) was added to a −60° C. Et$_2$O solution of 1,3-(IndCH$_2$)$_2$Ph (0.552 g, 1.65 mmol, 100 mL) over the course of 3 min. The resulting colorless mixture was allowed to react at −60° C. for 30 min before it was warmed to room temperature. As the mixture warmed, it gradually turned yellow then orange in color. Once at room temperature, it was allowed to react for 1 h. The mixture was then concentrated to a solid residue under reduced pressure. The resulting residue was triturated in pentane (40 mL) for 1 h and then filtered using a medium porosity fritted funnel. The resulting filter cake was washed with additional portions of pentane (3×30 mL) and dried in vacuo to afford a near colorless powder. Yield: 0.486 g, 1.40 mmol, 85.03%. Residual ether content can vary between sample preparations, typical values range from 0.1-0.5 equivalents ether per (IndCH$_2$)$_2$Ind moiety. $^1$H NMR (400.1 MHz, THF-d8, 20° C.): δ=7.36 (d, 2H, J=8 Hz, Ind), 7.32 (s, 1H, i-Ph), 7.22 (d, 2H, J=8 Hz, Ind), 7.02-6.97 (m, 3H, m-, p-Ph), 6.44-6.61 (m, 6H, Ind), 5.71 (d, 2H, J=4 Hz), 4.10 (s, 4H, CH$_2$) ppm.

Synthesis of Syn/anti Isomeric Mixture of [2,6-(IndCH$_2$)$_2$Ph]Zr$_2$(Cp)$_2$Cl$_4$ Solid Li$_2$[1,3-(IndCH$_2$)$_2$Ph] (0.343 g, 0.99 mmol) was slowly added in portions to a toluene solution of CpZrCl$_3$ (DME) (0.699 g, 1.98 mmol 75 mL, 2 equiv) over the course of 20 min. The resulting mixture was heated to 50° C. and allowed to react for 18 h. The mixture, now bright yellow, was combined with additional toluene (100 mL) and allowed to stir and additional hour. The mixture was then concentrated to a solid under reduced pressure, extracted with CH$_2$Cl$_2$ (40 mL) and filtered through a medium porosity fritted funnel packed with Celite. The filtrate was concentrated to a solid under reduced pressure, suspended in pentane (40 mL) and filtered. The resulting filter cake was washed with additional portions of pentane (3×20 mL) and dried in vacuo. Yield: 0.360 g, 0.17 mmol, 46.2%. $^1$H NMR (400 MHz, CD$_2$Cl$_2$, 20° C.): δ=7.61-7.56 (m, 4H, Ind) 7.31-7.17 (m, 4H), 7.10-7.04 (m, 3H), 6.68 and 6.65 (two s, 1H, syn/anti i-Ph), 6.52-6.50 (m, 2H), 6.42-6.41 (m, 2H), 6.13 and 6.12 (two s, 10H, syn/anti Cp), 4.30-4.12 (m, 4H, syn/anti CH$_2$) ppm.

Synthesis of Syn/anti Isomeric Mixture of [2,6(IndCH$_2$)$_2$Ph]Zr$_2$(n-PrCp)$_2$Cl$_4$ Solid Li$_2$[1,3-(IndCH$_2$)$_2$Ph] (0.200 g, 0.577 mmol) was slowly added in portions to a toluene solution of (n-PrCp)ZrCl$_3$(DME) (0.456 g, 1.16 mmol 75 mL, 2 equiv) over the course of 20 min. The resulting mixture was heated to 50° C. and allowed to react for 18 h. The mixture, now bright yellow, was combined with additional toluene (100 mL) and allowed to stir and additional hour. The mixture was then concentrated to a solid under reduced pressure, extracted with CH$_2$Cl$_2$ (40 mL) and filtered through a medium porosity fritted funnel packed with Celite. The filtrate was concentrated to a solid under reduced pressure, suspended in pentane (40 mL) and filtered. The resulting filter cake was washed with additional portions of pentane (3×20 mL) and dried in vacuo. Yield: 0.236 g, 0.270 mmol, 46.9%. $^1$H NMR (400 MHz, CD$_2$Cl$_2$, 20° C.): δ=7.61-7.54 (m, 4H), 7.30-7.22 (m, 2H), 7.21-7.18 (m, 3H), 7.18-7.05 (m, 3H), 6.52 (m, 2H), 6.38 (m, 2H), 6.04-5.91 (m, 8H prCp), 4.29-4.24 (m, 2H, CH$_2$), 4.15-4.10 (m, 2H CH$_2$), 2.48-2.42 (m, 4H, n-Pr CH$_2$), 1.52-1.46 (m, 4H, n-Pr CH$_2$), 0.94-0.86 (m, 6H, (m, 4H, n-Pr CH$_3$) ppm.

Synthesis of Syn/anti Isomeric Mixture of [2,6-(IndCH$_2$)$_2$Ph]Zr$_2$(Cp*)$_2$Cl$_4$ Solid Li$_2$[2,6-(IndCH$_2$)$_2$Ph] (0.200 g, 0.577 mmol) was slowly added in portions to a toluene solution of Cp*ZrCl$_3$ (DME) (0.488 g, 1.16 mmol, 75 mL, 2 equiv) over the course of 20 min. The resulting mixture was heated to 50° C. and allowed to react for 2 d. The mixture, now bright yellow, was combined with additional toluene (100 mL) and allowed to stir and additional hour. The mixture was then concentrated to a solid under reduced pressure, extracted with CH$_2$Cl$_2$ (40 mL) and filtered through a medium porosity fritted funnel packed with Celite. The filtrate was concentrated to a solid under reduced pressure, suspended in pentane (40 mL) and filtered. The resulting filter cake was washed with additional portions of pentane (3×20 mL) and dried in vacuo. Yield: 0.400 g, 0.43 mmol, 74.5%. $^1$H NMR (400 MHz, CD$_2$Cl$_2$, 20° C.): δ=7.70-7.66 (m, 2H), 7.42-7.18 (m, 8H), 6.95-6.89 (m, 2H), 6.02-5.91 (m, 4H), 4.48-4.42 (m, 2H, CH$_2$), 4.08-3.99 (i, 2H, CH$_2$), 1.97 and 1.92 (two s, 30H, syn/anti CH$_3$ Cp*) ppm.

| Catalyst | Structure |
|---|---|
| 5 | |
| 21 | |

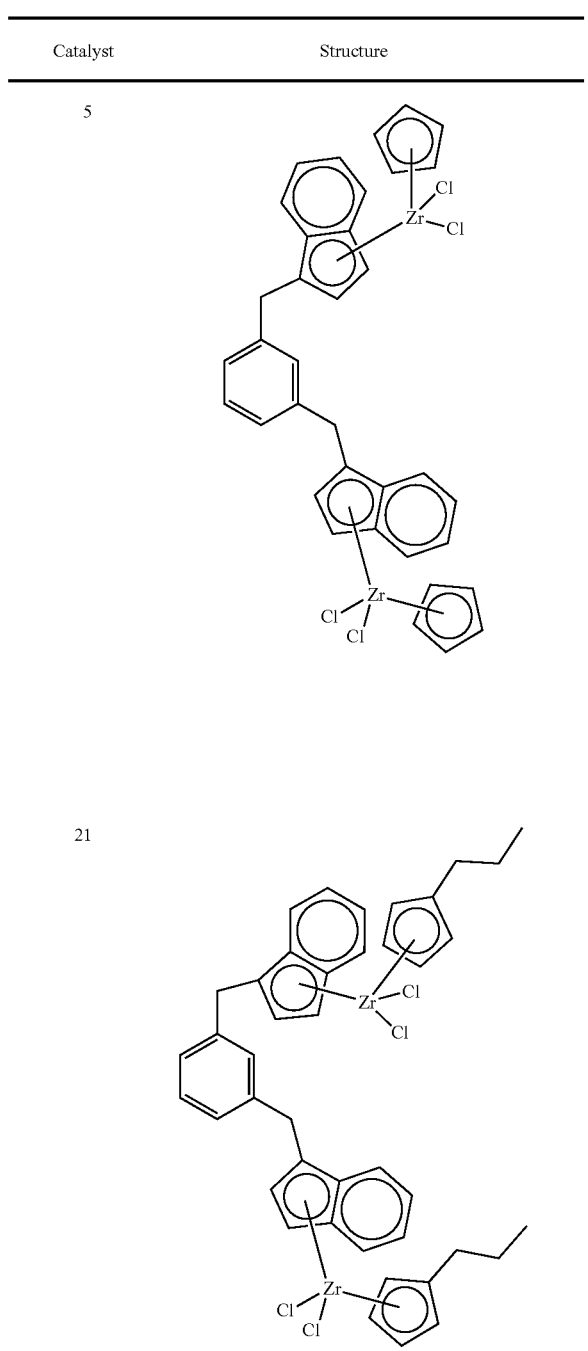

-continued

| Catalyst | Structure |
|---|---|
| 13 | 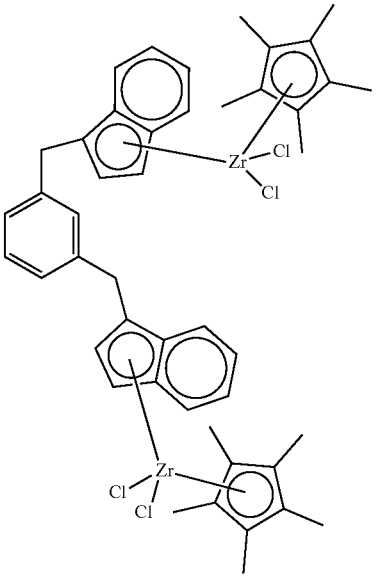 |

Supportation on SMAO

For slurry polymerization screening, phenyl tethered catalysts 1-3 were supported on a methyl aluminoxane modified silica (SMAO). For additional details on SMAO see U.S. Pat. No. 9,120,879. In a representative supportation procedure a toluene solution of the catalyst (40 μmol, 5 mL) was combined to a vortexed suspension of SMAO. After a contact time (20 min), the supported catalyst was dried in vacuo for 3 h to afford a pale, yellow colored, flowable powders. These supported catalysts were then utilized as obtained.

Autoclave Polymerization Results

Solution polymerizations for phenyl tether catalysts were performed under the same conditions as for the pyridyl tether catalysts, except where indicated in Table 3.

Table 3 illustrates data of ethylene hexene copolymer formed by the catalyst systems having phenyl tether Catalyst 5. The activator used in both runs was a toluene solution of MAO (30% wt)

TABLE 3

| Catalyst | Catalyst Amount (mg) | Activity (Kg/ mmol- hr) | T (° C.) | Time(s) | Yield (g) | $M_w$ (Kg/mol) |
|---|---|---|---|---|---|---|
| Run 1 | 5 | 2.0 | 5.85 | 80 | 2844 | 1.960 | 210.8 |
| Run 2 | 5 | 1.0 | 47.95 | 80 | 2778 | 9.981 | 137.5 |

TABLE 3-continued

| Catalyst | Catalyst Amount (mg) | $M_n$ (Kg/ mol) | $M_w/M_n$ | Wt % $C_6$ | LCB: g' (Vis Avg) |
|---|---|---|---|---|---|
| Run 1 | 5 | 2.0 | 44.2 | 4.77 | 2.58 | 1.034 |
| Run 2 | 5 | 1.0 | 32.8 | 4.20 | 3.27 | 1.016 |

In run 1, the pre-contact time between the activator and Catalyst 5 was less than 5 min. The comparatively short contact time in run 1 resulted in incomplete activation of the catalyst and the reduced catalyst performance.

Figure 7:
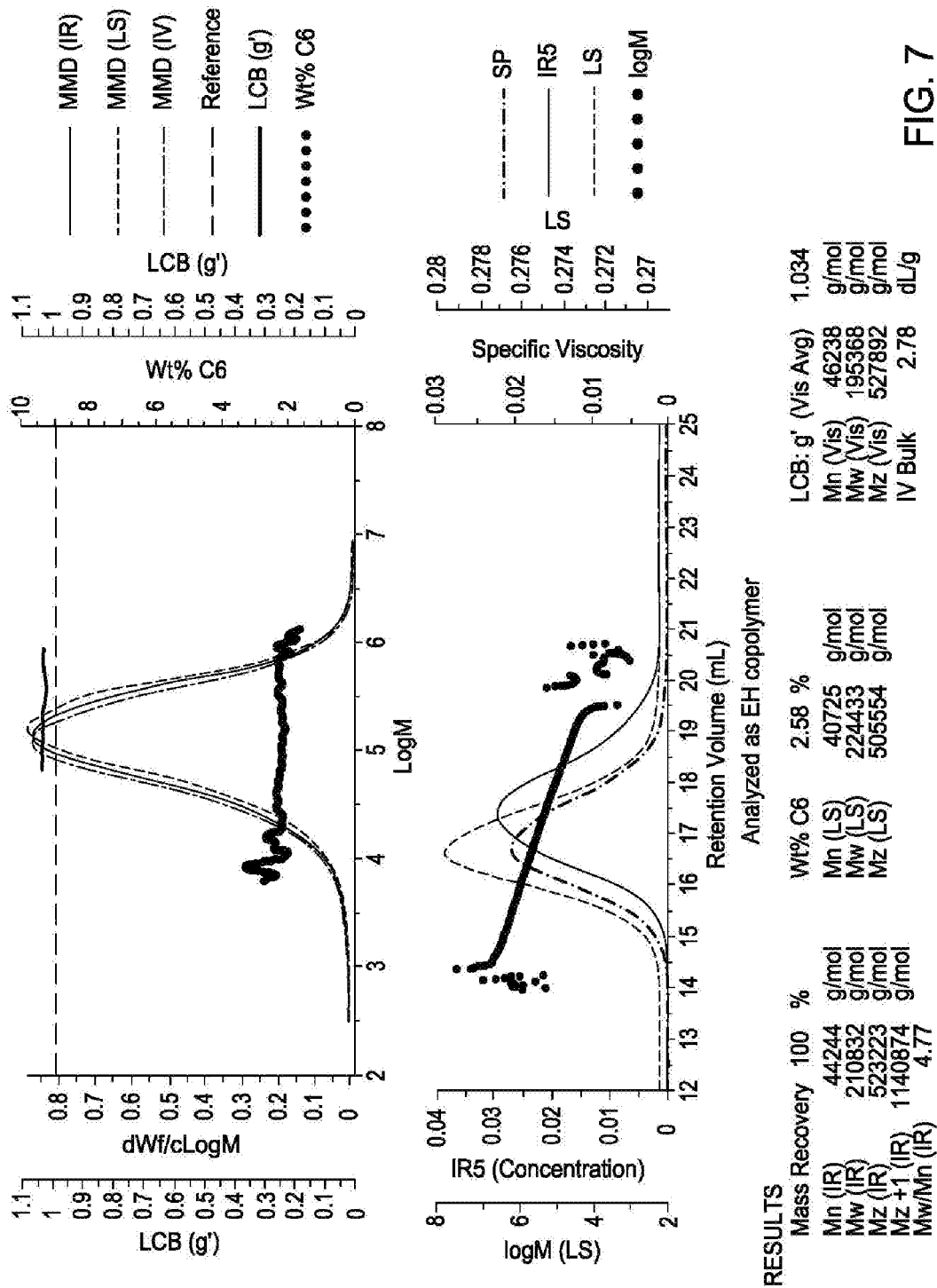
FIG. 7 is a gel permeation chromatography spectrum of the ethylene hexene copolymer formed by a catalyst system having a phenyl tether catalyst, according to one embodiment.
Figure 8:
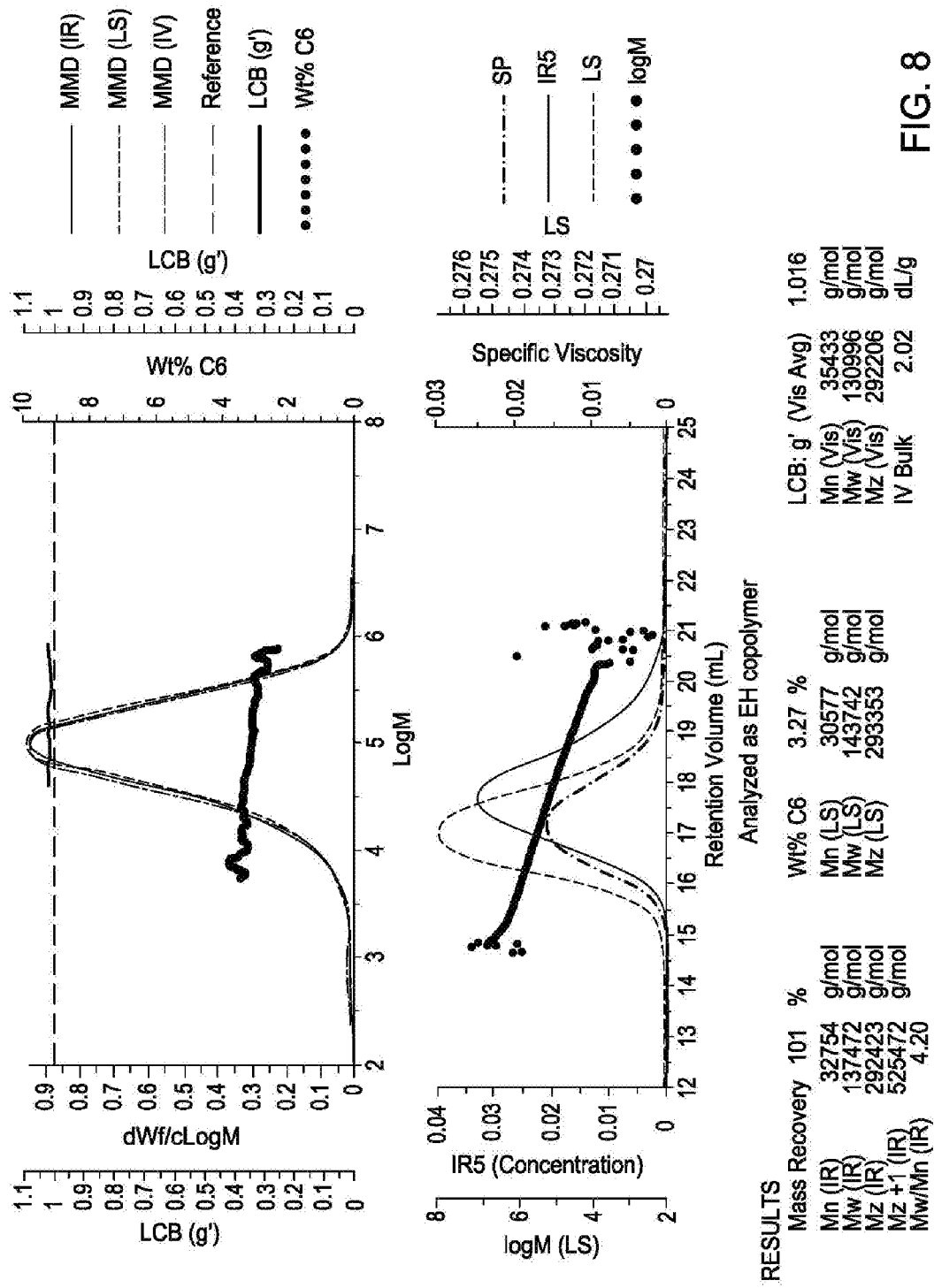
FIG. 8 is a gel permeation chromatography spectrum of the ethylene hexene copolymer formed by a catalyst system having a phenyl tether catalyst, according to one embodiment.

FIG. 7 is a GPC spectrum of the ethylene hexene copolymer formed by the catalyst system having phenyl tether Catalyst 5 under Run 1 conditions. FIG. 8 is a GPC spectrum of the ethylene hexene copolymer formed by the catalyst system having phenyl tether Catalyst 5 under Run 2 conditions. As shown in FIGS. 7 and 8, the 2,6-bismethylenephenyl tethered Catalyst 5 can produce relatively low-molecular weight resins with broadened molecular weight distributions. A notable feature of these resins is their very low-levels of comonomer incorporation which is further demonstrated in high throughput slurry polymerization screenings as discussed below.

Figure 9:
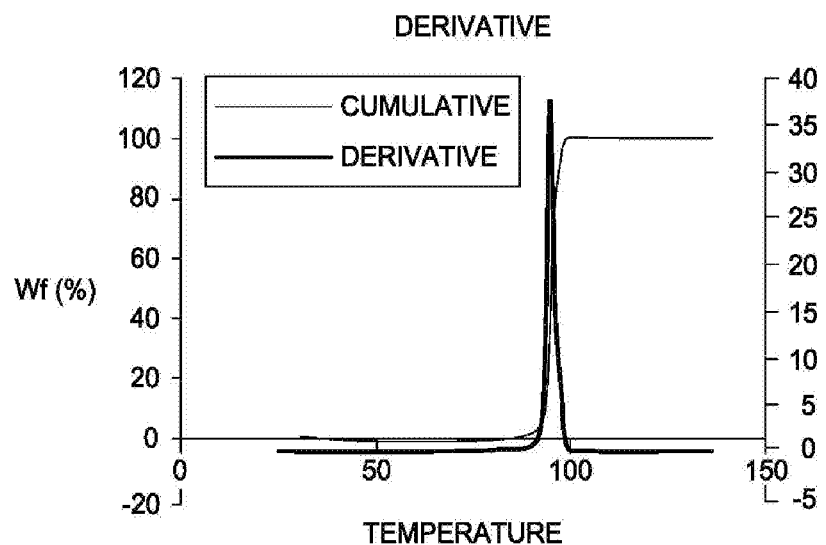
FIG. 9 is a Temperature Rising Elution Fractionation spectrum of the ethylene hexene copolymer formed by a catalyst system having a phenyl tether catalyst, according to one embodiment.
Figure 10:
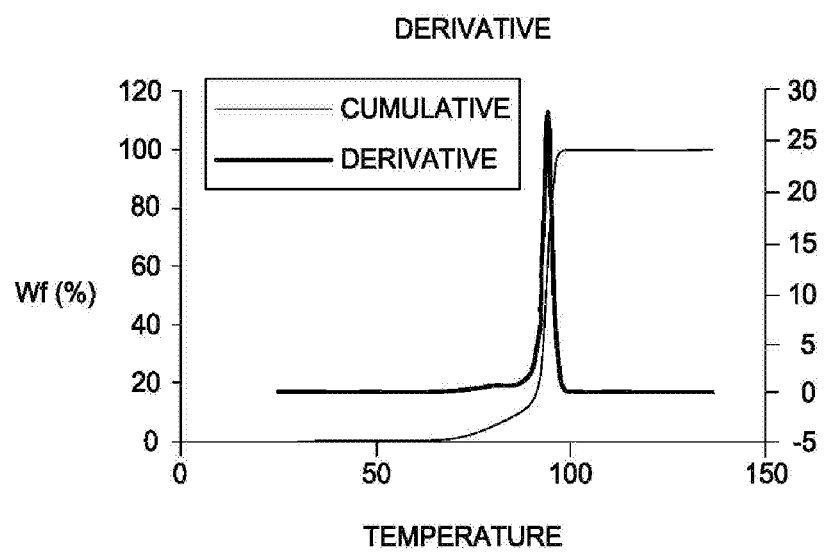
FIG. 10 is a Temperature Rising Elution Fractionation spectrum of the ethylene hexene copolymer formed by a catalyst system having a phenyl tether catalyst, according to one embodiment.

FIG. 9 is a TREF spectrum of the ethylene hexene copolymer formed by the catalyst system having Catalyst 5 under Run 1 conditions. FIG. 10 is a TREF spectrum of the ethylene hexene copolymer formed by the catalyst system having Catalyst 5 under Run 2 conditions. As shown in FIGS. 9 and 10, the composition distribution for both resins produced by catalyst 1 is proximally uniform in that hexene incorporation is substantially the same across the entire range of molecular weights of the polymers of the composition as indicated by the C6 wt % line of the GPC spectra. Furthermore, with respect to gas-phase polyethylene processes where mixed catalysts are utilized, the performance properties of 2,6-bismethylenephenyl tethered catalysts may prove highly desirable as a low molecular weight, low-comonomer component in bimodal polyethylene blends.

High Throughput Slurry Polymerization Results

To further demonstrate the polymerization performance of the phenyl tethered catalysts, slurry polymerizations were conducted for phenyl tethered catalysts using high through put experimentation (HTE) methods similar to those described above. In these experiments, phenyl tethered Catalysts 5, 13, and 21 were supported on SMAO at a loading of 40 μmol[catalyst]/g[SMAO]. The catalyst were then screened in the presence of varying 1-hexene concentrations. The results demonstrate that Catalysts 5, 13, and 21 exhibit high activity on support and while showing little to no response to increasing concentrations of co-monomer as indicated by wt % C6 determined by FTIR spectroscopy and differential scanning calorimetry (DSC), melting point temperature (Tm). Polymer samples from entries B-1, B-2 and B-3 were subjected to additional analysis by GPC-4D. As Table 4 indicates, B1-B3 show broadened molecular weight distributions, low wt % C6 and long chain branching as indicated by fractional g' vis average. Note: wt % C6 values in Table 4 were determined by FTIR spectroscopy using HTE instrumentation and vary slightly from wt % C6 values determined by FTIR spectroscopy on higher resolution GPC-4D instrumentation.

TABLE 4

| Entry | Supported Catalyst | Quantity Supported Catalyst (mg) | Supported Catalyst Loading (μmol/g) | Volume 1-Hexene co-monomer ((μL) | concentration 1-Hexene co-monomer (mM) | Activity kg[polymer]/ mmo[cat] 1 hr | T (° C.) | Time (s) | Yield (mg) |
|---|---|---|---|---|---|---|---|---|---|
| A-1 | 5 | 0.3 | 40 | 150 | 0.24 | 49.66 | 95 | 589 | 97.5 |
| A-2 | 21 | 0.3 | 40 | 150 | 0.24 | 29.19 | 95 | 1004 | 97.7 |
| A-3 | 13 | 0.3 | 40 | 150 | 0.24 | 18.95 | 95 | 1491 | 94.2 |
| B-1 | 5 | 0.3 | 40 | 100 | 0.16 | 38.30 | 95 | 734 | 93.7 |
| B-2 | 21 | 0.3 | 40 | 100 | 0.16 | 29.31 | 95 | 995 | 97.2 |
| B-3 | 13 | 0.3 | 40 | 100 | 0.16 | 33.55 | 95 | 837 | 93.6 |
| C-1 | 5 | 0.3 | 40 | 50 | 0.08 | 19.85 | 95 | 1499 | 99.2 |
| C-2 | 21 | 0.3 | 40 | 50 | 0.08 | 41.77 | 95 | 665 | 92.6 |
| C-3 | 13 | 0.3 | 40 | 50 | 0.08 | 30.86 | 95 | 944 | 97.1 |
| D-1 | 5 | 0.3 | 40 | 0 | 0 | 40.78 | 95 | 654 | 88.9 |
| D-2 | 21 | 0.3 | 40 | 0 | 0 | 41.78 | 95 | 568 | 79.1 |
| D-3 | 13 | 0.3 | 40 | 0 | 0 | 22.98 | 95 | 1196 | 91.6 |

| Entry | Supported Catalyst | Quantity Supported Catalyst (mg) | Supported Catalyst Loading (μmol/g) | Volume 1-Hexene co-monomer ((μL) | concentration 1-Hexene co-monomer (mM) | wt % C6 | Primary Tm (° C.) |
|---|---|---|---|---|---|---|---|
| A-1 | 5 | 0.3 | 40 | 150 | 0.24 | 1.6 | 151.98 |
| A-2 | 21 | 0.3 | 40 | 150 | 0.24 | 1.2 | 146.60 |
| A-3 | 13 | 0.3 | 40 | 150 | 0.24 | 0.5 | 152.63 |
| B-1 | 5 | 0.3 | 40 | 100 | 0.16 | 0.3 | 151.65 |
| B-2 | 21 | 0.3 | 40 | 100 | 0.16 | 0.5 | 146.60 |
| B-3 | 13 | 0.3 | 40 | 100 | 0.16 | 0.1 | 152.39 |
| C-1 | 5 | 0.3 | 40 | 50 | 0.08 | 0.4 | 155.60 |
| C-2 | 21 | 0.3 | 40 | 50 | 0.08 | 0.5 | 156.65 |
| C-3 | 13 | 0.3 | 40 | 50 | 0.08 | 0.1 | 156.34 |
| D-1 | 5 | 0.3 | 40 | 0 | 0 | — | 163.82 |
| D-2 | 21 | 0.3 | 40 | 0 | 0 | — | 162.17 |
| D-3 | 13 | 0.3 | 40 | 0 | 0 | — | 163.32 |

TABLE 5

| Entry | Supported Catalyst | Mn (g/mol) | Mw (g/mol) | Mz (g/mol | Mw/Mn | Wt % C6 | LCB: g' (Vis Avg) |
|---|---|---|---|---|---|---|---|
| B-1 | 5 | 41912 | 203838 | 488233 | 4.86 | 1.60 | 0.737 |
| B-2 | 21 | 53923 | 236788 | 579853 | 4.39 | 1.44 | 0.749 |
| B-3 | 13 | 51829 | 207699 | 561482 | 4.01 | 1.46 | 0.739 |

Overall, catalysts, catalyst systems, and methods of the present disclosure can provide high activity values (e.g., from 0.1 kg/mol*h or greater) and can be capable of forming polyolefins, for example, with high molecular weight (e.g., Mw of 2,000,000 to 3,000,000), long chain branching (e.g., g'vis of 0.88 to 0.93) and narrow but multimodal molecular weight distribution (e.g., Mw/Mn value of 2 to 9). Alternatively, catalysts, catalyst systems, and methods of the present disclosure can provide for the formation of polyolefins, for example, with low molecular weight (e.g., Mw of 100,000 to 500,000) and low comonomer content but with a broadened molecular weight distribution, and fractional g' values indicative of long-chain branching. In addition, substantially narrow comonomer distributions were observed.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

We claim:

1. A catalyst represented by formula (Ia):

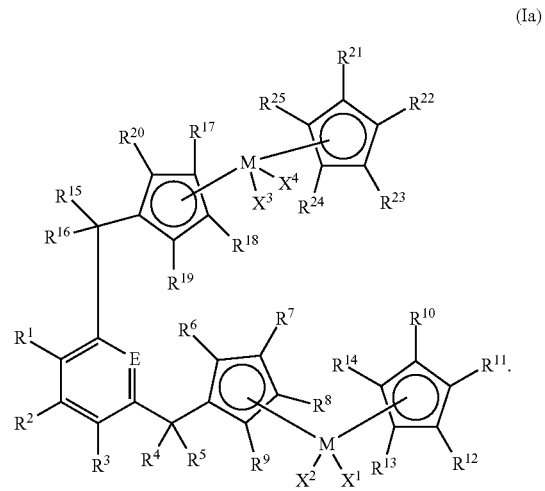

(Ia)

wherein:

each M is a group 4 metal;

E is N;

each of $X^1$, $X^2$, $X^3$, and $X^4$ is independently hydrogen, halogen, hydroxyl, —N($C_1$-$C_{40}$ hydrocarbyl)$_2$, $C_1$-$C_{40}$ hydrocarbyl, or substituted $C_1$-$C_{40}$ hydrocarbyl;

each of $R^1$, $R^2$, and $R^3$ is independently hydrogen, halogen, $C_1$-$C_{40}$ hydrocarbyl, substituted $C_1$-$C_{40}$ hydrocarbyl, $C_6$-$C_{10}$ aryl, substituted $C_6$-$C_{10}$ aryl, —NR'$_2$, —SR', —OR', —OSiR'$_3$, or —PR'$_2$, wherein each R' is hydrogen, halogen, $C_1$-$C_{10}$ alkyl, or $C_6$-$C_{10}$ aryl or one or both of $R^1$ and $R^2$ or $R^2$ and $R^3$ are joined to form a saturated ring, unsaturated ring, substituted saturated ring, or substituted unsaturated ring;

each of $R^4$, $R^5$, $^{105}$ and $^{106}$ is independently hydrogen or $Ci$-$C^{40}$ hydrocarbyl; and each of $R^6$, $R^7$, $R^8$, $R^9$, $R^{10}$, $R^{11}$, $R^{12}$, $R^{13}$, $R^{14}$, $R^{17}$, $R^{18}$, $R^{19}$, $R^{20}$, $R^{21}$, $R^{22}$, $R^{23}$, $R^{24}$, and $R^{25}$ is independently hydrogen, halogen, $C_1$-$C_{40}$ hydrocarbyl, substituted $C_1$-$C_{40}$ hydrocarbyl, $C_6$-$C_{10}$ aryl, substituted $C_6$-$C_{10}$ aryl, —NR'$_2$, —SR', —OR', —OSiR'$_3$, or —PR'$_2$, wherein each R' is hydrogen, halogen, $C_1$-$C_{10}$ alkyl, or $C_6$-$C_{10}$ aryl aryl, or one or more of $R^6$ and $R^7$, $R^7$ and $R^8$, $R^8$ and $R^9$, $R^{10}$ and $R^{11}$, $R^{11}$ and $R^{12}$, $R^{12}$ and $R^{13}$, $R^{13}$ and $R^{14}$, $R^{17}$ and $R^{18}$, $R^{18}$ and $R^{19}$, $R^{17}$ and $R^{20}$, $R^{21}$ and $R^{22}$, $R^{22}$ and $R^{23}$, $R^{23}$ and $R^{24}$, $R^{24}$ and $R^{25}$, and $R^{21}$ and $R^{25}$ are joined to form a saturated ring, unsaturated ring, substituted saturated ring, or substituted unsaturated ring.

2. The catalyst of claim 1, wherein M is hafnium or zirconium.

3. The catalyst of claim 1, wherein one or more of $R^6$ and $R^7$, $R^7$ and $R^8$, $R^8$ and $R^9$, $R^{17}$ and $R^{18}$, $R^{18}$ and $R^{19}$, $R^{17}$ and $R^{20}$ are joined to form a saturated ring, unsaturated ring, substituted saturated ring, or substituted unsaturated ring.

4. The catalyst of claim 1, wherein one of $R^6$ and $R^7$, $R^7$ and $R^8$, and $R^8$ and $R^9$ are joined to form a saturated ring or unsaturated ring substituted with one or more of halogen, $C_1$-$C_{40}$ hydrocarbyl, substituted $C_1$-$C_{40}$ hydrocarbyl, —NR'$_2$, —SR', —OR', —OSiR'$_3$, or —PR'$_2$, wherein each R' is hydrogen, halogen, $C_1$-$C_{10}$ alkyl, or $C_6$-$C_{10}$ aryl.

5. The catalyst of claim 4, wherein one of $R^{16}$ and $R^{17}$, $R^{17}$ and $R^{18}$, and $R^{18}$ and $R^{19}$ are joined to form a saturated ring or unsaturated ring substituted with one or more of halogen, $C_1$-$C_{40}$ hydrocarbyl, substituted $C_1$-$C_{40}$ hydrocarbyl, —NR'$_2$, —SR', —OR', —OSiR'$_3$, or —PR'$_2$, wherein each R' is hydrogen, halogen, $C_1$-$C_{10}$ alkyl, or $C_6$-$C_{10}$ aryl.

6. The catalyst of claim 1, wherein each of $R^1$, $R^2$, and $R^3$ is independently hydrogen, $C_1$-$C_{40}$ hydrocarbyl, or substituted $C_1$-$C_{40}$ hydrocarbyl.

7. The catalyst of claim 1, wherein each of $X^1$, $X^2$, $X^3$, and $X^4$ is independently halogen or $C_1$-$C_{40}$ hydrocarbyl.

8. The catalyst of claim 1, wherein each of $R^4$, $R^5$, $R^{15}$, and $R^{16}$ is hydrogen.

9. The catalyst of claim 1, wherein each of $R^6$, $R^7$, $R^8$, $R^9$, $R^{17}$, $R^{18}$, $R^{19}$, and $R^{20}$ is hydrogen.

10. The catalyst of claim 1, wherein each of $R^{10}$, $R^{11}$, $R^{12}$, $R^{13}$, $R^{14}$, $R^{21}$, $R^{22}$, $R^{23}$, $R^{24}$, and $R^{25}$ is independently hydrogen or $C_1$-$C_{20}$ hydrocarbyl.

11. The catalyst of claim 1, wherein each of $R^{10}$, $R^{11}$, $R^{12}$, $R^{13}$, and $R^{14}$ is methyl.

12. The catalyst of claim 1, wherein the catalyst represented by formula (Ia) is one or more of:

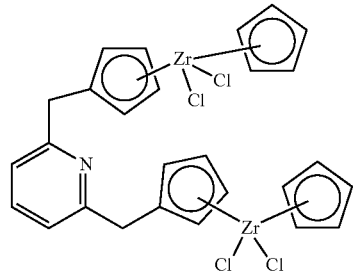

1

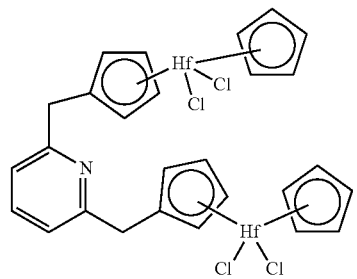

2

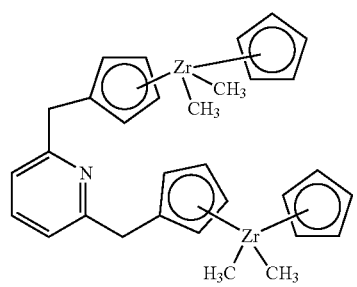

3

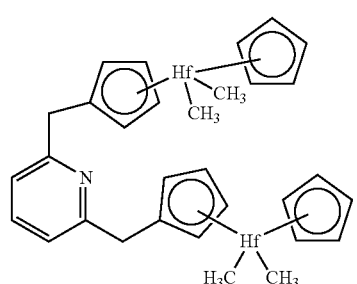

4

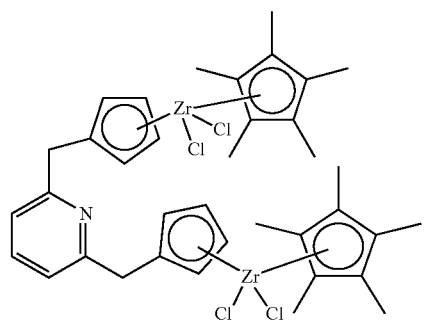

5

6
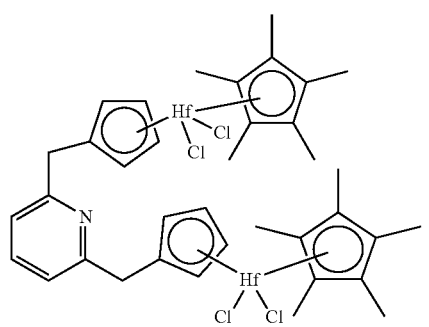
7
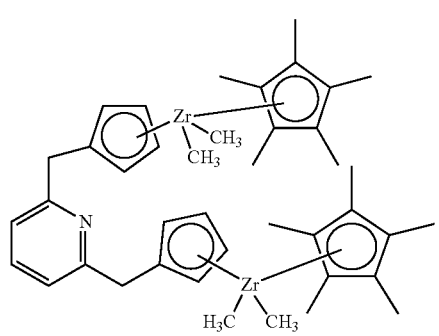
8
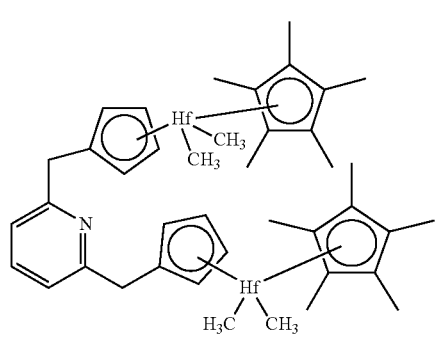
9
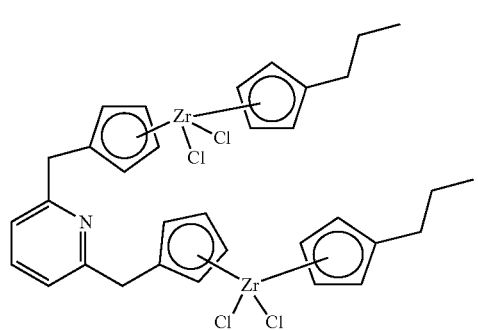
10
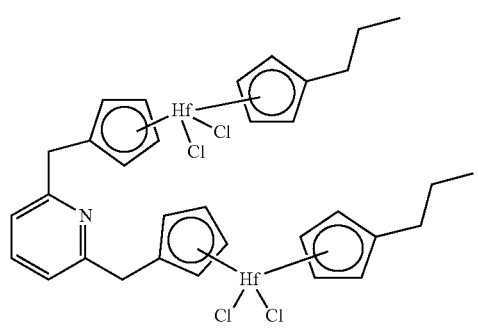
11
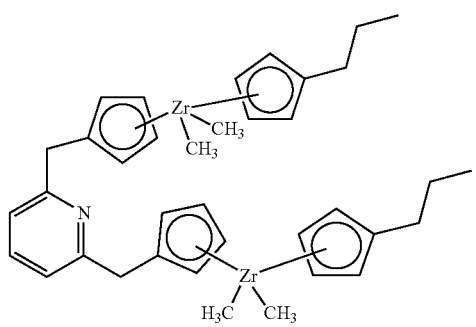
12
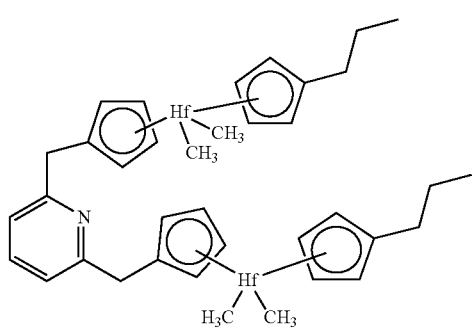
13
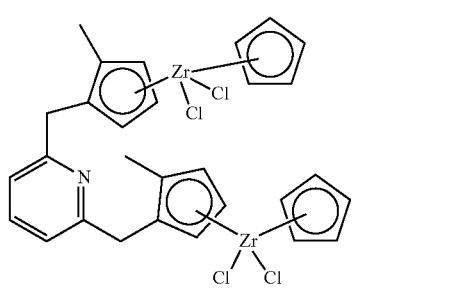
14
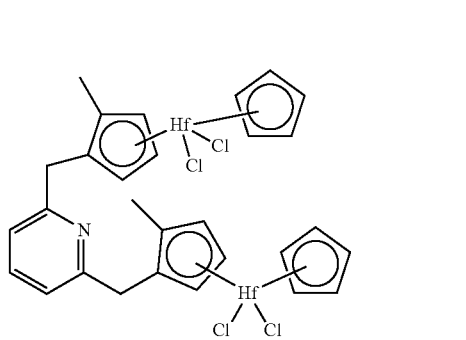
15
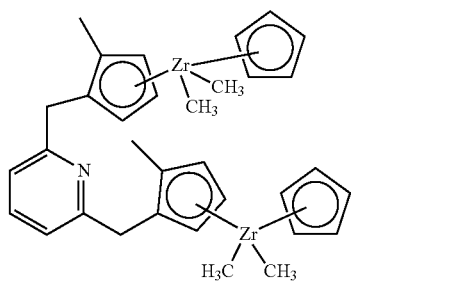

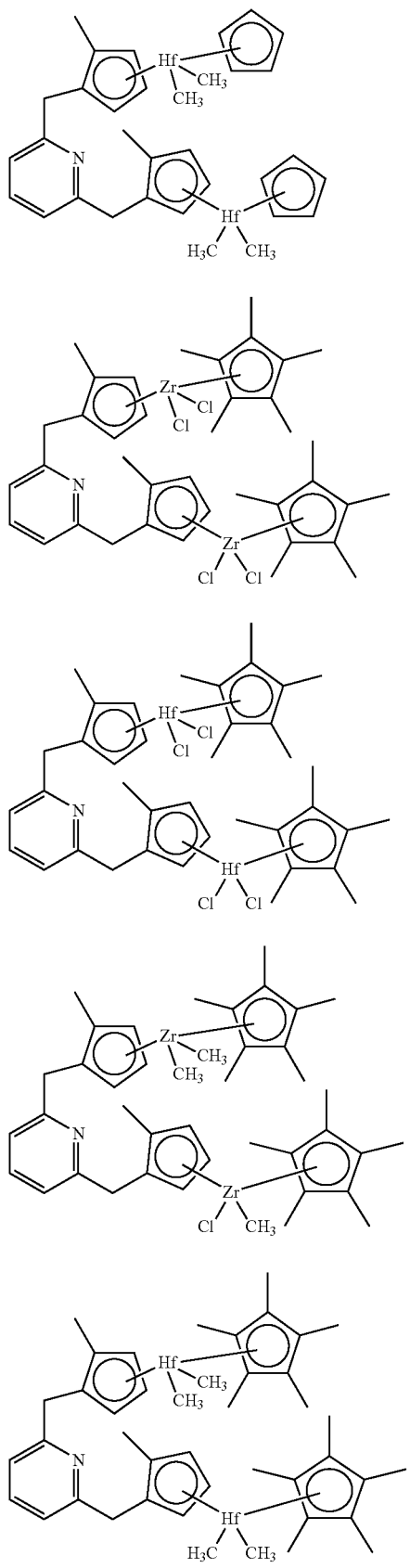
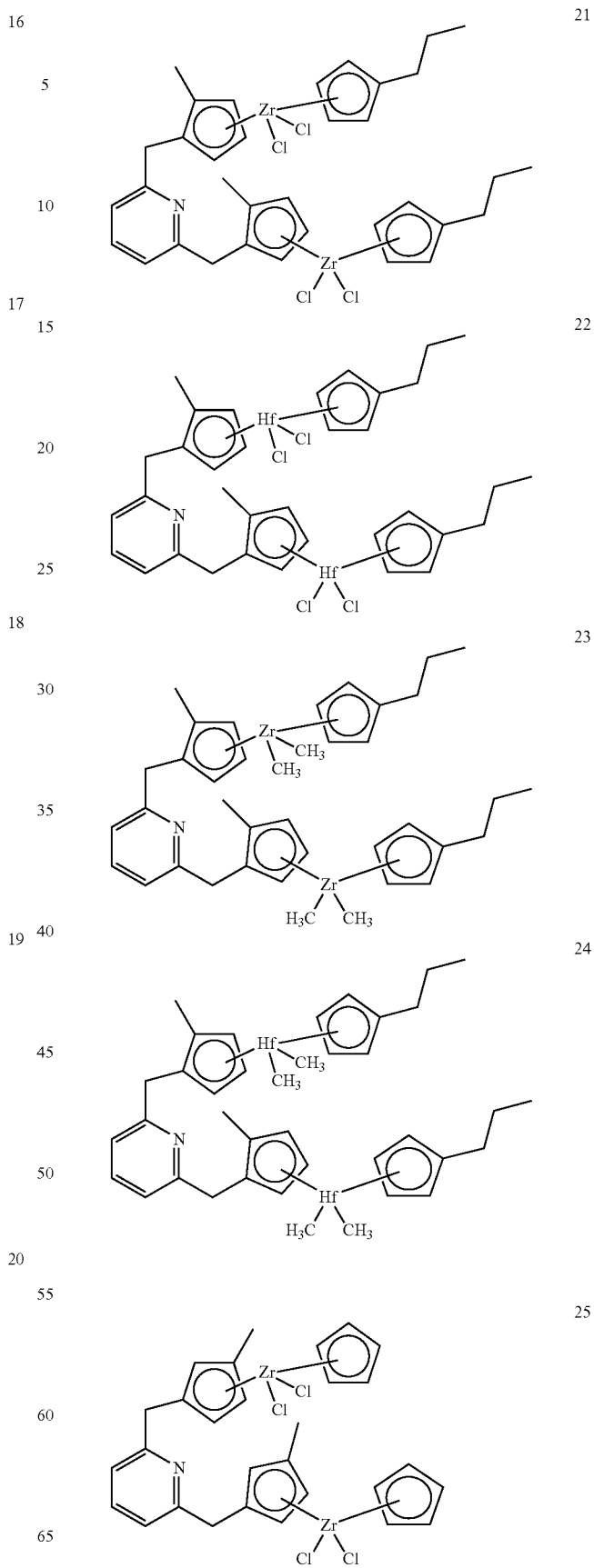

-continued
26
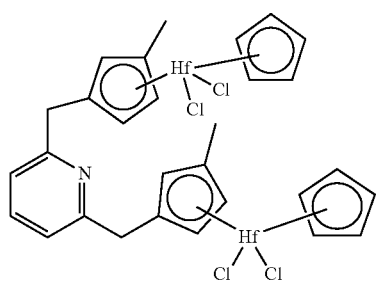
27
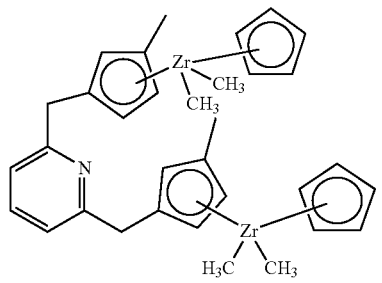
28
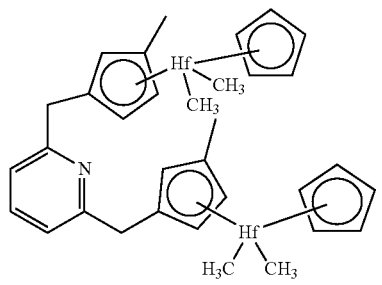
29
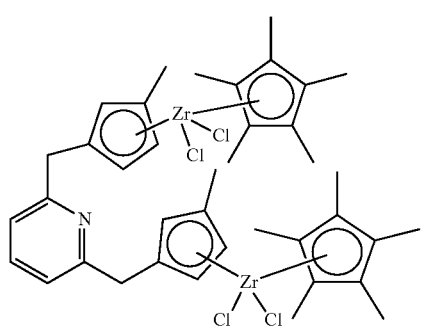
30
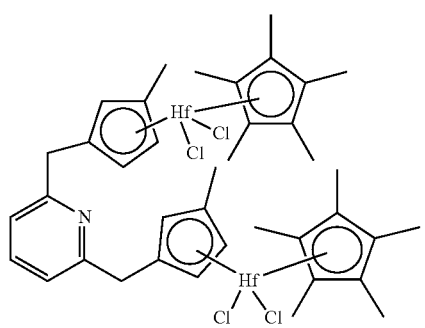
-continued
31
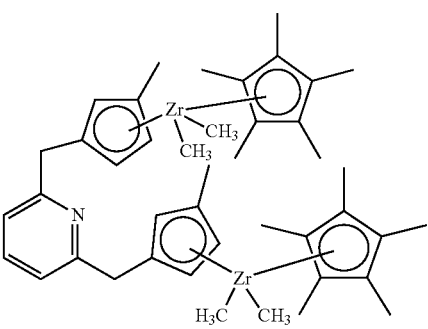
32
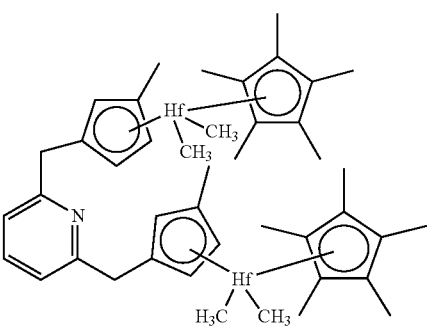
33
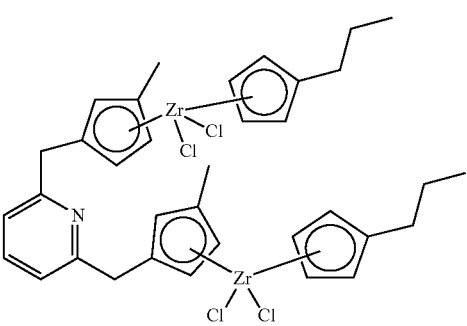
34
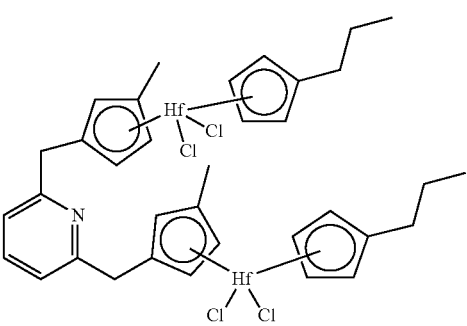
35
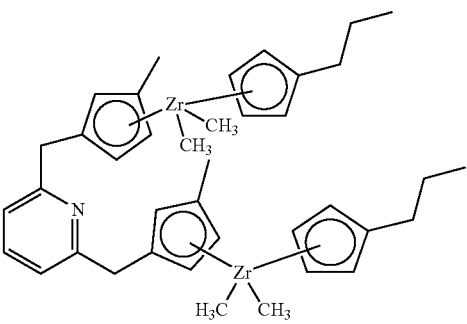

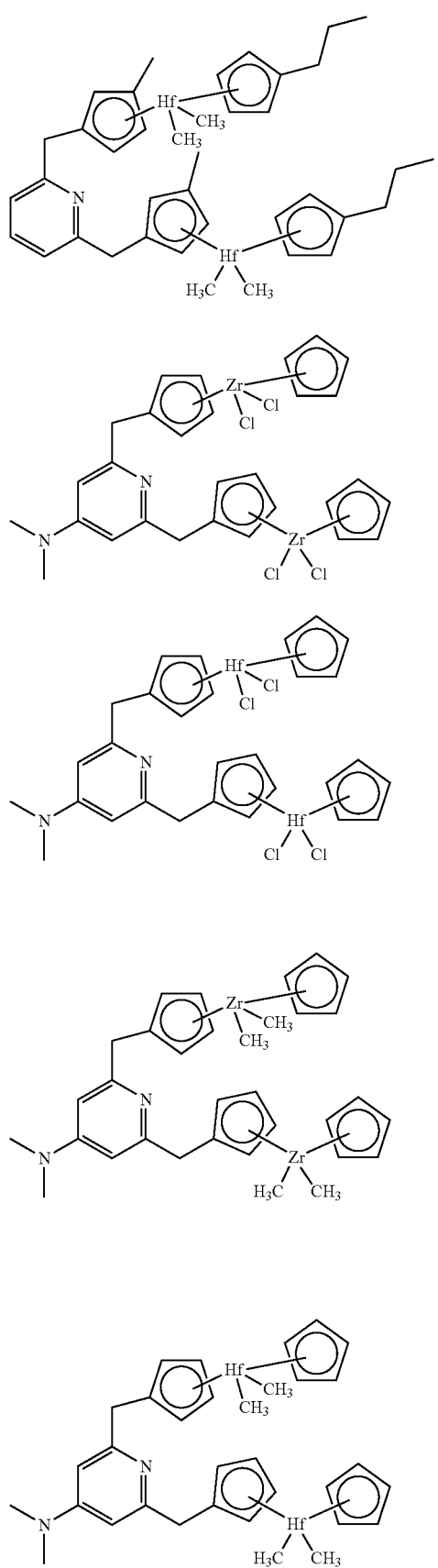
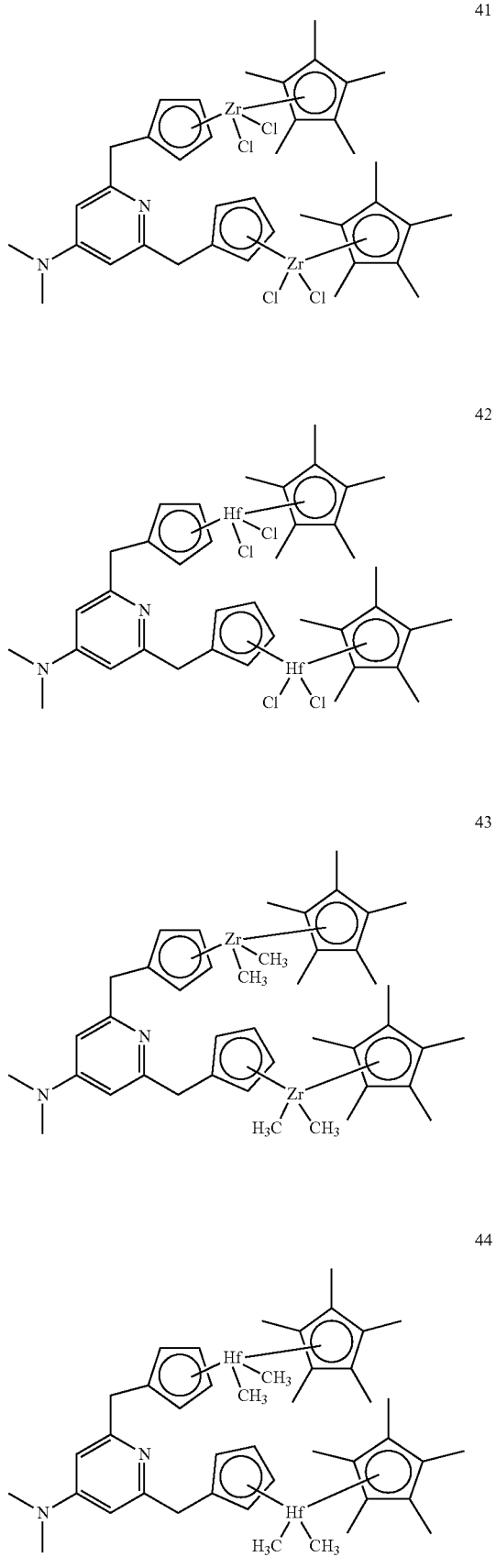

45
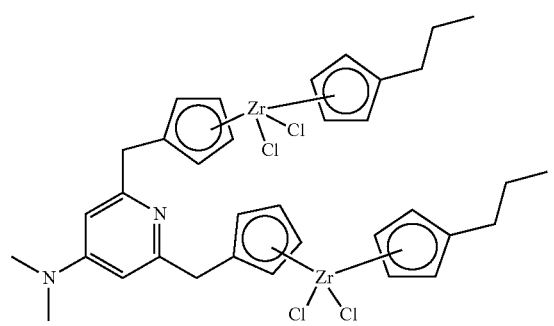
46
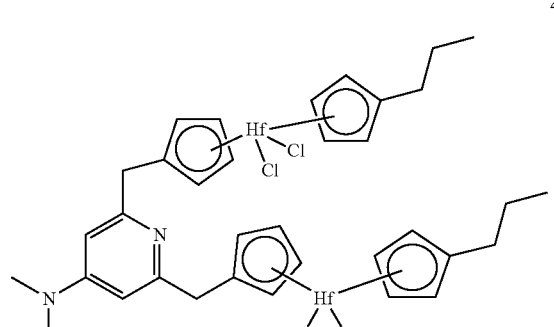
47
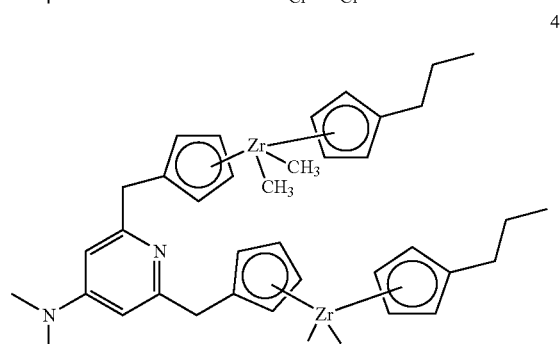
48
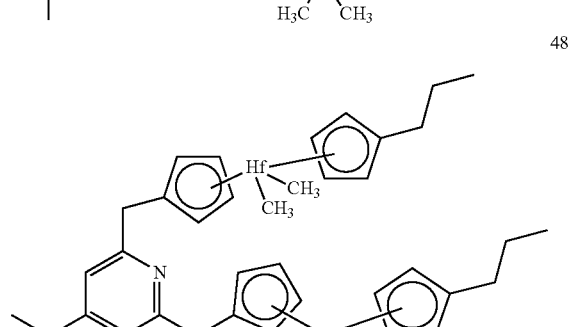
49
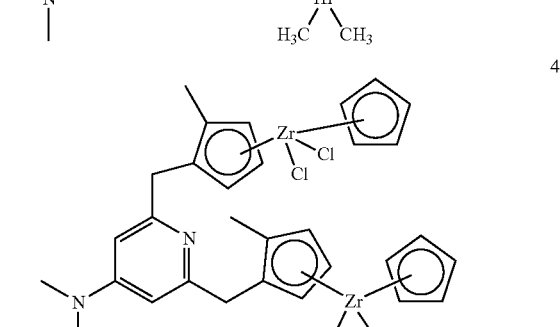
50
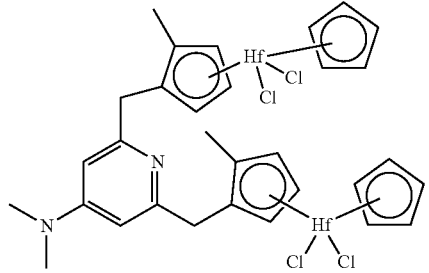
51
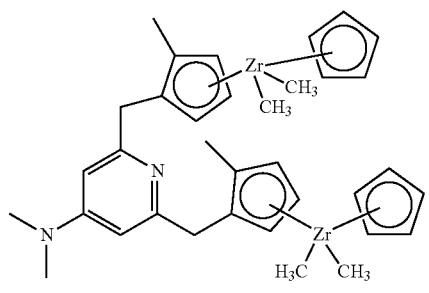
52
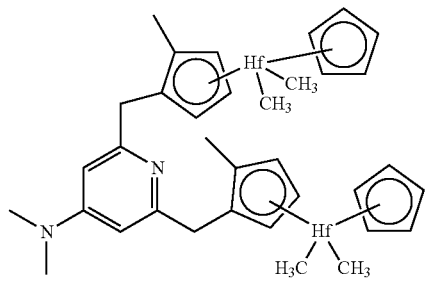
53
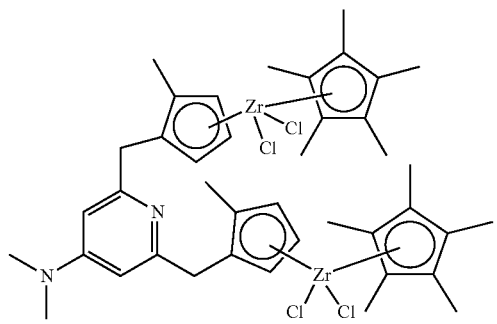
54
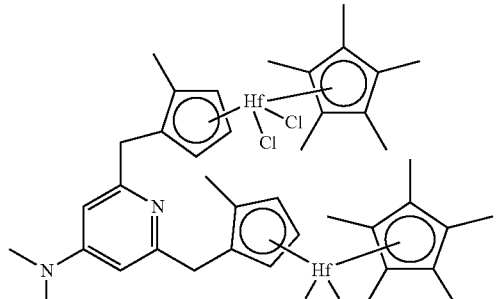

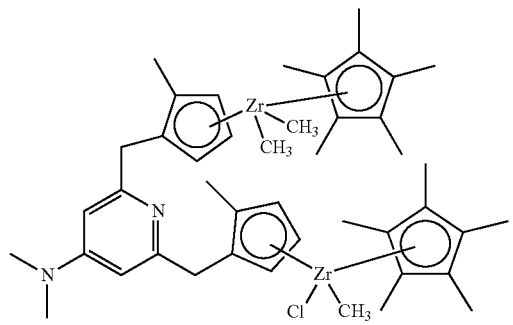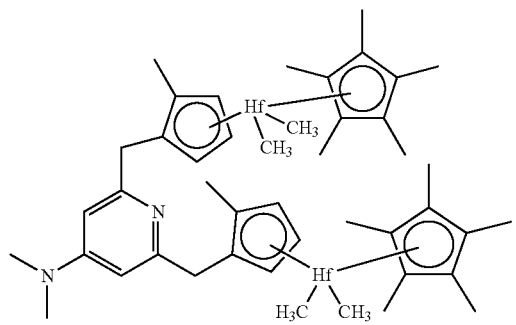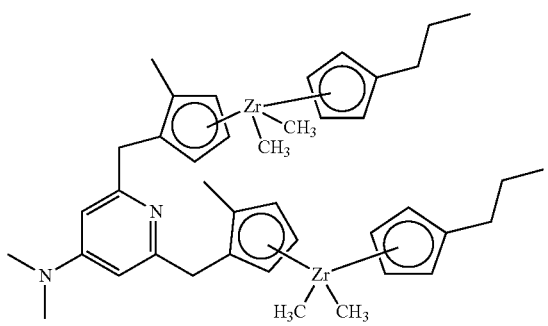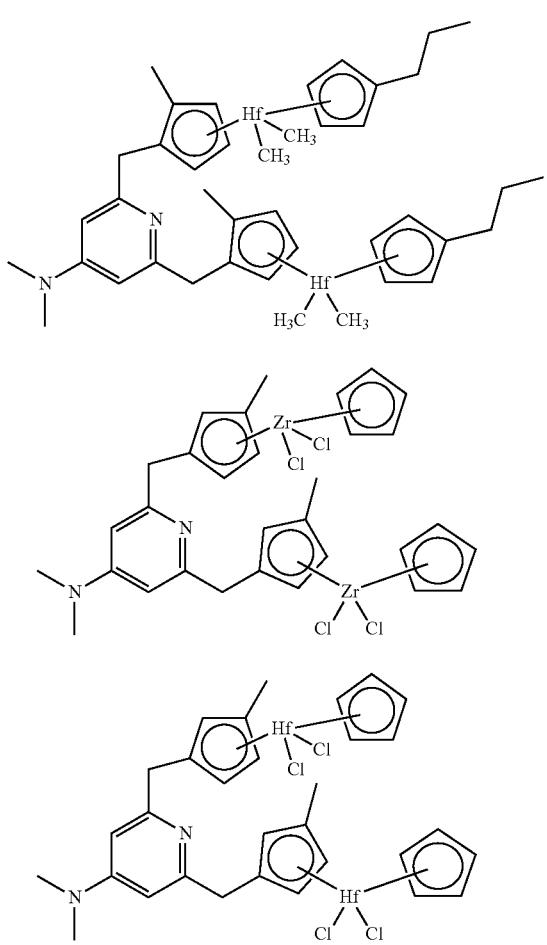

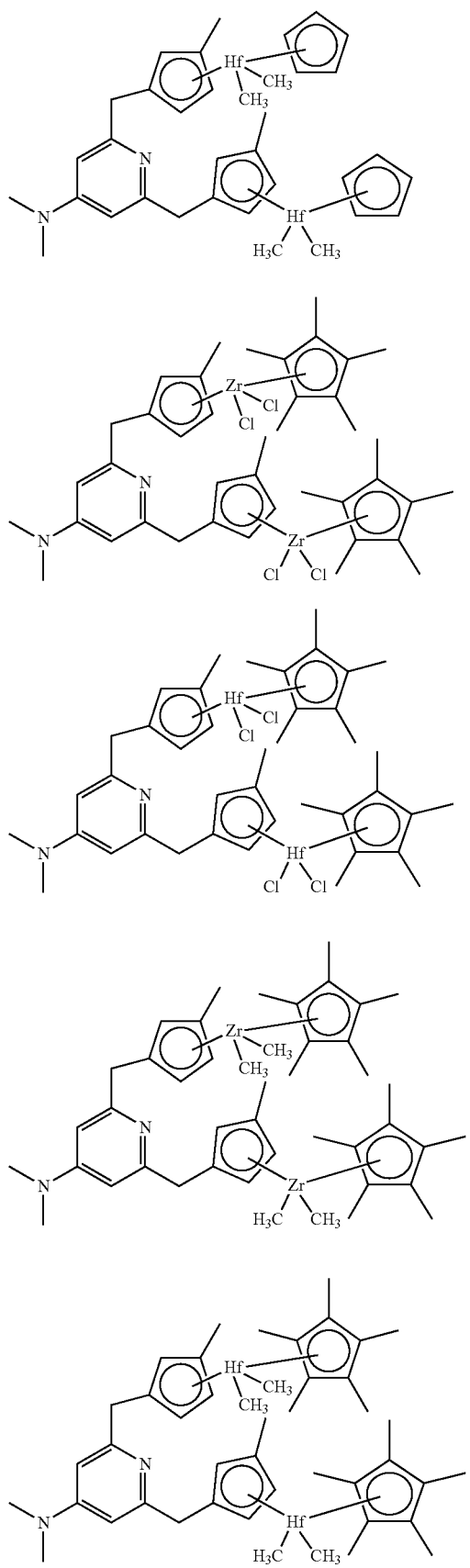
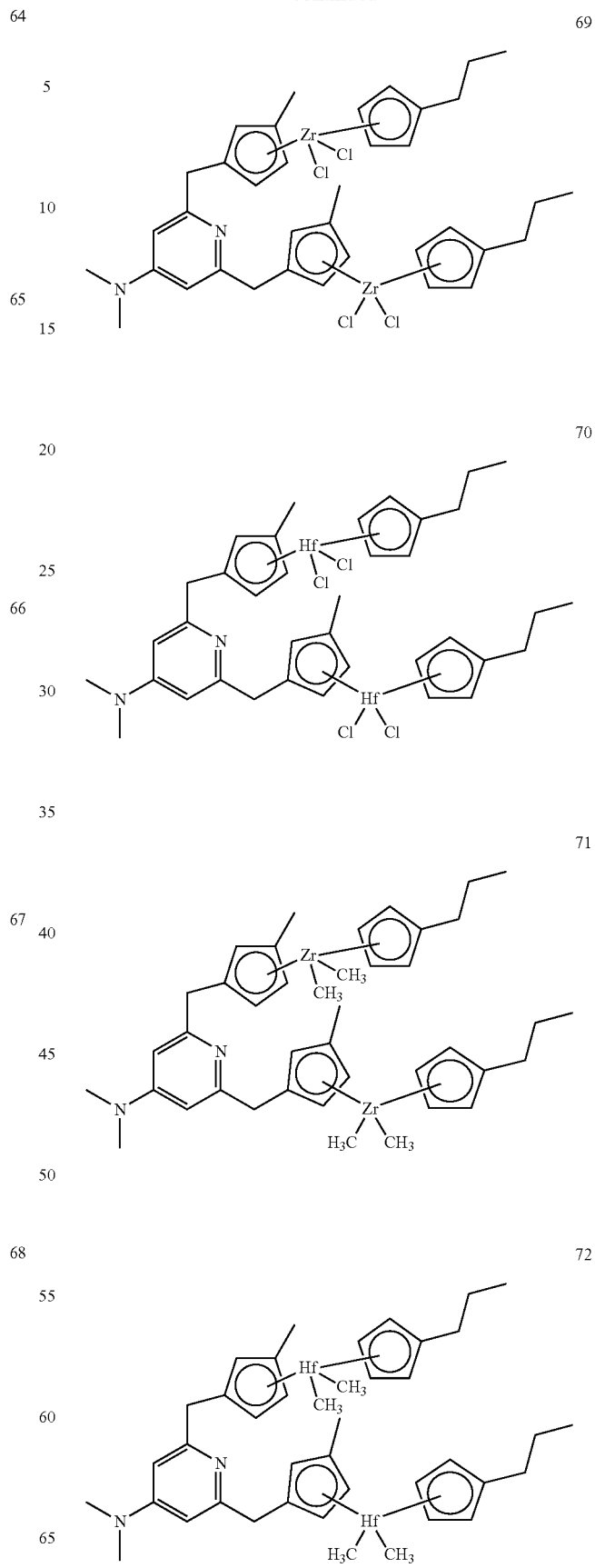

73
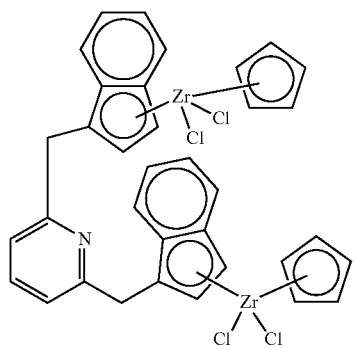
74
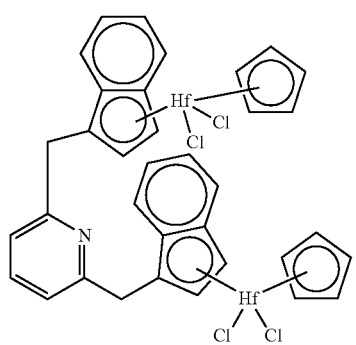
75
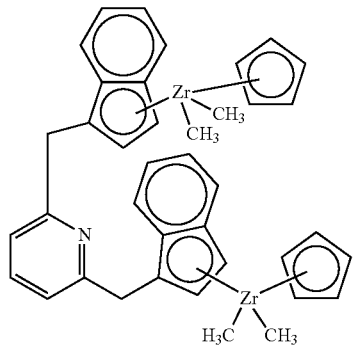
76
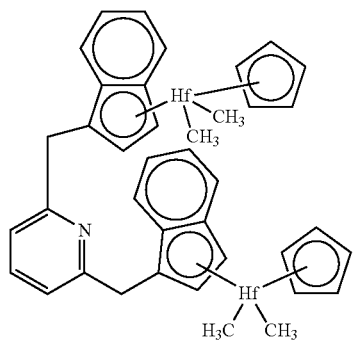
77
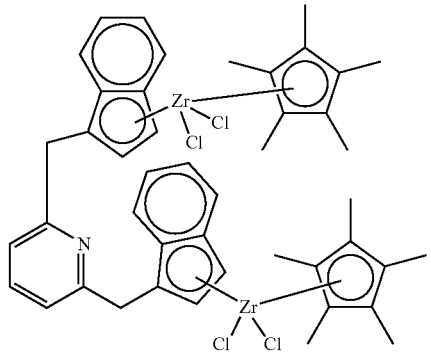
78
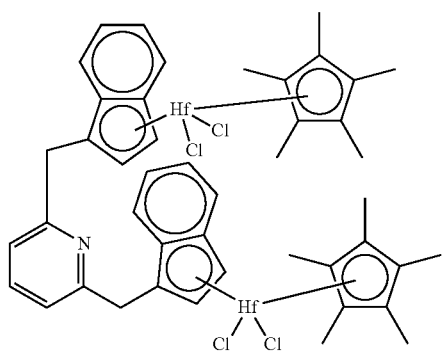
79
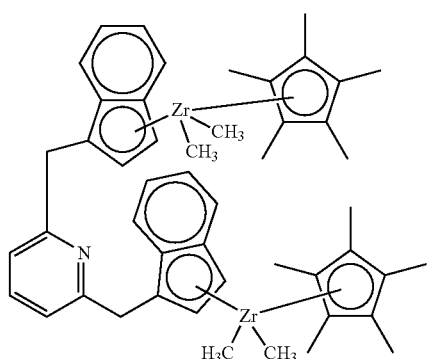
80
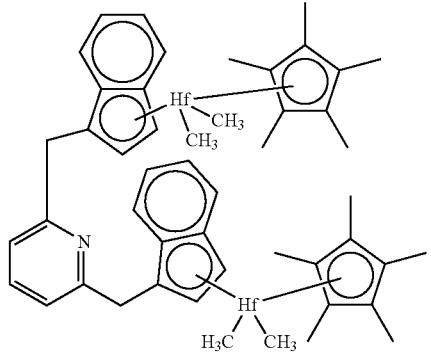

-continued
81
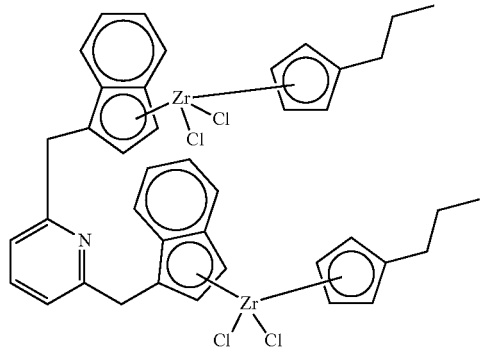
82
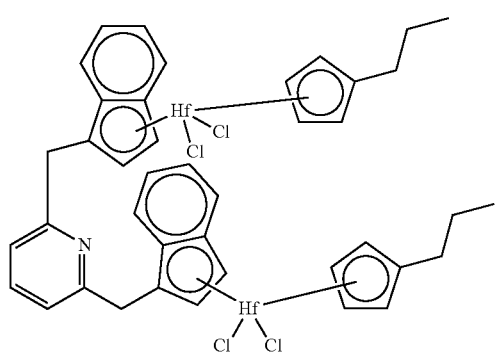
83
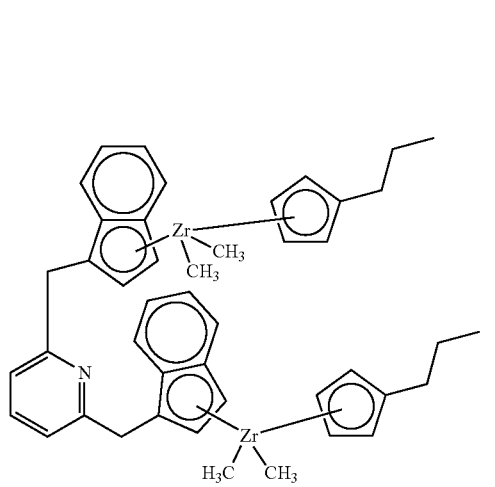
84
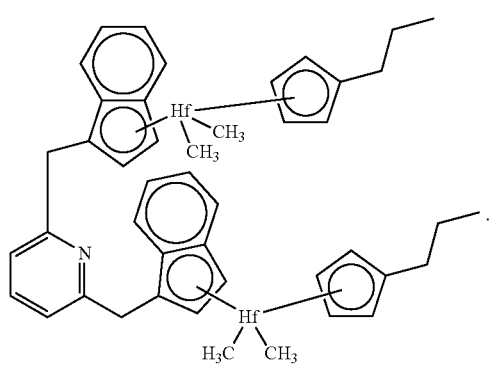
13. The catalyst of claim 1, wherein the catalyst represented by formula (Ia) is one or more of:
1
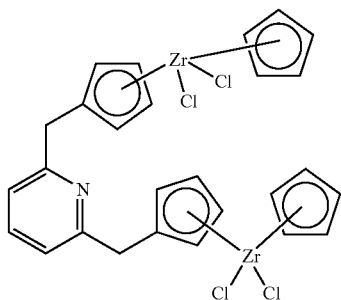
5
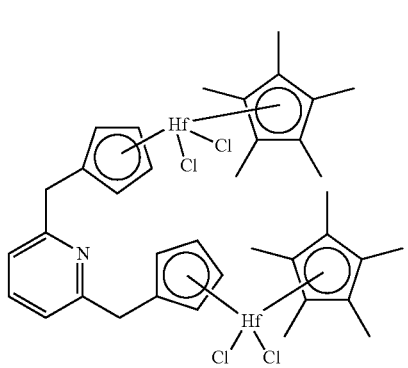
6

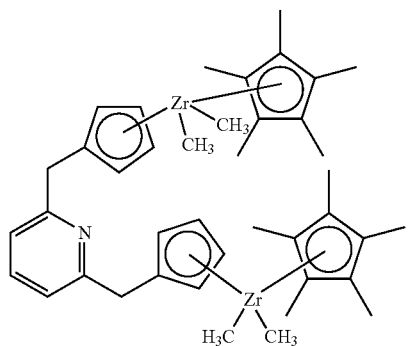

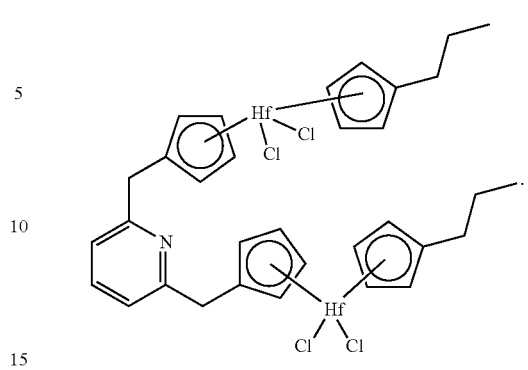

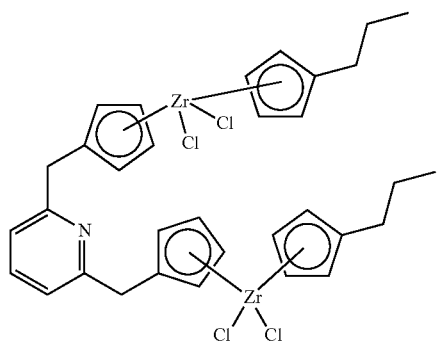

14. A catalyst system comprising the product of the combination of:
(a) the catalyst of claim 1;
(b) optionally, a bridged or unbridged metallocene catalyst other than the catalyst of (a); and
(c) an activator.

15. The catalyst system of claim 14, further comprising a support material; and a molar ratio of activator to catalyst is from 1.5:1 to 5:1.

16. A method of polymerizing olefins to produce at least one polyolefin composition, the method comprising:
(a) contacting at least one olefin with the catalyst system of claim 14; and
(b) obtaining a polyolefin.

17. The method of claim 16, wherein contacting occurs at a temperature of 0° C. to 300° C., at a pressure in the range of from 0.35 MPa to 10 MPa, and at a time up to 300 min; and the olefin comprises ethylene, propylene, butene, pentene, hexene, heptene, octene, nonene, decene, undecene, dodecene, or mixtures thereof.

* * * * *